United States Patent
Mitkar et al.

(10) Patent No.: US 10,983,875 B2
(45) Date of Patent: Apr. 20, 2021

(54) TIME-BASED VIRTUAL MACHINE REVERSION

(71) Applicant: Commvault Systems, Inc., Tinton Falls, NJ (US)

(72) Inventors: Amit Mitkar, Manalapan, NJ (US); Andrei Erofeev, Marlboro, NJ (US); Amit Bhaskar Ausarkar, Ocean, NJ (US); Ajay Venkat Nagrale, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 16/590,061

(22) Filed: Oct. 1, 2019

(65) Prior Publication Data
US 2020/0034252 A1    Jan. 30, 2020

Related U.S. Application Data

(63) Continuation of application No. 15/924,004, filed on Mar. 16, 2018, now Pat. No. 10,474,542.
(Continued)

(51) Int. Cl.
*G06F 12/00* (2006.01)
*G06F 11/14* (2006.01)
(Continued)

(52) U.S. Cl.
CPC .......... *G06F 11/1469* (2013.01); *G06F 3/064* (2013.01); *G06F 3/065* (2013.01);
(Continued)

(58) Field of Classification Search
CPC ............ G06F 11/1461; G06F 11/1448; G06F 11/1458; G06F 11/1469; G06F 9/45558;
(Continued)

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 A1 | 3/1988 |
| EP | 0405926 A2 | 1/1991 |

(Continued)

OTHER PUBLICATIONS

U.S. Appl. No. 16/262,753, filed Jan. 30, 2019, Dornemann et al.
(Continued)

*Primary Examiner* — Shawn X Gu
(74) *Attorney, Agent, or Firm* — Knobbe Martens Olson & Bear LLP

(57) ABSTRACT

Recovery points can be used for replicating a virtual machine and reverting the virtual machine to a different state. A filter driver can monitor and capture input/output commands between a virtual machine and a virtual machine disk. The captured input/output commands can be used to create a recovery point. The recovery point can be associated with a bitmap that may be used to identify data blocks that have been modified between two versions of the virtual machine. Using this bitmap, a virtual machine may be reverted or restored to a different state by replacing modified data blocks and without replacing the entire virtual machine disk.

20 Claims, 20 Drawing Sheets

Related U.S. Application Data

(60) Provisional application No. 62/476,554, filed on Mar. 24, 2017, provisional application No. 62/476,556, filed on Mar. 24, 2017, provisional application No. 62/476,595, filed on Mar. 24, 2017.

(51) Int. Cl.
  *G06F 3/06* (2006.01)
  *G06F 11/30* (2006.01)
  *G06F 11/32* (2006.01)
  *G06F 16/21* (2019.01)
  *G06F 9/455* (2018.01)
  *G06F 16/16* (2019.01)
  *G06F 16/17* (2019.01)
  *G06F 16/188* (2019.01)

(52) U.S. Cl.
  CPC ......... *G06F 3/0619* (2013.01); *G06F 3/0656* (2013.01); *G06F 9/45558* (2013.01); *G06F 11/3006* (2013.01); *G06F 11/3034* (2013.01); *G06F 11/324* (2013.01); *G06F 16/21* (2019.01); *G06F 16/162* (2019.01); *G06F 16/164* (2019.01); *G06F 16/1734* (2019.01); *G06F 16/188* (2019.01); *G06F 2009/45562* (2013.01); *G06F 2009/45595* (2013.01); *G06F 2201/815* (2013.01); *G06F 2201/82* (2013.01); *G06F 2201/84* (2013.01)

(58) Field of Classification Search
  CPC ......... G06F 9/5077; G06F 2009/45562; G06F 2009/45583; G06F 2009/45595; G06F 3/0647; G06F 3/065; G06F 3/0619; G06F 3/064; G06F 3/0656; G06F 3/0664; G06F 3/067; G06F 3/0481; G06F 2201/815; G06F 2201/82; G06F 2201/84
  See application file for complete search history.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,420,996 A | 5/1995 | Aoyagi |
| 5,448,724 A | 9/1995 | Hayashi |
| 5,454,099 A | 9/1995 | Myers et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,594,901 A | 1/1997 | Andoh |
| 5,619,644 A | 4/1997 | Crockett et al. |
| 5,638,509 A | 6/1997 | Dunphy et al. |
| 5,642,496 A | 6/1997 | Kanfi |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,101,585 A | 8/2000 | Brown et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,397,242 B1 | 5/2002 | Devine et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. |
| 6,542,972 B2 | 4/2003 | Ignatius et al. |
| 6,564,228 B1 | 5/2003 | O'Connor |
| 6,581,076 B1 | 6/2003 | Ching et al. |
| 6,658,436 B2 | 12/2003 | Oshinsky et al. |
| 6,658,526 B2 | 12/2003 | Nguyen et al. |
| 6,721,767 B2 | 4/2004 | De Meno et al. |
| 6,760,723 B2 | 7/2004 | Oshinsky et al. |
| 6,772,290 B1 | 8/2004 | Bromley et al. |
| 6,820,214 B1 | 11/2004 | Cabrera et al. |
| 7,003,641 B2 | 2/2006 | Prahlad et al. |
| 7,035,880 B1 | 4/2006 | Crescenti et al. |
| 7,076,270 B2 | 7/2006 | Jaggers et al. |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,219,162 B2 | 5/2007 | Donker et al. |
| 7,246,207 B2 | 7/2007 | Kottomtharayil |
| 7,315,923 B2 | 1/2008 | Retnamma et al. |
| 7,324,543 B2 | 1/2008 | Wassew et al. |
| 7,343,356 B2 | 3/2008 | Prahlad et al. |
| 7,343,453 B2 | 3/2008 | Prahlad et al. |
| 7,346,751 B2 | 3/2008 | Prahlad et al. |
| 7,376,895 B2 | 5/2008 | Tsao |

(56) References Cited

U.S. PATENT DOCUMENTS

| | | |
|---|---|---|
| 7,386,744 B2 | 6/2008 | Barr et al. |
| 7,389,311 B1 | 6/2008 | Crescenti et al. |
| 7,395,282 B1 | 7/2008 | Crescenti |
| 7,440,982 B2 | 10/2008 | Lu et al. |
| 7,448,079 B2 | 11/2008 | Tremain |
| 7,454,569 B2 | 11/2008 | Kavuri et al. |
| 7,475,282 B2 | 1/2009 | Tormasov et al. |
| 7,484,208 B1 | 1/2009 | Nelson |
| 7,490,207 B2 | 2/2009 | Amarendran et al. |
| 7,500,053 B1 | 3/2009 | Kavuri et al. |
| 7,502,820 B2 | 3/2009 | Manders et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,552,279 B1 | 6/2009 | Gandler |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,631,351 B2 | 12/2009 | Erofeev |
| 7,636,743 B2 | 12/2009 | Erofeev |
| 7,640,406 B1 | 12/2009 | Hagerstrom et al. |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,668,884 B2 | 2/2010 | Prahlad et al. |
| 7,685,177 B1 | 3/2010 | Hagerstrom et al. |
| 7,694,070 B2 | 4/2010 | Mogi et al. |
| 7,721,138 B1 | 5/2010 | Lyadvinsky et al. |
| 7,725,893 B2 | 5/2010 | Jaeckel et al. |
| 7,730,035 B2 | 6/2010 | Berger et al. |
| 7,734,669 B2 | 6/2010 | Kottomtharayil et al. |
| 7,747,579 B2 | 6/2010 | Prahlad et al. |
| 7,756,835 B2 | 7/2010 | Pugh |
| 7,756,964 B2 | 7/2010 | Madison, Jr. et al. |
| 7,765,167 B2 | 7/2010 | Prahlad et al. |
| 7,778,984 B2 | 8/2010 | Zhang et al. |
| 7,792,789 B2 | 9/2010 | Prahlad et al. |
| 7,793,307 B2 | 9/2010 | Gokhale et al. |
| 7,801,864 B2 | 9/2010 | Prahlad et al. |
| 7,809,914 B2 | 10/2010 | Kottomtharayil et al. |
| 7,822,967 B2 | 10/2010 | Fung |
| 7,840,537 B2 | 11/2010 | Gokhale |
| 7,861,234 B1 | 12/2010 | Lolo |
| 7,882,077 B2 | 2/2011 | Gokhale et al. |
| 7,890,467 B2 | 2/2011 | Watanable et al. |
| 7,899,788 B2 | 3/2011 | Chandhok et al. |
| 7,917,617 B1 | 3/2011 | Ponnapur |
| 7,937,421 B2 | 5/2011 | Mikesell et al. |
| 7,937,612 B1 | 5/2011 | Lyadvinsky et al. |
| 8,001,277 B2 | 8/2011 | Mega et al. |
| 8,037,028 B2 | 10/2011 | Prahlad et al. |
| 8,037,032 B2 | 10/2011 | Pershin et al. |
| 8,046,550 B2 | 10/2011 | Feathergill |
| 8,055,745 B2 | 11/2011 | Atluri |
| 8,060,476 B1 | 11/2011 | Afonso et al. |
| 8,069,271 B2 | 11/2011 | Brunet et al. |
| 8,099,391 B1 | 1/2012 | Monckton |
| 8,117,492 B1 | 2/2012 | Searls et al. |
| 8,135,930 B2 | 3/2012 | Mattox et al. |
| 8,140,786 B2 | 3/2012 | Bunte |
| 8,156,301 B1 | 4/2012 | Khandelwal et al. |
| 8,170,995 B2 | 5/2012 | Prahlad et al. |
| 8,185,893 B2 | 5/2012 | Hyser et al. |
| 8,200,637 B1 | 6/2012 | Stringham |
| 8,219,524 B2 | 7/2012 | Gokhale |
| 8,219,653 B1 | 7/2012 | Keagy et al. |
| 8,219,769 B1 | 7/2012 | Wilk |
| 8,225,133 B1 | 7/2012 | Lyadvinsky et al. |
| 8,229,896 B1 | 7/2012 | Narayanan |
| 8,229,954 B2 | 7/2012 | Kottomtharayil et al. |
| 8,230,256 B1 | 7/2012 | Raut |
| 8,285,681 B2 | 10/2012 | Prahlad et al. |
| 8,307,177 B2 | 11/2012 | Prahlad et al. |
| 8,307,187 B2 | 11/2012 | Chawla et al. |
| 8,315,992 B1 | 11/2012 | Gipp et al. |
| 8,364,652 B2 | 1/2013 | Vijayan et al. |
| 8,370,542 B2 | 2/2013 | Lu et al. |
| 8,396,838 B2 | 3/2013 | Brockway |
| 8,407,190 B2 | 3/2013 | Prahlad |
| 8,433,679 B2 | 4/2013 | Crescenti |
| 8,434,131 B2 | 4/2013 | Varadharajan |
| 8,438,347 B1 | 5/2013 | Tawri et al. |
| 8,453,145 B1 | 5/2013 | Naik |
| 8,473,594 B2 | 6/2013 | Astete et al. |
| 8,489,676 B1 | 7/2013 | Chaplin et al. |
| 8,560,788 B1 | 10/2013 | Sreedharan et al. |
| 8,577,845 B2 | 11/2013 | Nguyen et al. |
| 8,578,120 B2 | 11/2013 | Attarde et al. |
| 8,578,126 B1 | 11/2013 | Gaonkar et al. |
| 8,620,870 B2 | 12/2013 | Dwarampudi et al. |
| 8,667,171 B2 | 3/2014 | Guo et al. |
| 8,751,857 B2 | 6/2014 | Frenkel et al. |
| 8,776,043 B1 | 7/2014 | Thimsen et al. |
| 8,799,431 B2 | 8/2014 | Pabari |
| 8,831,202 B1 | 9/2014 | Abidogun et al. |
| 8,850,146 B1 | 9/2014 | Majumdar |
| 8,904,081 B1 | 12/2014 | Kulkarni |
| 8,924,967 B2 | 12/2014 | Nelson |
| 8,930,543 B2 | 1/2015 | Ashok et al. |
| 8,938,481 B2 | 1/2015 | Kumarasamy et al. |
| 8,938,643 B1 | 1/2015 | Karmarkar et al. |
| 8,954,446 B2 | 2/2015 | Vijayan Retnamma et al. |
| 8,954,796 B1 | 2/2015 | Cohen et al. |
| 8,966,318 B1 | 2/2015 | Shah |
| 9,020,895 B1 | 4/2015 | Rajashekar |
| 9,020,900 B2 | 4/2015 | Vijayan Retnamma et al. |
| 9,021,459 B1 | 4/2015 | Qu |
| 9,026,498 B2 | 5/2015 | Kumarasamy |
| 9,069,587 B2 | 6/2015 | Agarwal et al. |
| 9,098,457 B2 | 8/2015 | Towstopiat et al. |
| 9,098,495 B2 | 8/2015 | Gokhale |
| 9,116,633 B2 | 8/2015 | Sancheti et al. |
| 9,124,633 B1 | 9/2015 | Eizadi et al. |
| 9,141,529 B2 | 9/2015 | Klein et al. |
| 9,146,755 B2 | 9/2015 | Lassonde et al. |
| 9,213,706 B2 | 12/2015 | Long et al. |
| 9,223,597 B2 | 12/2015 | Deshpande et al. |
| 9,235,474 B1 | 1/2016 | Petri et al. |
| 9,235,582 B1 | 1/2016 | Madiraju Varadaraju et al. |
| 9,239,687 B2 | 1/2016 | Vijayan et al. |
| 9,239,762 B1 | 1/2016 | Gunda et al. |
| 9,246,996 B1 | 1/2016 | Brooker |
| 9,268,602 B2 | 2/2016 | Prahlad et al. |
| 9,280,378 B2 | 3/2016 | Shah |
| 9,286,086 B2 | 3/2016 | Deshpande et al. |
| 9,286,110 B2 | 3/2016 | Mitkar et al. |
| 9,292,350 B1 | 3/2016 | Pendharkar et al. |
| 9,298,715 B2 | 3/2016 | Kumarasamy et al. |
| 9,311,121 B2 | 4/2016 | Deshpande et al. |
| 9,311,248 B2 | 4/2016 | Wagner |
| 9,397,944 B1 | 7/2016 | Hobbs et al. |
| 9,405,763 B2 | 8/2016 | Prahlad et al. |
| 9,417,968 B2 | 8/2016 | Dornemann et al. |
| 9,424,136 B1 | 8/2016 | Teater et al. |
| 9,436,555 B2 | 9/2016 | Dornemann et al. |
| 9,451,023 B2 | 9/2016 | Sancheti |
| 9,461,881 B2 | 10/2016 | Kumarasamy |
| 9,471,441 B1 | 10/2016 | Lyadvinsky et al. |
| 9,477,683 B2 | 10/2016 | Ghosh |
| 9,489,244 B2 | 11/2016 | Mitkar et al. |
| 9,495,370 B1 | 11/2016 | Chatterjee et al. |
| 9,495,404 B2 | 11/2016 | Kumarasamy et al. |
| 9,575,789 B1 | 2/2017 | Rangari et al. |
| 9,575,991 B2 | 2/2017 | Ghosh |
| 9,588,847 B1 | 3/2017 | Natanzon et al. |
| 9,594,636 B2 | 3/2017 | Mortensen et al. |
| 9,606,745 B2 | 3/2017 | Satoyama et al. |
| 9,612,966 B2 | 4/2017 | Joshi et al. |
| 9,632,882 B2 | 4/2017 | Kumarasamy et al. |

(56) References Cited

U.S. PATENT DOCUMENTS

| | | |
|---|---|---|
| 9,633,033 B2 | 4/2017 | Vijayan et al. |
| 9,639,274 B2 | 5/2017 | Maranna et al. |
| 9,639,426 B2 | 5/2017 | Pawar et al. |
| 9,652,283 B2 | 5/2017 | Mitkar et al. |
| 9,684,535 B2 | 6/2017 | Deshpande et al. |
| 9,684,567 B2 | 6/2017 | Derk et al. |
| 9,703,584 B2 | 7/2017 | Kottomtharayil et al. |
| 9,710,465 B2 | 7/2017 | Dornemann et al. |
| 9,740,702 B2 | 8/2017 | Pawar et al. |
| 9,760,398 B1 | 9/2017 | Pai |
| 9,760,448 B1 | 9/2017 | Per et al. |
| 9,766,825 B2 | 9/2017 | Bhagi et al. |
| 9,766,989 B2 | 9/2017 | Mitkar et al. |
| 9,823,977 B2 | 11/2017 | Dornemann et al. |
| 9,852,026 B2 | 12/2017 | Mitkar et al. |
| 9,928,001 B2 | 3/2018 | Dornemann et al. |
| 9,939,981 B2 | 4/2018 | White et al. |
| 9,965,316 B2 | 5/2018 | Deshpande et al. |
| 9,977,687 B2 | 5/2018 | Kottomtharayil et al. |
| 9,983,936 B2 | 5/2018 | Dornemann et al. |
| 9,996,287 B2 | 6/2018 | Dornemann et al. |
| 9,996,534 B2 | 6/2018 | Dornemann et al. |
| 10,048,889 B2 | 8/2018 | Dornemann et al. |
| 10,061,658 B2 | 8/2018 | Long et al. |
| 10,108,652 B2 | 10/2018 | Kumarasamy et al. |
| 10,152,251 B2 | 12/2018 | Sancheti et al. |
| 10,162,528 B2 | 12/2018 | Sancheti et al. |
| 10,162,873 B2 | 12/2018 | Deshpande et al. |
| 10,228,962 B2 | 3/2019 | Dornemann et al. |
| 10,387,073 B2 | 8/2019 | Bhagi et al. |
| 10,417,102 B2 | 9/2019 | Sanakkayala et al. |
| 10,437,505 B2 | 10/2019 | Dornemann et al. |
| 10,452,303 B2 | 10/2019 | Dornemann et al. |
| 10,474,483 B2 | 11/2019 | Kottomtharayil et al. |
| 10,474,542 B2 | 11/2019 | Mitkar et al. |
| 10,474,548 B2 | 11/2019 | Sanakkayala et al. |
| 10,481,984 B1 | 11/2019 | Semyonov et al. |
| 10,496,547 B1 | 12/2019 | Naenko |
| 10,565,067 B2 | 2/2020 | Dornemann |
| 10,572,468 B2 | 2/2020 | Dornemann et al. |
| 10,592,350 B2 | 3/2020 | Dornemann |
| 10,650,057 B2 | 5/2020 | Pawar et al. |
| 10,678,758 B2 | 6/2020 | Dornemann |
| 10,684,883 B2 | 6/2020 | Deshpande et al. |
| 10,733,143 B2 | 8/2020 | Pawar et al. |
| 10,747,630 B2 | 8/2020 | Sanakkayala et al. |
| 10,768,971 B2 | 9/2020 | Dornemann et al. |
| 10,776,209 B2 | 9/2020 | Pawar et al. |
| 2002/0069369 A1 | 6/2002 | Tremain |
| 2002/0095609 A1 | 7/2002 | Tokunaga |
| 2002/0194511 A1 | 12/2002 | Swoboda |
| 2003/0031127 A1 | 2/2003 | Saleh et al. |
| 2003/0126494 A1 | 7/2003 | Strasser |
| 2003/0204597 A1 | 10/2003 | Arakawa et al. |
| 2004/0030668 A1 | 2/2004 | Pawlowski et al. |
| 2004/0030822 A1 | 2/2004 | Rajan et al. |
| 2004/0230899 A1 | 11/2004 | Pagnano et al. |
| 2005/0060356 A1 | 3/2005 | Saika |
| 2005/0080970 A1 | 4/2005 | Jeyasingh et al. |
| 2005/0198303 A1 | 9/2005 | Knauerhase et al. |
| 2005/0216788 A1 | 9/2005 | Mani-Meitav et al. |
| 2005/0262097 A1 | 11/2005 | Sim-Tang |
| 2006/0058994 A1 | 3/2006 | Ravi et al. |
| 2006/0101189 A1 | 5/2006 | Chandrasekaran et al. |
| 2006/0155712 A1 | 7/2006 | Prahlad et al. |
| 2006/0184935 A1 | 8/2006 | Abels et al. |
| 2006/0195715 A1 | 8/2006 | Herington |
| 2006/0224846 A1 | 10/2006 | Amarendran |
| 2006/0225065 A1 | 10/2006 | Chandhok et al. |
| 2006/0230136 A1 | 10/2006 | Ma |
| 2007/0027999 A1 | 2/2007 | Allen et al. |
| 2007/0043870 A1 | 2/2007 | Ninose |
| 2007/0100792 A1 | 5/2007 | Lent et al. |
| 2007/0198802 A1 | 8/2007 | Kavuri |
| 2007/0203938 A1 | 8/2007 | Prahlad et al. |
| 2007/0208918 A1 | 9/2007 | Harbin et al. |
| 2007/0220319 A1 | 9/2007 | Desai et al. |
| 2007/0234302 A1 | 10/2007 | Suzuki et al. |
| 2007/0239804 A1 | 10/2007 | Armstrong et al. |
| 2007/0266056 A1 | 11/2007 | Stacey et al. |
| 2008/0007765 A1 | 1/2008 | Ogata et al. |
| 2008/0059704 A1 | 3/2008 | Kavuri |
| 2008/0071841 A1 | 3/2008 | Okada et al. |
| 2008/0091655 A1 | 4/2008 | Gokhale |
| 2008/0126833 A1 | 5/2008 | Callaway et al. |
| 2008/0134177 A1 | 6/2008 | Fitzgerald et al. |
| 2008/0189468 A1 | 8/2008 | Schmidt et al. |
| 2008/0195639 A1 | 8/2008 | Freeman et al. |
| 2008/0228771 A1 | 9/2008 | Prahlad et al. |
| 2008/0228833 A1 | 9/2008 | Kano |
| 2008/0229037 A1 | 9/2008 | Bunte |
| 2008/0235479 A1 | 9/2008 | Scales et al. |
| 2008/0243855 A1 | 10/2008 | Prahlad |
| 2008/0243947 A1 | 10/2008 | Kaneda |
| 2008/0244068 A1 | 10/2008 | Iyoda et al. |
| 2008/0244177 A1 | 10/2008 | Crescenti et al. |
| 2008/0250407 A1 | 10/2008 | Dadhia et al. |
| 2008/0270564 A1 | 10/2008 | Rangegowda et al. |
| 2008/0275924 A1 | 11/2008 | Fries |
| 2008/0282253 A1 | 11/2008 | Huizenga |
| 2008/0313371 A1 | 12/2008 | Kedem et al. |
| 2008/0320319 A1 | 12/2008 | Muller |
| 2009/0006733 A1 | 1/2009 | Gold et al. |
| 2009/0037680 A1 | 2/2009 | Colbert et al. |
| 2009/0113109 A1 | 4/2009 | Nelson et al. |
| 2009/0144416 A1 | 6/2009 | Chatley et al. |
| 2009/0157882 A1 | 6/2009 | Kashyap |
| 2009/0210427 A1 | 8/2009 | Eidler et al. |
| 2009/0210458 A1 | 8/2009 | Glover et al. |
| 2009/0216816 A1 | 8/2009 | Basler et al. |
| 2009/0222496 A1 | 9/2009 | Liu et al. |
| 2009/0228669 A1 | 9/2009 | Siesarev et al. |
| 2009/0240904 A1 | 9/2009 | Austruy et al. |
| 2009/0248762 A1 | 10/2009 | Prahlad et al. |
| 2009/0249005 A1 | 10/2009 | Bender et al. |
| 2009/0282404 A1 | 11/2009 | Khandekar et al. |
| 2009/0287665 A1 | 11/2009 | Prahlad |
| 2009/0300023 A1 | 12/2009 | Vaghani |
| 2009/0300057 A1 | 12/2009 | Friedman |
| 2009/0307166 A1 | 12/2009 | Routray et al. |
| 2009/0313260 A1 | 12/2009 | Mimatsu |
| 2009/0313447 A1 | 12/2009 | Nguyen et al. |
| 2009/0313503 A1 | 12/2009 | Atluri et al. |
| 2009/0319534 A1 | 12/2009 | Gokhale |
| 2009/0319585 A1 | 12/2009 | Gokhale |
| 2009/0320029 A1 | 12/2009 | Kottomtharayil |
| 2009/0320137 A1 | 12/2009 | White et al. |
| 2009/0327477 A1 | 12/2009 | Madison, Jr. et al. |
| 2010/0011178 A1 | 1/2010 | Feathergill |
| 2010/0017647 A1 | 1/2010 | Callaway et al. |
| 2010/0030984 A1 | 2/2010 | Erickson |
| 2010/0049929 A1 | 2/2010 | Nagarkar et al. |
| 2010/0049930 A1 | 2/2010 | Pershin |
| 2010/0070466 A1 | 3/2010 | Prahlad et al. |
| 2010/0070474 A1 | 3/2010 | Lad |
| 2010/0070725 A1 | 3/2010 | Prahlad et al. |
| 2010/0070726 A1 | 3/2010 | Ngo et al. |
| 2010/0082672 A1 | 4/2010 | Kottomtharayil |
| 2010/0094948 A1 | 4/2010 | Ganesh et al. |
| 2010/0106691 A1 | 4/2010 | Preslan et al. |
| 2010/0107158 A1 | 4/2010 | Chen et al. |
| 2010/0107172 A1 | 4/2010 | Calinescu et al. |
| 2010/0161919 A1 | 6/2010 | Dodgson et al. |
| 2010/0186014 A1 | 7/2010 | Vaghani et al. |
| 2010/0211829 A1 | 8/2010 | Ziskind et al. |
| 2010/0228913 A1 | 9/2010 | Czezatke et al. |
| 2010/0242096 A1 | 9/2010 | Varadharajan et al. |
| 2010/0257523 A1 | 10/2010 | Frank |
| 2010/0262586 A1 | 10/2010 | Rosikiewicz et al. |
| 2010/0262794 A1 | 10/2010 | De Beer et al. |
| 2010/0280999 A1 | 11/2010 | Atluri et al. |
| 2010/0299309 A1 | 11/2010 | Maki et al. |
| 2010/0299666 A1 | 11/2010 | Agbaria et al. |
| 2010/0306173 A1 | 12/2010 | Frank |

(56) References Cited

U.S. PATENT DOCUMENTS

| | | |
|---|---|---|
| 2010/0306486 A1 | 12/2010 | Balasubramanian et al. |
| 2010/0325471 A1 | 12/2010 | Mishra et al. |
| 2010/0325727 A1 | 12/2010 | Neystad et al. |
| 2010/0332401 A1 | 12/2010 | Prahlad |
| 2010/0332454 A1 | 12/2010 | Prahlad et al. |
| 2010/0332456 A1 | 12/2010 | Prahlad et al. |
| 2010/0332479 A1 | 12/2010 | Prahlad |
| 2010/0332629 A1 | 12/2010 | Cotugno et al. |
| 2010/0332818 A1 | 12/2010 | Prahlad |
| 2010/0333100 A1 | 12/2010 | Miyazaki et al. |
| 2010/0333116 A1 | 12/2010 | Prahlad |
| 2011/0004586 A1 | 1/2011 | Cherryholmes et al. |
| 2011/0010515 A1 | 1/2011 | Ranade |
| 2011/0016467 A1 | 1/2011 | Kane |
| 2011/0022811 A1 | 1/2011 | Kirihata et al. |
| 2011/0023114 A1 | 1/2011 | Diab et al. |
| 2011/0035620 A1 | 2/2011 | Elyashev et al. |
| 2011/0047541 A1 | 2/2011 | Yamaguchi et al. |
| 2011/0061045 A1 | 3/2011 | Phillips |
| 2011/0072430 A1 | 3/2011 | Mani |
| 2011/0087632 A1 | 4/2011 | Subramanian et al. |
| 2011/0107025 A1 | 5/2011 | Urkude et al. |
| 2011/0107331 A1 | 5/2011 | Evans et al. |
| 2011/0161299 A1 | 6/2011 | Prahlad |
| 2011/0179414 A1 | 7/2011 | Goggin et al. |
| 2011/0185355 A1 | 7/2011 | Chawla et al. |
| 2011/0191559 A1 | 8/2011 | Li et al. |
| 2011/0202728 A1 | 8/2011 | Nichols et al. |
| 2011/0202734 A1 | 8/2011 | Dhakras et al. |
| 2011/0208928 A1 | 8/2011 | Chandra et al. |
| 2011/0213754 A1 | 9/2011 | Bindal |
| 2011/0219144 A1 | 9/2011 | Amit et al. |
| 2011/0225277 A1 | 9/2011 | Freimuth et al. |
| 2011/0239013 A1 | 9/2011 | Muller |
| 2011/0246430 A1 | 10/2011 | Prahlad et al. |
| 2011/0252208 A1 | 10/2011 | Ali et al. |
| 2011/0264786 A1 | 10/2011 | Kedem et al. |
| 2012/0016840 A1 | 1/2012 | Lin et al. |
| 2012/0017027 A1 | 1/2012 | Baskakov et al. |
| 2012/0017043 A1 | 1/2012 | Aizman et al. |
| 2012/0017114 A1 | 1/2012 | Timashev et al. |
| 2012/0054736 A1 | 3/2012 | Arcese et al. |
| 2012/0072685 A1 | 3/2012 | Otani |
| 2012/0079221 A1 | 3/2012 | Sivasubramanian et al. |
| 2012/0084262 A1 | 4/2012 | Dwarampudi et al. |
| 2012/0084769 A1 | 4/2012 | Adi et al. |
| 2012/0096149 A1 | 4/2012 | Sunkara et al. |
| 2012/0110328 A1 | 5/2012 | Pate et al. |
| 2012/0131295 A1 | 5/2012 | Nakajima |
| 2012/0131578 A1 | 5/2012 | Ciano et al. |
| 2012/0136832 A1 | 5/2012 | Sadhwani |
| 2012/0150815 A1 | 6/2012 | Parfumi |
| 2012/0150818 A1 | 6/2012 | Vijayan Retnamma et al. |
| 2012/0150826 A1 | 6/2012 | Vijayan Retnamma et al. |
| 2012/0151084 A1 | 6/2012 | Stathopoulos et al. |
| 2012/0159232 A1 | 6/2012 | Shimada et al. |
| 2012/0167083 A1 | 6/2012 | Suit |
| 2012/0209812 A1* | 8/2012 | Bezbaruah .......... G06F 11/1451 707/646 |
| 2012/0221843 A1 | 8/2012 | Bak et al. |
| 2012/0233285 A1 | 9/2012 | Suzuki |
| 2012/0254119 A1 | 10/2012 | Kumarasamy et al. |
| 2012/0254364 A1 | 10/2012 | Vijayan |
| 2012/0254824 A1 | 10/2012 | Bansold |
| 2012/0278287 A1 | 11/2012 | Wilk |
| 2012/0278571 A1 | 11/2012 | Fleming et al. |
| 2012/0278799 A1 | 11/2012 | Starks et al. |
| 2012/0290802 A1 | 11/2012 | Wade et al. |
| 2012/0324183 A1 | 12/2012 | Chiruvolu et al. |
| 2012/0331248 A1 | 12/2012 | Kono et al. |
| 2013/0024641 A1 | 1/2013 | Talagala et al. |
| 2013/0024722 A1 | 1/2013 | Kotagiri |
| 2013/0036418 A1 | 2/2013 | Yadappanavar et al. |
| 2013/0042234 A1 | 2/2013 | Deluca et al. |
| 2013/0054533 A1 | 2/2013 | Hao et al. |
| 2013/0061014 A1 | 3/2013 | Prahlad et al. |
| 2013/0074181 A1 | 3/2013 | Singh |
| 2013/0080841 A1 | 3/2013 | Reddy et al. |
| 2013/0086580 A1 | 4/2013 | Simonsen et al. |
| 2013/0117744 A1 | 5/2013 | Klein et al. |
| 2013/0173771 A1 | 7/2013 | Ditto et al. |
| 2013/0204849 A1 | 8/2013 | Chacko |
| 2013/0227558 A1 | 8/2013 | Du et al. |
| 2013/0232215 A1 | 9/2013 | Gupta et al. |
| 2013/0232480 A1 | 9/2013 | Winterfeldt et al. |
| 2013/0238562 A1 | 9/2013 | Kumarasamy |
| 2013/0262390 A1 | 10/2013 | Kumarasamy et al. |
| 2013/0262638 A1 | 10/2013 | Kumarasamy et al. |
| 2013/0262801 A1 | 10/2013 | Sancheti et al. |
| 2013/0268931 A1 | 10/2013 | O'Hare et al. |
| 2013/0290267 A1 | 10/2013 | Dwarampudi et al. |
| 2013/0311429 A1 | 11/2013 | Agetsuma |
| 2013/0326260 A1 | 12/2013 | Wei et al. |
| 2014/0006858 A1 | 1/2014 | Helfman et al. |
| 2014/0007097 A1 | 1/2014 | Chin et al. |
| 2014/0007181 A1 | 1/2014 | Sarin et al. |
| 2014/0052892 A1 | 2/2014 | Klein et al. |
| 2014/0059380 A1 | 2/2014 | Krishnan |
| 2014/0075440 A1 | 3/2014 | Prahlad et al. |
| 2014/0089266 A1 | 3/2014 | Une et al. |
| 2014/0095816 A1 | 4/2014 | Hsu et al. |
| 2014/0115285 A1 | 4/2014 | Arcese et al. |
| 2014/0136803 A1 | 5/2014 | Qin |
| 2014/0156684 A1 | 6/2014 | Zaslaysky et al. |
| 2014/0181038 A1 | 6/2014 | Pawar et al. |
| 2014/0181044 A1 | 6/2014 | Pawar et al. |
| 2014/0181046 A1 | 6/2014 | Pawar et al. |
| 2014/0188803 A1 | 7/2014 | James et al. |
| 2014/0196038 A1 | 7/2014 | Kottomtharayil et al. |
| 2014/0196039 A1 | 7/2014 | Kottomtharayil et al. |
| 2014/0201151 A1 | 7/2014 | Kumarasamy et al. |
| 2014/0201157 A1 | 7/2014 | Pawar et al. |
| 2014/0201162 A1 | 7/2014 | Kumarasamy et al. |
| 2014/0201170 A1 | 7/2014 | Vijayan et al. |
| 2014/0237537 A1 | 8/2014 | Manmohan et al. |
| 2014/0244610 A1 | 8/2014 | Raman et al. |
| 2014/0259015 A1 | 9/2014 | Chigusa et al. |
| 2014/0278530 A1 | 9/2014 | Bruce et al. |
| 2014/0282514 A1 | 9/2014 | Carson et al. |
| 2014/0330874 A1 | 11/2014 | Novak et al. |
| 2014/0337295 A1 | 11/2014 | Haselton et al. |
| 2014/0344323 A1 | 11/2014 | Pelavin et al. |
| 2014/0372384 A1* | 12/2014 | Long ................. G06F 16/21 707/679 |
| 2015/0058382 A1 | 2/2015 | St. Laurent |
| 2015/0067393 A1 | 3/2015 | Madani et al. |
| 2015/0074536 A1 | 3/2015 | Varadharajan et al. |
| 2015/0120928 A1 | 4/2015 | Gummaraju et al. |
| 2015/0121122 A1 | 4/2015 | Towstopiat et al. |
| 2015/0134607 A1 | 5/2015 | Magdon-Ismail et al. |
| 2015/0142745 A1 | 5/2015 | Tekade et al. |
| 2015/0160884 A1 | 6/2015 | Scales et al. |
| 2015/0161015 A1 | 6/2015 | Kumarasamy et al. |
| 2015/0163172 A1 | 6/2015 | Mudigonda et al. |
| 2015/0227438 A1 | 8/2015 | Jaquette |
| 2015/0227602 A1 | 8/2015 | Ramu |
| 2015/0242283 A1 | 8/2015 | Simoncelli et al. |
| 2015/0248333 A1 | 9/2015 | Aravot |
| 2015/0293817 A1 | 10/2015 | Subramanian et al. |
| 2015/0317216 A1 | 11/2015 | Hsu et al. |
| 2015/0347165 A1 | 12/2015 | Lipchuk et al. |
| 2015/0347430 A1 | 12/2015 | Ghosh |
| 2015/0363413 A1 | 12/2015 | Ghosh |
| 2015/0370652 A1 | 12/2015 | He et al. |
| 2015/0378758 A1 | 12/2015 | Duggan et al. |
| 2015/0378771 A1 | 12/2015 | Tarasuk-Levin |
| 2015/0378833 A1 | 12/2015 | Misra et al. |
| 2015/0378849 A1 | 12/2015 | Liu et al. |
| 2015/0381711 A1 | 12/2015 | Singh et al. |
| 2016/0019317 A1 | 1/2016 | Pawar et al. |
| 2016/0070623 A1 | 3/2016 | Derk |
| 2016/0092467 A1 | 3/2016 | Lee et al. |
| 2016/0132400 A1 | 5/2016 | Pawar et al. |
| 2016/0154709 A1 | 6/2016 | Mitkar et al. |

(56) References Cited

U.S. PATENT DOCUMENTS

| | | |
|---|---|---|
| 2016/0170844 A1 | 6/2016 | Long et al. |
| 2016/0188413 A1 | 6/2016 | Abali et al. |
| 2016/0202916 A1 | 7/2016 | Cui et al. |
| 2016/0283335 A1 | 9/2016 | Yao et al. |
| 2016/0306706 A1 | 10/2016 | Pawar et al. |
| 2016/0308722 A1 | 10/2016 | Kumarasamy et al. |
| 2016/0335007 A1 | 11/2016 | Ryu et al. |
| 2016/0350391 A1 | 12/2016 | Vijayan et al. |
| 2017/0090972 A1 | 3/2017 | Ryu et al. |
| 2017/0123939 A1 | 5/2017 | Maheshwara et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2017/0249220 A1 | 8/2017 | Kumarasamy et al. |
| 2017/0262204 A1 | 9/2017 | Dornemann et al. |
| 2017/0262347 A1 | 9/2017 | Dornemann |
| 2017/0262350 A1 | 9/2017 | Dornemann |
| 2017/0264589 A1 | 9/2017 | Hunt et al. |
| 2017/0286230 A1 | 10/2017 | Zamir |
| 2017/0371547 A1 | 12/2017 | Fruchtman et al. |
| 2018/0067955 A1 | 3/2018 | Pawar et al. |
| 2018/0075166 A1 | 3/2018 | Pawar et al. |
| 2018/0089031 A1 | 3/2018 | Mitkar et al. |
| 2018/0095845 A1 | 4/2018 | Sanakkayala et al. |
| 2018/0095846 A1 | 4/2018 | Sanakkayala et al. |
| 2018/0095855 A1 | 4/2018 | Sanakkayala et al. |
| 2018/0113623 A1 | 4/2018 | Sancheti |
| 2018/0143879 A1 | 5/2018 | Dornemann |
| 2018/0143880 A1 | 5/2018 | Dornemann |
| 2018/0173454 A1 | 6/2018 | Dornemann et al. |
| 2018/0181598 A1 | 6/2018 | Pawar et al. |
| 2018/0253192 A1 | 9/2018 | Varadharajan et al. |
| 2018/0260157 A1 | 9/2018 | Dornemann et al. |
| 2018/0275913 A1 | 9/2018 | Mitkar et al. |
| 2018/0276022 A1 | 9/2018 | Mitkar et al. |
| 2018/0276083 A1 | 9/2018 | Mitkar et al. |
| 2018/0276084 A1 | 9/2018 | Mitkar et al. |
| 2018/0276085 A1 | 9/2018 | Mitkar et al. |
| 2018/0285202 A1 | 10/2018 | Bhagi et al. |
| 2018/0285353 A1 | 10/2018 | Rao et al. |
| 2018/0300168 A1 | 10/2018 | Deshpande et al. |
| 2018/0307510 A1 | 10/2018 | Kottomtharayil et al. |
| 2018/0314694 A1 | 11/2018 | Dornemann et al. |
| 2018/0329636 A1 | 11/2018 | Dornemann et al. |
| 2019/0012339 A1 | 1/2019 | Kumarasamy et al. |
| 2019/0026187 A1 | 1/2019 | Gulam et al. |
| 2019/0065069 A1 | 2/2019 | Sancheti et al. |
| 2019/0090305 A1 | 3/2019 | Hunter et al. |
| 2019/0340088 A1 | 11/2019 | Sanakkayala et al. |
| 2019/0347120 A1 | 11/2019 | Kottomtharayil et al. |
| 2019/0369901 A1 | 12/2019 | Dornemann et al. |
| 2019/0391742 A1 | 12/2019 | Bhagi et al. |
| 2020/0142612 A1 | 5/2020 | Dornemann et al. |
| 2020/0142782 A1 | 5/2020 | Dornemann |
| 2020/0142783 A1 | 5/2020 | Dornemann |
| 2020/0174894 A1 | 6/2020 | Dornemann |
| 2020/0174895 A1 | 6/2020 | Dornemann |
| 2020/0183728 A1 | 6/2020 | Deshpande et al. |
| 2020/0241908 A1 | 7/2020 | Dornemann et al. |
| 2020/0265024 A1 | 8/2020 | Pawar et al. |
| 2020/0301891 A1 | 9/2020 | Dornemann |
| 2020/0327163 A1 | 10/2020 | Pawar et al. |
| 2020/0334113 A1 | 10/2020 | Sanakkayala et al. |
| 2020/0334201 A1 | 10/2020 | Pawar et al. |

FOREIGN PATENT DOCUMENTS

| | | |
|---|---|---|
| EP | 0467546 A2 | 1/1992 |
| EP | 0541281 A2 | 5/1993 |
| EP | 0774715 A1 | 5/1997 |
| EP | 0809184 A1 | 11/1997 |
| EP | 0817040 A2 | 1/1998 |
| EP | 0899662 A1 | 3/1999 |
| EP | 0981090 A1 | 2/2000 |
| WO | WO 95/13580 | 5/1995 |
| WO | WO 99/12098 | 3/1999 |
| WO | WO 2006/052872 | 5/2006 |

OTHER PUBLICATIONS

Armstead et al., "Implementation of a Campus-wide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Brandon, J., "Virtualization Shakes Up Backup Strategy," <http://www.computerworld.com>, Feb. 21, 2008, 3 pages.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Celesti, et al., "Improving Virtual Machine Migration in Federated Cloud Environments", 2010, pp. 61-67.

Chan, et al., "An Approach to High Availability for Cloud Servers with Snapshot Mechanism," 2012, pp. 1-6.

Chen et al., "When Virtual Is Better Than Real", IEEE 2001, pp. 133-138.

Chervenak, et al., "Protecting File Systems—A Survey of Backup Techniques," 1998, pp. 17-31.

Chiappetta, Marco, "ESA Enthusiast System Architecture," <http://hothardware.com/Articles/NVIDIA-ESA-Enthusiast-System-Architecture/>, Nov. 5, 2007, 2 pages.

CommVault Systems, Inc., "A CommVault White Paper: VMware Consolidated Backup (VCB) Certification Information Kit," 2007, 23 pages.

CommVault Systems, Inc., "CommVault Solutions—VMware," <http://www.commvault.com/solutions/vmware/>, accessed Apr. 30, 2014, 1 page.

CommVault Systems, Inc., "Enhanced Protection and Manageability of Virtual Servers," Partner Solution Brief, 2008, 6 pages.

Cully, et al., "Remus: High Availability via Asynchronous Virtual Machine Replication", 2008, pp. 161-174.

Data Protection for Large Vmware and Vblock Environments Using EMC Avamar Applied Technology, Nov. 2010, EMC Corporation, 26 pages.

Davis, D., "3 VMware Consolidated Backup (VCB) Utilities You Should Know," Petri IT Knowlegebase, <http://www.petri.co.il/vmware-consolidated-backup-utilities.htm>, Nov. 16, 2007, 3 pages.

Davis, D., "Understanding VMware VMX Configuration Files," Petri IT Knowledgebase, <http://www.petri.co.il/virtual_vmware_vmx_configuration_files.htm>, Nov. 16, 2007, 3 pages.

Davis, D., "VMware Server & Workstation Disk Files Explained," Petri IT Knowledgebase, <http://www.petri.co.il/virtual_vmware_files_explained.htm>, May 3, 2008, 3 pages.

Davis, D., "VMware Versions Compared," Petri IT Knowledgebase, <http://www.petri.co.il/virtual_vmware_versions_compared.htm>, Nov. 16, 2007, 3 pages.

Deng, et al., "Fast Saving and Restoring Virtual Machines with Page Compression", 2011, pp. 150-157.

Eitel, "Backup and Storage Management in Distributed Heterogeneous Environments," IEEE, Jun. 12-16, 1994, pp. 124-126.

Eldos Callback File System product information from https://www.eldos.com/clients/104-345.php retrieved on Dec. 30, 2016 in 2 pages.

Eldos Usermode filesystem for your Windows applications—Callback File System® (CBFS®)—Create and manage virtual filesystems and disks from your Windows applications retrieved from https://eldos.com/cbfs on Dec. 30, 2016 in 4 pages.

Fraser, et al., "Safe Hardware Access With the Xen Virtual Machine Monitor", 1st Workshop on Operating System and Architectural Support for the demand IT InfraStructure (OASIS), 2004, pp. 1-10.

(56) References Cited

OTHER PUBLICATIONS

Gait, "The Optical File Cabinet: A Random-Access File System for Write-Once Optical Disks," IEEE Computer, vol. 21, No. 6, pp. 11-22 (Jun. 1988) (see in particular figure 5 in p. 15 and recitation in claim 5).
Galan et al. "Service Specification in Cloud Environments Based on Extension to Oper Standards" COMSWARE 09 Jun. 16-19 Dublin, Ireland ACM.
Gibson, et al., "Implementing Preinstallation Environment Media for Use in User Support," 2007, pp. 129-130.
Granger, et al., "Survivable Storage Systems", 2001, pp. 184-195.
Gupta, et al., "GPFS-SNC: An enterprise storage framework for virtual-machine clouds", 2011, pp. 1-10.
Haselhorst, et al., "Efficient Storage Synchronization for Live Migration in Cloud Infrastructures", 2011, pp. 511-518.
Hirofuchio, Takahiro et al., "A live storage migration mechanism over wan and its performance evaluation," 2009, pp. 67-74.
Hirofuchi, et al., "Enabling Instantaneous Relocation of Virtual Machines with a Lightweight VMM Extension", 2010, pp. 73-83.
Hu, et al., "Virtual Machine based Hot-spare Fault-tolerant System", 2009, pp. 429-432.
Hu, Wenjin et al., "A Quantitative Study of Virtual Machine Live Migration," 2013, pp. 1-10.
Huff, "Data Set Usage Sequence Number," IBM Technical Disclosure Bulletin, vol. 24, No. 5, Oct. 1981 New York, US, pp. 2404-2406.
Ibrahim, Shadi et al., "CLOUDLET: Towards MapReduce Implementation on Virtual Machines," 2009, pp. 65-66.
Ismail et al., Architecture of Scalable Backup Service for Private Cloud, IEEE 2013, pp. 174-179.
Dander, "Launching Storage-Area Net," Data Communications, US, McGraw Hill, NY, vol. 27, No. 4 (Mar. 21, 1998), pp. 64-72.
Javaraiah, et al., "Backup for Cloud and Disaster Recovery for Consumers and SMBs," 2008, pp. 1-3.
Jhawar et al., "Fault Tolerance Management in Cloud Computing: A System-Level Perspective", IEEE Systems Journal 7.2, 2013, pp. 288-297.
Jo, et al., "Efficient Live Migration of Virtual Machines Using Shared Storage", 2013, pp. 1-10.
Kashyap "RLC—A Reliable approach to Fast and Efficient Live Migration of Virtual Machines in the Clouds" IEEE 2014 IEEE Computer Society.
Kim, et al., "Availability Modeling and Analysis of a Virtualized System," 2009, pp. 365-371.
Kuo, et al., "A Hybrid Cloud Storage Architecture for Service Operational High Availability", 2013, pp. 487-492.
Li et al. "Comparing Containers versus Virtual Machines for Achieving High Availability" 2015 IEEE.
Liang, et al., "A virtual disk environment for providing file system recovery", 2006, pp. 589-599.
Lu et al.. "Virtual Machine Memory Access Tracing with Hypervisor Exclusive Cache", Usenix Annual Technical Conference, 2007, pp. 29-43.
Mao, et al., "Read-Performance Optimization for Deduplication-Based Storage Systems in the Cloud", 2014, pp. 1-22.
Microsoft Corporation, "How NTFS Works," Windows Server TechCenter, <http://technet2.mircrosoft.com/windowsserver/en/library/8cc5891d-bf8e-4164-862d-dac5418c5948 . . . >, updated Mar. 28, 2003, internet accessed Mar. 26, 2008, 26 pages.
Migrate a Virtual Machine with Storage vMotion in the vSphere Client. http://pubs.vmware.com/vsphere-51/advanced/print/jsp?topic=/com.vmware.vsphere.vcent . . . Retrieved Aug. 12, 2014; 2 pages.
Nance et al., "Virtual Machine Introspection: Observation or Interference?", 2008 IEEE.
Ng, Chun-Ho et al., "Live Deduplication Storage of Virtual Machine Images in an Open-Source Cloud," 2011, pp. 80-99.
Nicolae, Bogdan et al., "A Hybrid Local Storage Transfer Scheme for Live Migration of 1/0 Intensive Workloads," 2012, pp. 85-96.

Reingold, B. et al., "Cloud Computing: The Intersection of Massive Scalability, Data Security and Privacy (Part I)," LegalWorks, a Thomson Business, Jun. 2009, 5 pages.
Reingold, B. et al., "Cloud Computing: Industry and Government Developments (Part II)," LegalWorks, Sep. 2009, 5 pages.
Reingold, B. et al., "Cloud Computing: Whose Law Governs the Cloud? (Part III)," LegalWorks, Jan.-Feb. 2010, 6 pages.
Rosenblum et al., "The Design and Implementation of a Log-Structured File System," Operating Systems Review SIGOPS, vol. 25, No. 5, New York, US, pp. 1-15 (May 1991).
Sanbarrow.com, "Disktype-table," <http://sanbarrow.com/vmdk/disktypes.html>, internet accessed on Apr. 30, 2014, 4 pages.
Sanbarrow.com, "Files Used by a VM," <http://sanbarrow.com/vmx/vmx-files-used-by-a-vm.html>, internet accessed on Apr. 30, 2014, 1 page.
Sanbarrow.com, "Monolithic Versus Split Disks," <http://sanbarrow.com/vmdk/monolithicversusspllit.html>, internet accessed on Jul. 14, 2008, 2 pages.
Somasundaram et al., Information Storage and Management. 2009, pp. 251-281.
Tran, et al., "Efficient Cooperative Backup with Decentralized Trust Management", 2012, pp. 1-25.
Travostino, et al., "Seamless live migration of virtual machines over the MAN/WAN", 2006, pp. 901-907.
Tudoran, Radu et al., "Adaptive File Management for Scientific Workflows on the Azure Cloud," 2013, pp. 273-281.
Vaghani, "Virtual Machine File System", 2010, pp. 57-70.
VMware, Inc., "VMware Solution Exchange (VSX)" <http://www.vmware.com/appliances/learn/ovf.html>, 2014, 3 pages.
VMware, Inc., "OVF, Open Virtual Machine Format Specification, version 0.9," White Paper, <http://www.vmware.com>, Sep. 7, 2007, 50 pages.
VMware, Inc., "The Open Virtual Machine Format Whitepaper for OVF Specification, version 0.9," White Paper, <http://www.vmware.com>, 2007, 16 pages.
VMware, Inc., "Understanding VMware Consolidated Backup," White Paper, <http://www.vmware.com>, accessed Apr. 30, 2014, 11 pages.
VMware, Inc., "Using VMware Infrastructure for Backup and Restore," Best Practices, <http://www.vmware.com>, accessed Apr. 30, 2014, 20 pages.
VMware, Inc., "Virtual Disk API Programming Guide," <http://www.vmware.com>, Revision Apr. 11, 2008, 2008, 44 pages.
VMware, Inc., "Virtual Disk Format 1.1," VMware Technical Note, <http://www.vmware.com>, Revision Nov. 13, 2007, Version 1.1, 2007, 18 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "VMware Consolidated Backup," Product Datasheet, <https://www.vmware.com>, 2009, 2 pages.
VMware, Inc., "VMware Consolidated Backup, Improvements in Version 3.5," Information Guide, <http://www.vmware.com>, accessed Apr. 30, 2014, 11 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks_types_gsx.html>, 2008, 2 pages.
VMware, Inc., "VMware OVF Tool," Technical Note, <http://www.vmware.com>, 2007, 4 pages.
VMware, Inc., "VMware Workstation 5.0, Snapshots in a Process Tree," <http://www.vmware.com/support/ws5/doc/ws_preserve_sshot_tree.html>, accessed Apr. 30, 2014, 1 page.
VMware, Inc., "VMware Workstation 5.0, Snapshots in a Linear Process," <http:/www.vmware.com/support/ws5/doc/ws_preserve_sshot_linear.html>, internet accessed on 2014, 1 page.

(56) References Cited

OTHER PUBLICATIONS

VMware, Inc., "VMware Workstation 5.5, What Files Make Up a Virtual Machine?" <http://www.vmware.com/support/ws55/doc/ws_learning_files_in_a_vm.html>, 2014, 2 pages.

VMware Storage VMotion—Non-Disruptive Live Migration for Virtual Machine Storage Disk Files. Copyright 2009 VMware, Inc.; 2 pages.

Vrable, et al., "Cumulus: Filesystem Backup to the Cloud", 2009, pp. 1-28.

VSphere Storage vMotion: Storage Management & Virtual Machine Migration. http://www.vmware.com/products /vsphere/features/storage-vmotion Retrieved Aug. 12, 2014; 6 pages.

Wikipedia, "Cloud computing," <http://en.wikipedia.org/wiki/Cloud-computing>, 2009, 11 pages.

Wikipedia, "Cluster (file system)," <http://en.wikipedia.org/wiki/Cluster_%28file_system%29>, Sep. 2, 2008, 1 page.

Wikipedia, "Cylinder-head-sector," <http://en.wikipedia.org/wiki/Cylinder-head-sector>, Jan. 4, 2009, 6 pages.

Wikipedia, "File Allocation Table," <http://en.wikipedia.org/wiki/File_Allocation_Table>, Dec. 3, 2008, 12 pages.

Wikipedia, "Logical Disk Manager," <http://en.wikipedia.org/wiki/Logical_Disk_Manager>, Nov. 16, 2007, 3 pages.

Wikipedia, "Logical Volume Management," <http://en.wikipedia.org/wiki/Logical_volume_management>, Oct. 27, 2008, 3 pages.

Wikipedia, "Storage Area Network," <http://en.wikipedia.org/wiki/Storage_area_network>, Dec. 5, 2008, 5 pages.

Wikipedia, "Virtualization," <http://en.wikipedia.org/wiki/Virtualization>, Apr. 29, 2014, 7 pages.

Wood, et al., "Disaster Recovery as a Cloud Service: Economic Benefits & Deployment Challenges", 2010, pp. 1-7.

Yang, et al., "Toward Reliable Data Delivery for Highly Dynamic Mobile Ad Hoc Networks," 2012, pp. 111-124.

Yang, et al., "TRAP-Array: A Disk Array Architecture Providing Timely Recovery to Any Point-in-time," 2006, pp. 1-12.

Yoshida et al., "Orthros: A High-Reliability Operating System with Transmigration of Processes," 2013, pp. 318-327.

Zhao, et al., "Adaptive Distributed Load Balancing Algorithm based on Live Migration of Virtual Machines in Cloud", 2009, pp. 170-175.

International Search Report and Written Opinion for PCT/US2011/054374, dated May 2, 2012, 7 pages.

International Preliminary Report on Patentability and Written Opinion for PCT/US2011/054374, dated Apr. 2, 2013, 9 pages.

* cited by examiner

FIG. 8A

Time 0 Bitmap (802):

|   | 0 | 1 | 2 | 3 | 4 |
|---|---|---|---|---|---|
| 0 | 0 | 0 | 0 | 0 | 0 |
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |

Time 1 Bitmap (804):

|   | 0 | 1 | 2 | 3 | 4 |
|---|---|---|---|---|---|
| 0 | 0 | 1 | 0 | 0 | 0 |
| 1 | 0 | 0 | 0 | 0 | 0 |
| 2 | 0 | 0 | 0 | 0 | 0 |
| 3 | 0 | 0 | 0 | 1 | 0 |
| 4 | 0 | 0 | 0 | 0 | 0 |

Time 2 Bitmap (806):

|   | 0 | 1 | 2 | 3 | 4 |
|---|---|---|---|---|---|
| 0 | 0 | 1 | 0 | 1 | 0 |
| 1 | 0 | 1 | 0 | 0 | 0 |
| 2 | 1 | 0 | 0 | 0 | 0 |
| 3 | 0 | 0 | 0 | 0 | 0 |
| 4 | 0 | 0 | 0 | 1 | 0 |

Time 3 Bitmap (808):

|   | 0 | 1 | 2 | 3 | 4 |
|---|---|---|---|---|---|
| 0 | 0 | 1 | 0 | 1 | 0 |
| 1 | 0 | 1 | 0 | 0 | 0 |
| 2 | 1 | 0 | 1 | 1 | 0 |
| 3 | 0 | 0 | 0 | 0 | 0 |
| 4 | 0 | 0 | 0 | 1 | 0 |

FIG. 8B

Time 0 Bitmap (852):

|   | 0 | 1 | 2 | 3 | 4 |
|---|---|---|---|---|---|
| 0 | 0 | 0 | 0 | 0 | 0 |
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |

Time 1 Bitmap (854):

|   | 0 | 1 | 2 | 3 | 4 |
|---|---|---|---|---|---|
| 0 | 0 | D1/B12 | 0 | D1/B18 | 0 |
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |

Time 2 Bitmap (856):

|   | 0 | 1 | 2 | 3 | 4 |
|---|---|---|---|---|---|
| 0 | 0 | D1/B12 | 0 | D1/B18 | D2/B12 |
| 1 | 0 | 0 | 0 | 0 | 0 |
| 2 | D1/B28 | 0 | 0 | 0 | 0 |
| 3 | 0 | 0 | 0 | 0 | 0 |
| 4 | 0 | 0 | 0 | 0 | 0 |

Time 3 Bitmap (858):

|   | 0 | 1 | 2 | 3 | 4 |
|---|---|---|---|---|---|
| 0 | 0 | D1/B12 | 0 | D1/B18 | D2/B24 |
| 1 | 0 | 0 | 0 | 0 | 0 |
| 2 | D1/B28 | 0 | 0 | 0 | 0 |
| 3 | 0 | D2/B99 | D3/B7 | D2/B25 | 0 |
| 4 | 0 | 0 | 0 | 0 | 0 |

TIME-BASED VIRTUAL MACHINE REVERSION

INCORPORATION BY REFERENCE TO ANY PRIORITY APPLICATIONS

This application is a Continuation of U.S. patent application Ser. No. 15/924,004 filed on Mar. 16, 2018, which claims the benefit of U.S. Provisional Patent Application No. 62/476,554, filed Mar. 24, 2017, and titled "VIRTUAL MACHINE RECOVERY POINT GENERATION"; U.S. Provisional Patent Application No. 62/476,556, filed Mar. 24, 2017, and titled "TIME-BASED VIRTUAL MACHINE REVERSION"; and U.S. Provisional Patent Application No. 62/476,595, filed Mar. 24, 2017, and titled "VIRTUAL MACHINE RECOVERY POINT SELECTION", the disclosure of which are hereby incorporated by reference in their entirety for all purposes herein. Further, this disclosure is related to the following disclosures that were filed on Mar. 16, 2018, the same date as the parent disclosure, and which are hereby incorporated by reference in their entirety for all purposes herein: U.S. application Ser. No. 15/923,979, titled "VIRTUAL MACHINE RECOVERY POINT GENERATION"; U.S. application Ser. No. 15/923,960, titled "VIRTUAL MACHINE RECOVERY POINT SELECTION"; U.S. application Ser. No. 15/923,985, titled "CONSISTENT VIRTUAL MACHINE REPLICATION"; and U.S. application Ser. No. 15/923,930, titled "BUFFERED VIRTUAL MACHINE REPLICATION." Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc. Enterprises also increasingly view their stored data as a valuable asset and look for solutions that leverage their data. For instance, data analysis capabilities, information management, improved data presentation and access features, and the like, are in increasing demand.

Virtual machines may be used to provide users with access to different operating environments. Further, virtual machines may be used to provide multiple users with their own separate computing environment on a single computing system. In some cases, it is desirable for multiple instances of the virtual machines to, at least initially, have the same configuration. Thus, sometimes a virtual machine may be replicated multiple times on a computing system or across multiple computing systems.

SUMMARY

In some cases, it is desirable for a replicated virtual machine to maintain the same configuration, state, or data as the virtual machine from which it was replicated. In other words, when changes are made to the data of one virtual machine, sometimes it is desirable for those changes to be replicated at another virtual machine. However, it is not always possible to determine whether changes are made to a virtual machine. In some cases, monitoring the virtual machine can cause changes to the virtual machine. In other cases, monitoring the virtual machine may use virtual machine resources resulting in a reduction of the computing resources available to users.

Further, in some cases, it is desirable to revert a virtual machine to a prior state. For example, if malicious software is detected at the virtual machine, it may be desirable to revert to a state prior to the installation of the malicious software. As another example, if a file is accidentally deleted or if data is mistakenly changed, it may be desirable to revert to an earlier version of the virtual machine prior to the deleted file or lost data. In some additional examples, it may be desirable to revert to a prior version of the virtual machine for testing purposes, to prepare the virtual machine for a new user, or to synchronize the state of multiple virtual machines.

In some embodiments, reverting to a previous version of a virtual machine can be accomplished by loading a backup of the virtual machine or a corresponding virtual machine disk of the virtual machine. In some cases, loading a backup of the virtual machine can be time-consuming. For example, if the virtual machine disk is large, it may take time to retrieve from the secondary storage and to load onto a virtual machine at a primary store. This problem can be exacerbated if many users are accessing the secondary storage or if the network at the information management system is congested. Further, delays in restoring or reverting to an earlier version of the virtual machine can result in user downtime, which can result in delayed work, disgruntled users, and other problems relating to delayed or lost computing resource access.

Embodiments disclosed herein relate to systems and method for replicating virtual machines, creating recovery points, and restoring or reverting to earlier versions of virtual machines. In some cases, the systems and methods herein can be used to restore a more current version of a virtual machine. For example, after reverting to an older version of a virtual machine, a desired file may be exported or it may be determined that the earlier version of the virtual machine did not include the desired data, and the virtual machine may be reverted to a more current version of the virtual machine.

In certain embodiments, a filter driver is disclosed that can monitor input/output commands (such as read and write commands) between a virtual machine, or a input/output framework of a virtual machine, and a virtual machine disk. The input/output commands can be captured by the filter driver and used to create recovery points for virtual machine that corresponding to particular time periods for the virtual machine. This filter driver may be inserted between the input/output layer and the virtual machine disk. Advantageously, in certain embodiments, by inserting the filter driver within the command flow between the virtual machine and the virtual machine disk, the virtual machine can be monitored with little or no reduction in the performance of the virtual machine.

Further, in certain embodiments, a bitmap, or other representation of the virtual machine, can be generated based at least in part on the captured input/output commands. This bitmap may be used to identify data blocks that have been modified between two versions of the virtual machine. Using this bitmap, a virtual machine may be reverted or restored to another version of the virtual machine by replacing modified data blocks and without replacing the entire virtual machine disk. Advantageously, in certain embodiments, by replacing the modified data blocks and reducing the number of data blocks to be replaced at the virtual machine, the time required to revert or restore a virtual machine to another version of the virtual machine may be reduced.

BRIEF DESCRIPTION OF THE DRAWINGS

FIGS. 8A and 8B illustrate examples of recovery point bitmaps according to an illustrative embodiment of the present invention.

DETAILED DESCRIPTION

Detailed descriptions and examples of systems and methods according to one or more illustrative embodiments of the present invention may be found in the section entitled Generation and use of Recovery Points, as well as in the section entitled Example Embodiments, and also in FIGS. 3-12 herein. Furthermore, components and functionality for generating recovery points and using the recovery points to revert to a different version of a virtual machine may be configured and/or incorporated into information management systems such as those described herein in FIGS. 1A-1H and 2A-2C.

Various embodiments described herein are intimately tied to, enabled by, and would not exist except for, computer technology. For example, creating recovery points for virtual machines described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
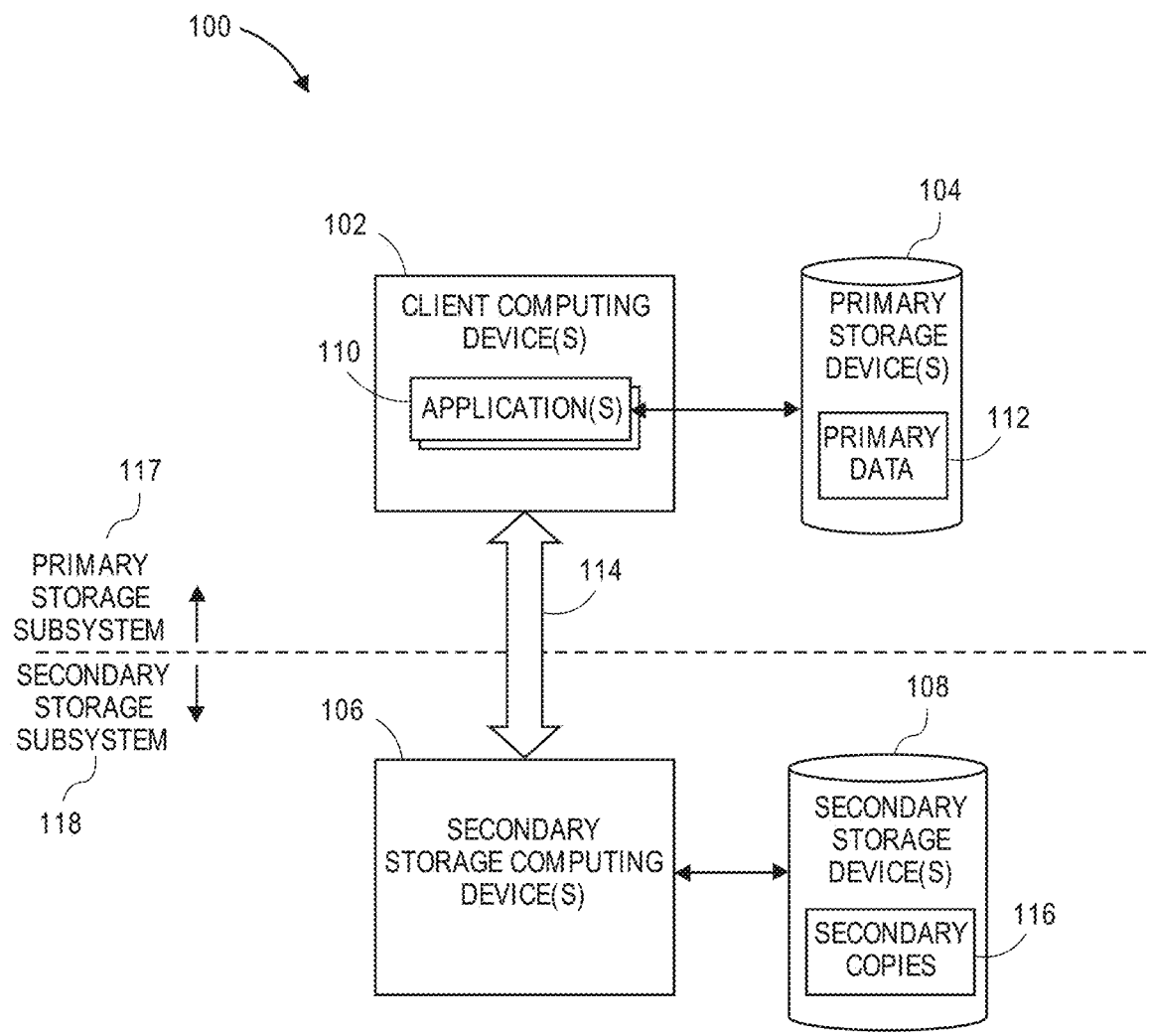
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. Pub. No. 2006/0224846, entitled "System and Method to Support Single Instance Storage Operations";

U.S. Pat. Pub. No. 2014/0201170, entitled "High Availability Distributed Deduplicated Storage System";

U.S. patent application Ser. No. 14/721,971, entitled "Replication Using Deduplicated Secondary Copy Data";

U.S. Patent Application No. 62/265,339 entitled "Live Synchronization and Management of Virtual Machines across Computing and Virtualization Platforms and Using Live Synchronization to Support Disaster Recovery";

U.S. Patent Application No. 62/273,286 entitled "Redundant and Robust Distributed Deduplication Data Storage System";

U.S. Patent Application No. 62/294,920, entitled "Data Protection Operations Based on Network Path Information";

U.S. Patent Application No. 62/297,057, entitled "Data Restoration Operations Based on Network Path Information"; and U.S. Patent Application No. 62/387,384, entitled "Application-Level Live Synchronization Across Computing Platforms Including Synchronizing Co-Resident Applications To Disparate Standby Destinations And Selectively Synchronizing Some Applications And Not Others".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, DNA/RNA-based memory technology, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1B:
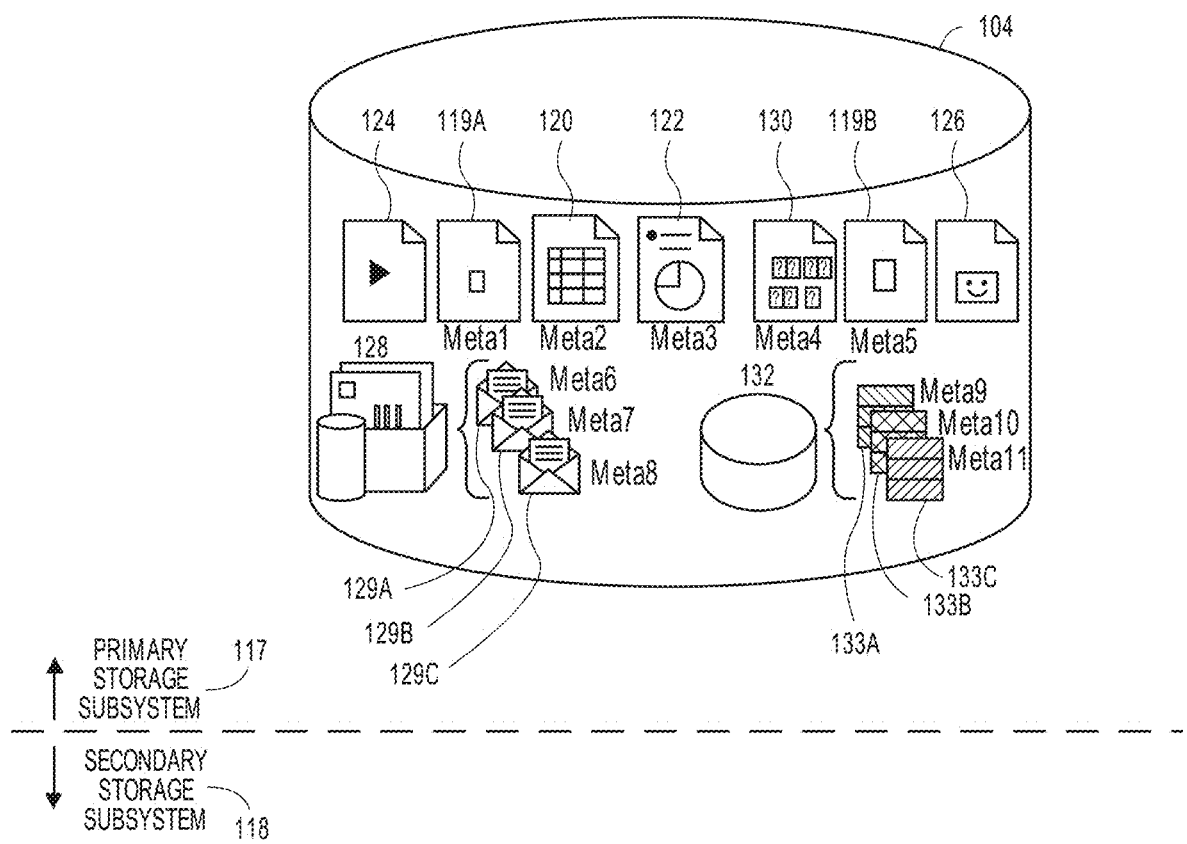
FIG. 1B is a detailed view of a primary storage device, a secondary storage device, and some examples of primary data and secondary copy data.
Figure 1B:
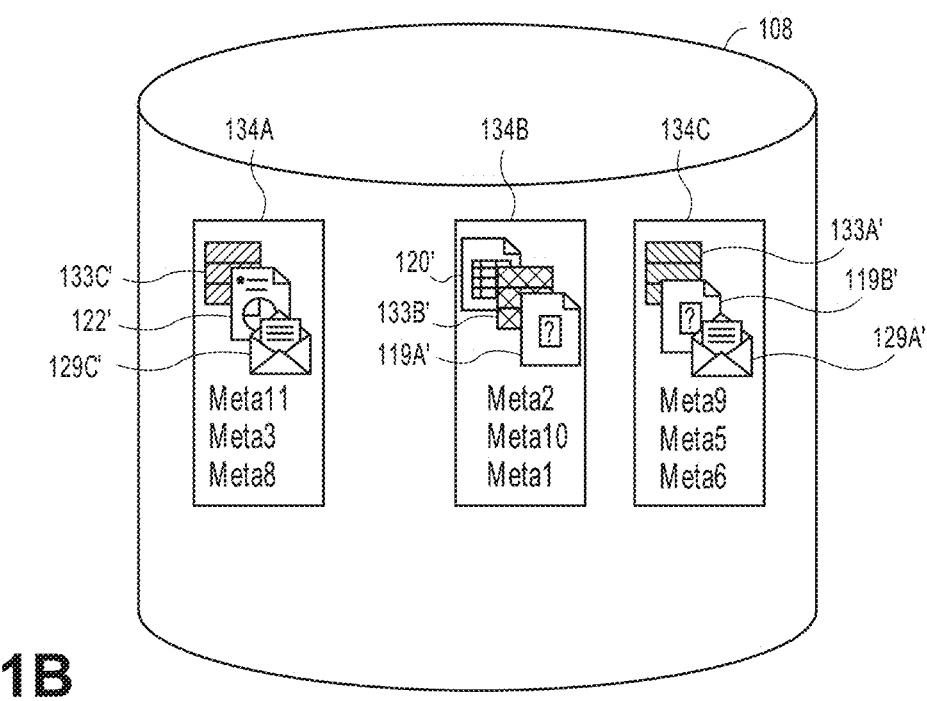
Figure 1C:
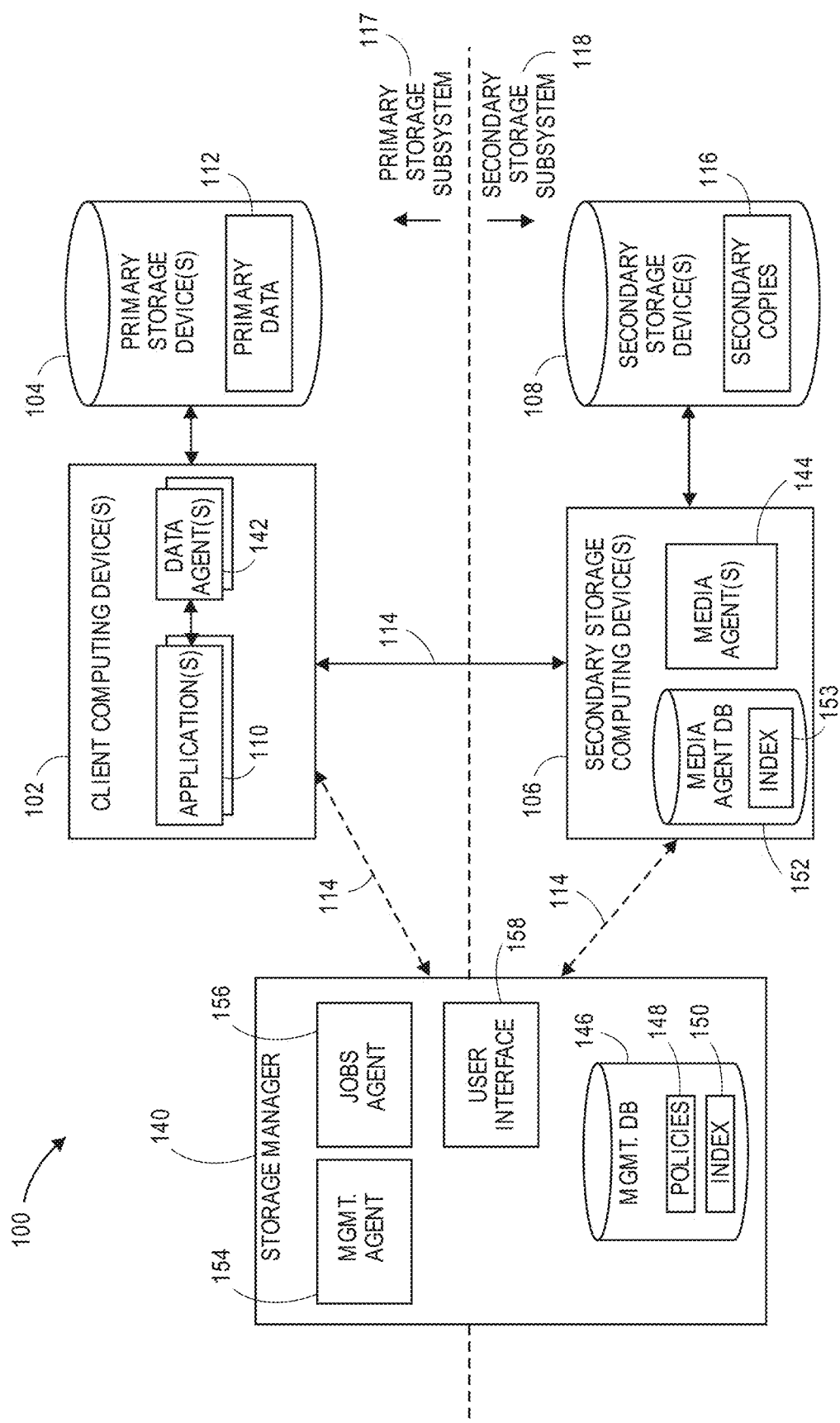
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file system, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

- communicating with data agents 142 and media agents 144, including transmitting instructions, messages, and/or queries, as well as receiving status reports, index information, messages, and/or queries, and responding to same;
- initiating execution of information management operations;
- initiating restore and recovery operations;
- managing secondary storage devices 108 and inventory/capacity of the same;
- allocating secondary storage devices 108 for secondary copy operations;
- reporting, searching, and/or classification of data in system 100;
- monitoring completion of and status reporting related to information management operations and jobs;
- tracking movement of data within system 100;
- tracking age information relating to secondary copies 116, secondary storage devices 108, comparing the age information against retention guidelines, and initiating data pruning when appropriate;
- tracking logical associations between components in system 100;
- protecting metadata associated with system 100, e.g., in management database 146;
- implementing job management, schedule management, event management, alert management, reporting, job history maintenance, user security management, disaster recovery management, and/or user interfacing for system administrators and/or end users of system 100;
- sending, searching, and/or viewing of log files; and
- implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
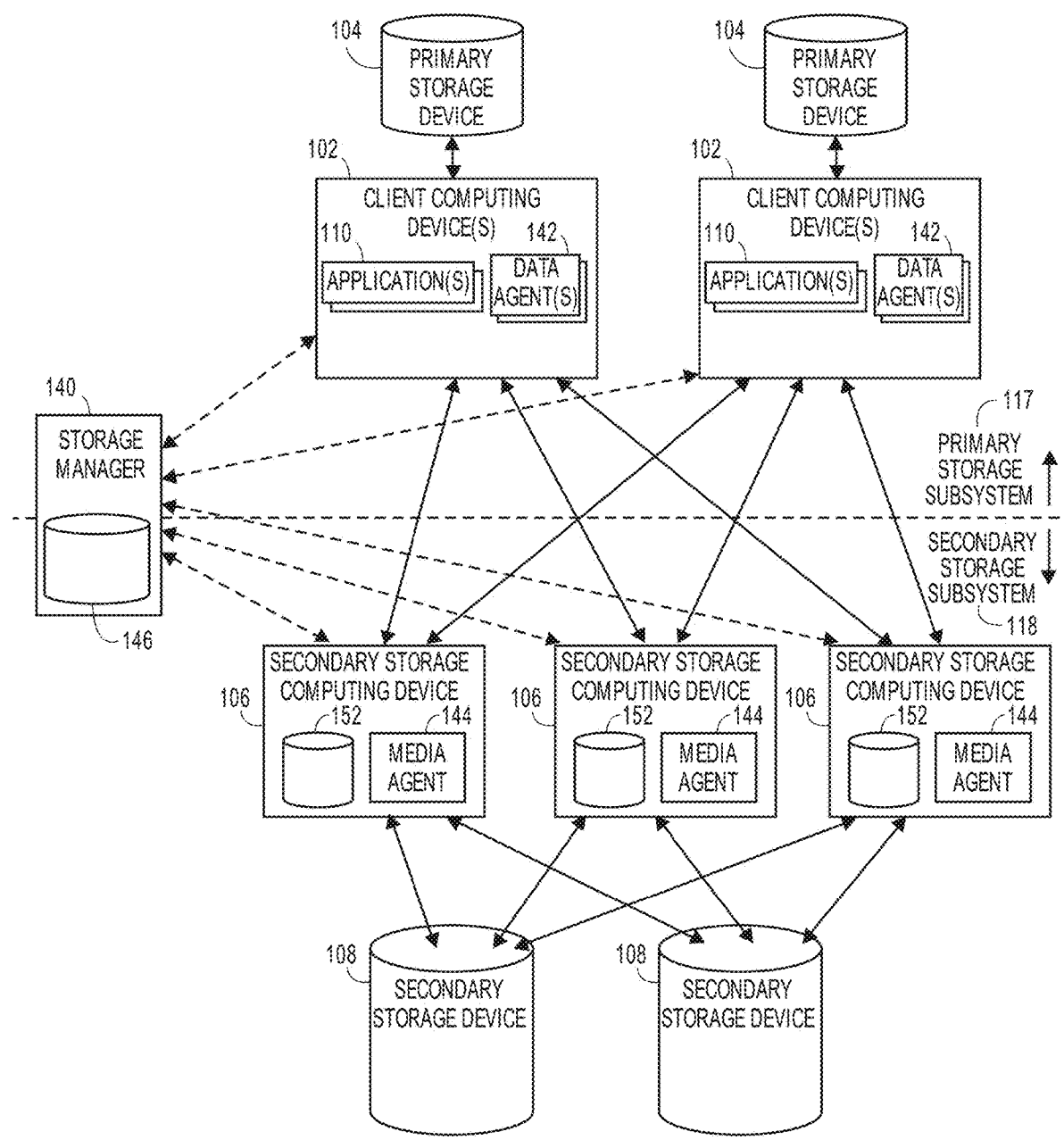
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "online archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.).

Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

- schedules or other timing information, e.g., specifying when and/or how often to perform information management operations;
- the type of secondary copy 116 and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Copy Operations

Figure 1E:
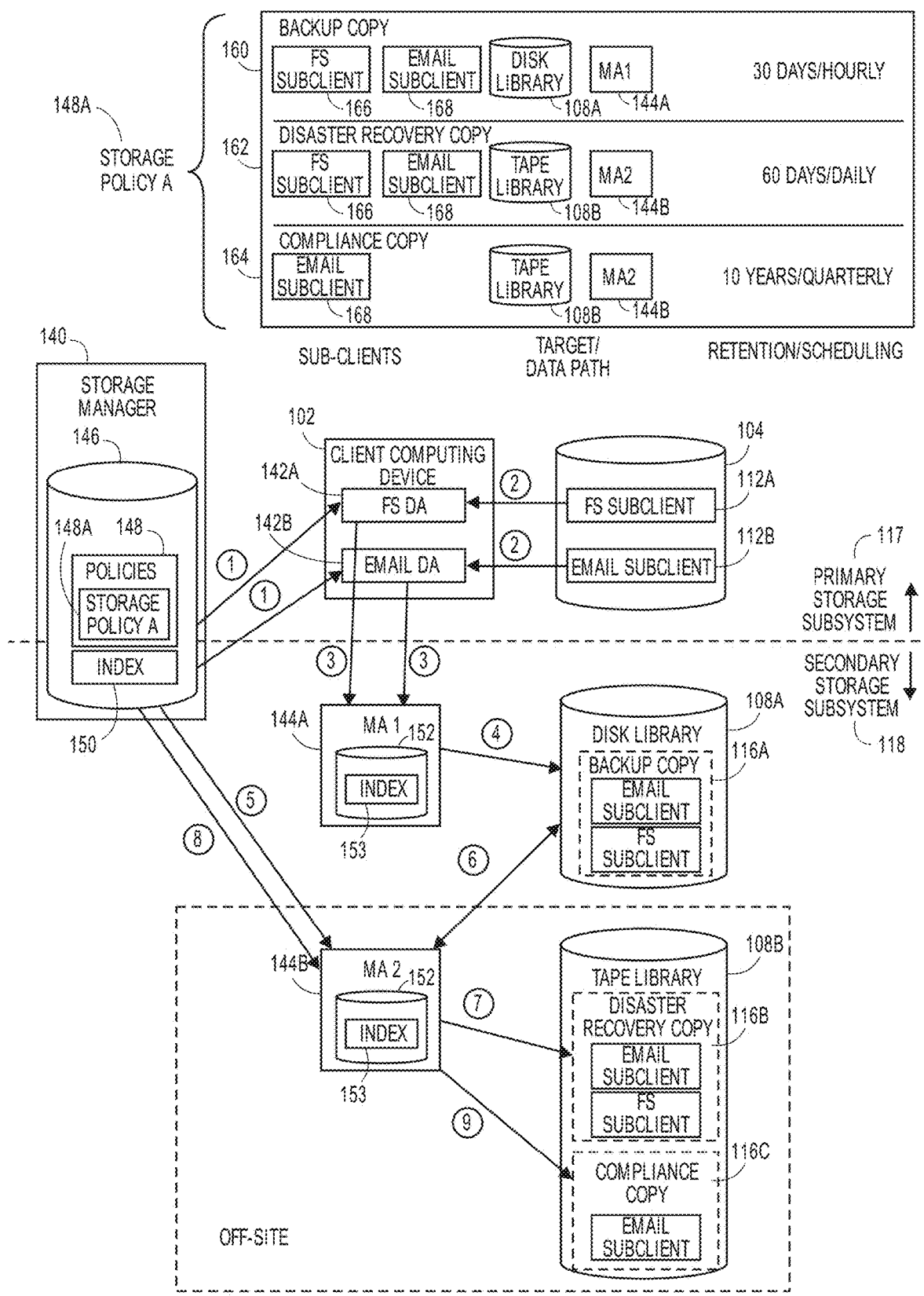
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
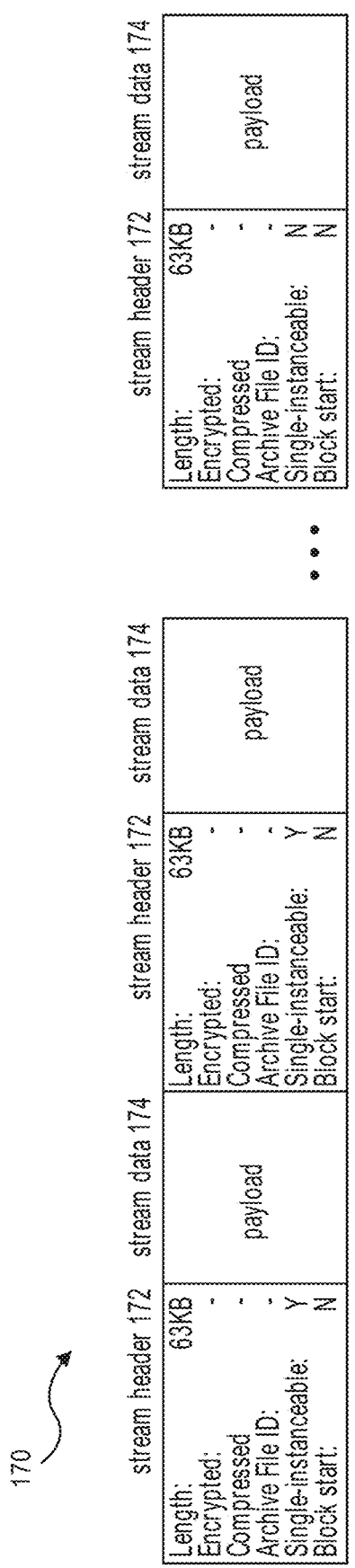
FIGS. 1F-1H are block diagrams illustrating suitable data structures that may be employed by the information management system.
Figure 1G:
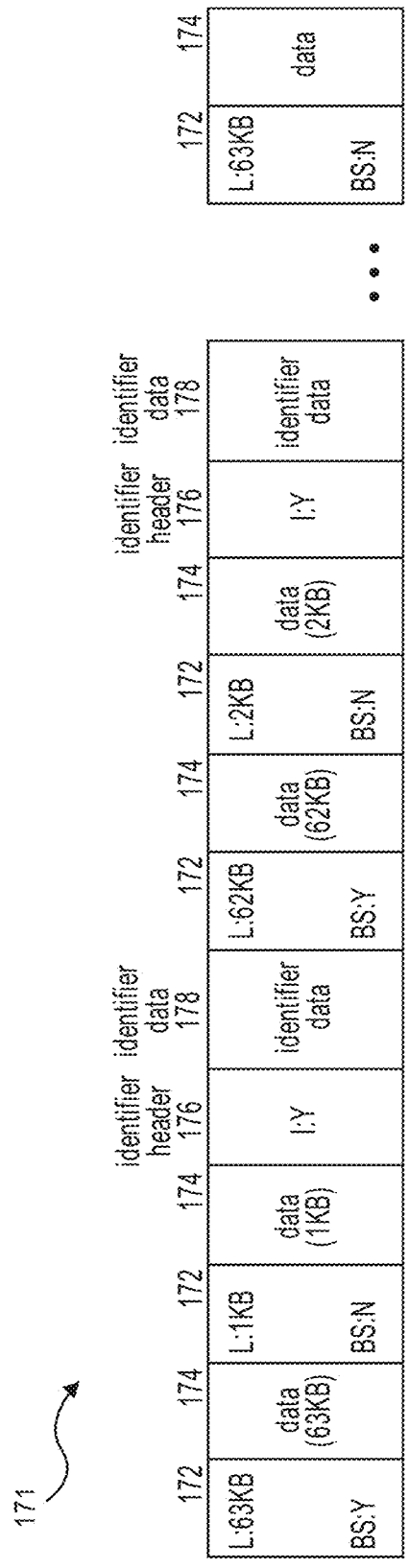

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
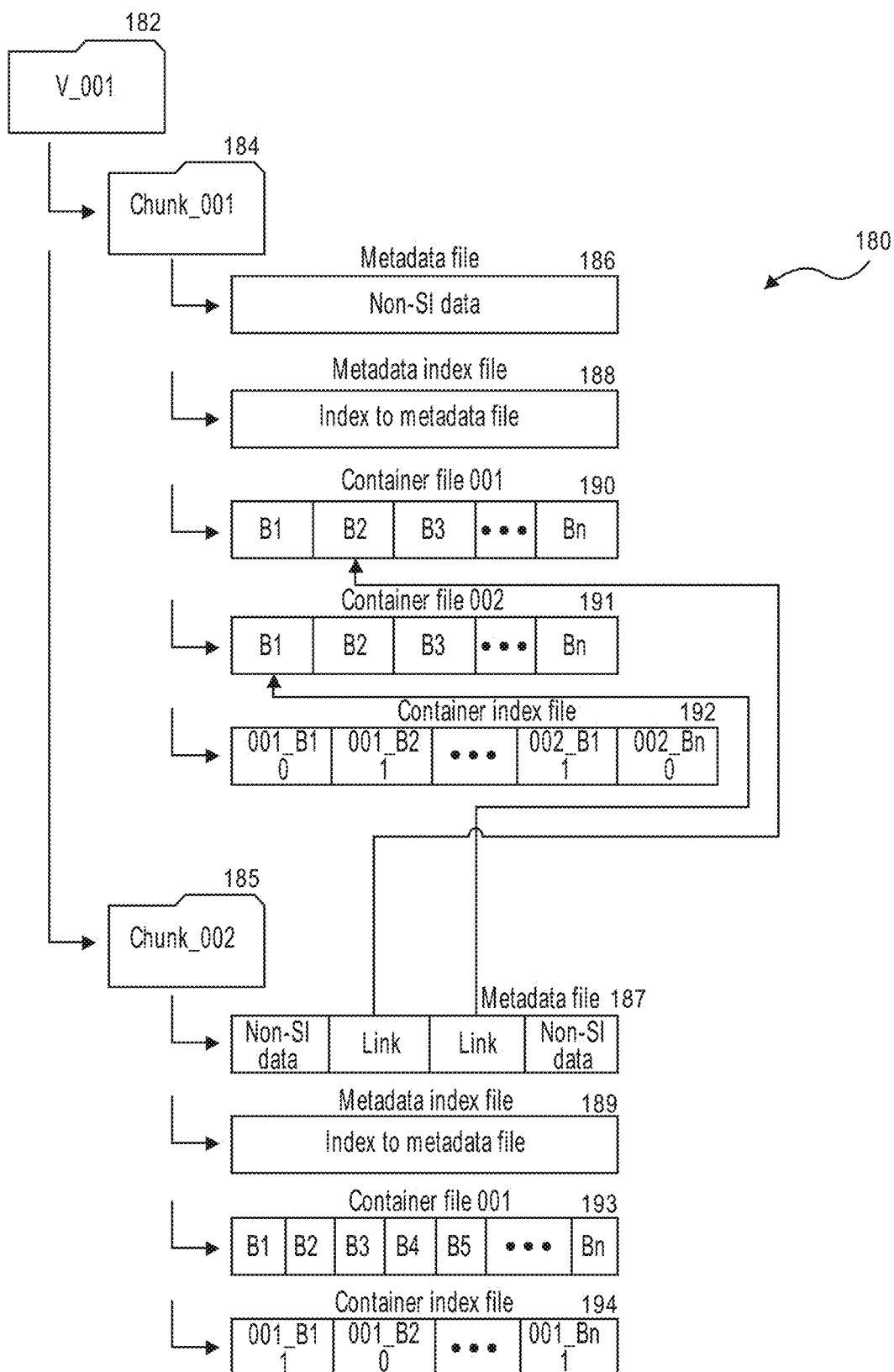

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
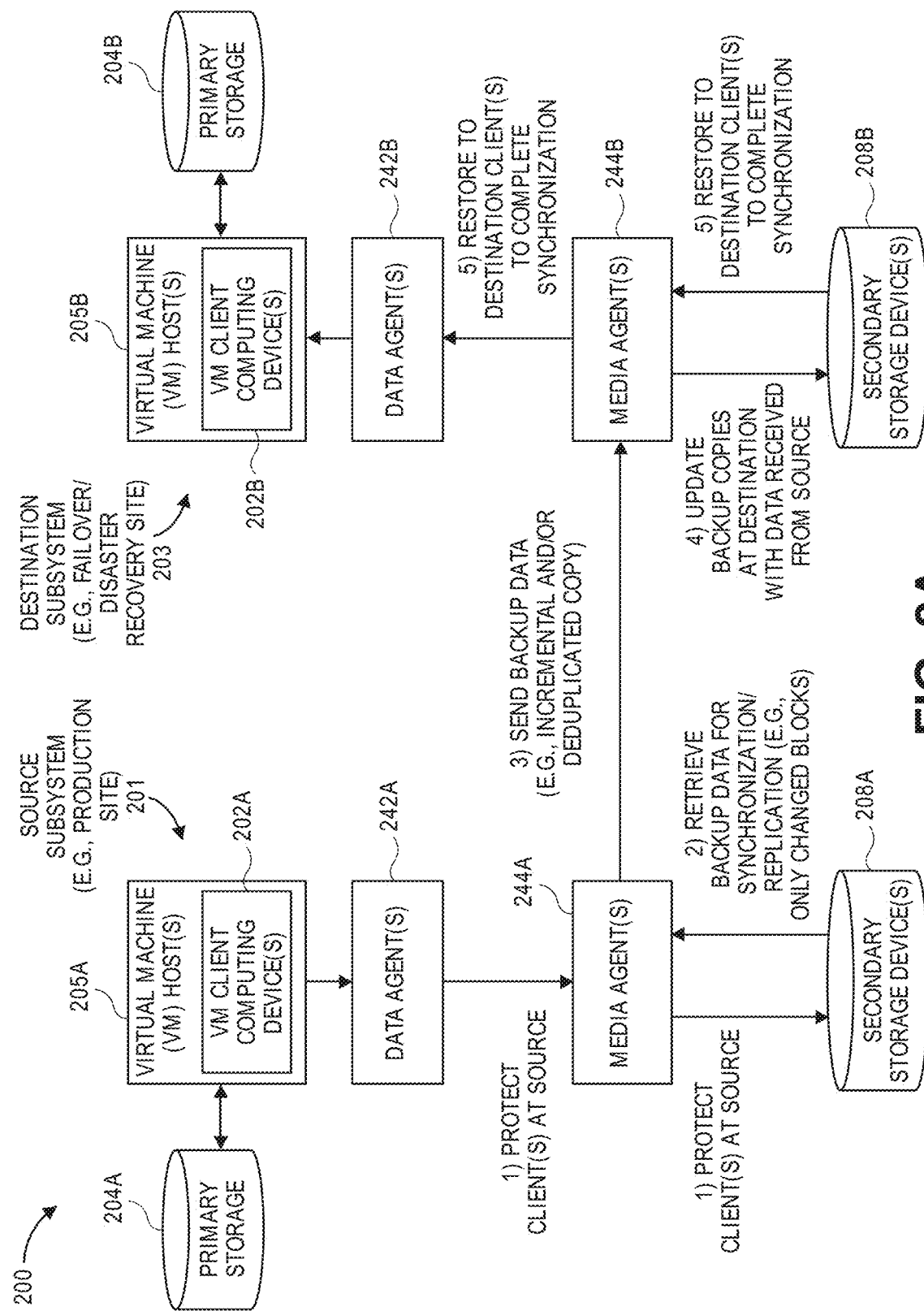
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
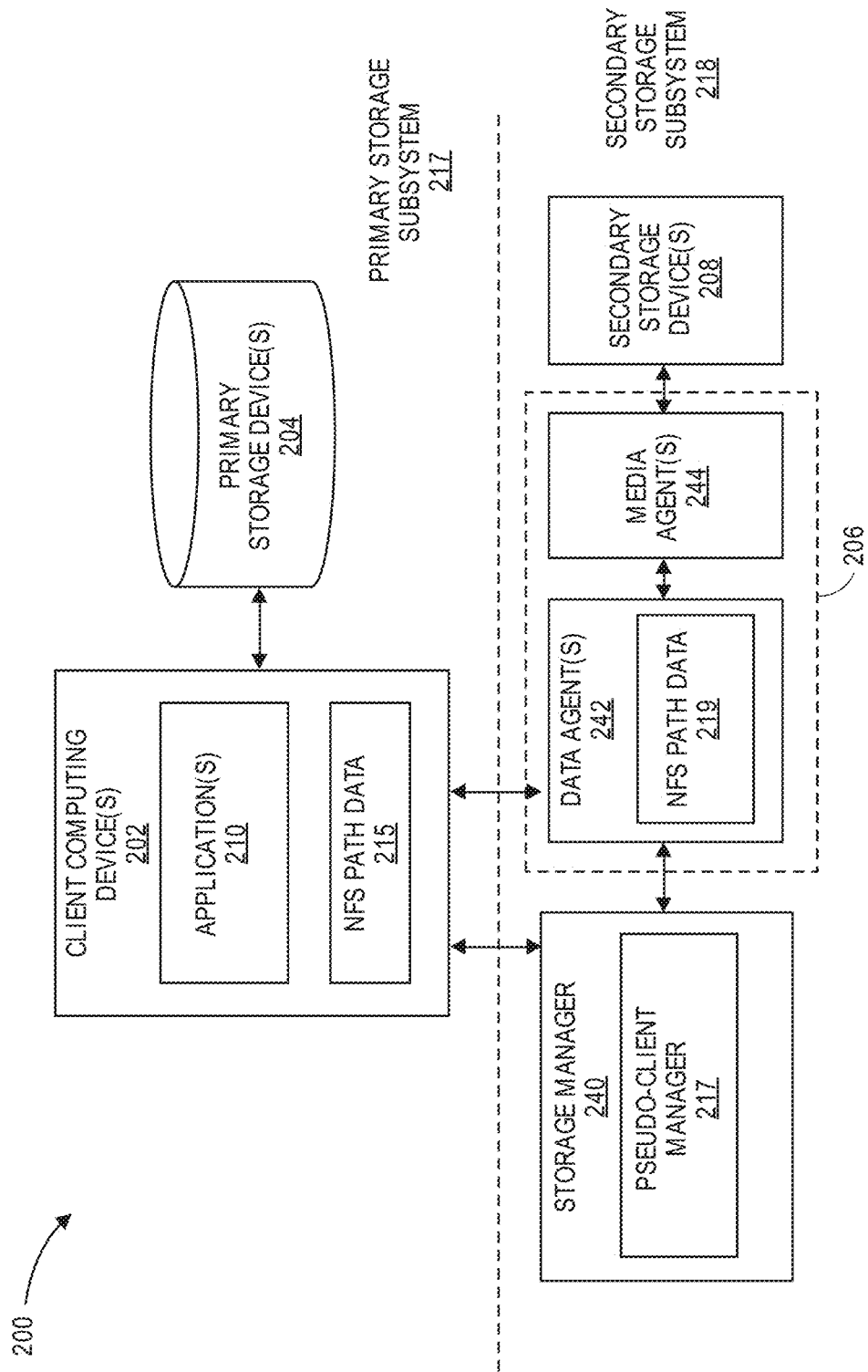
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
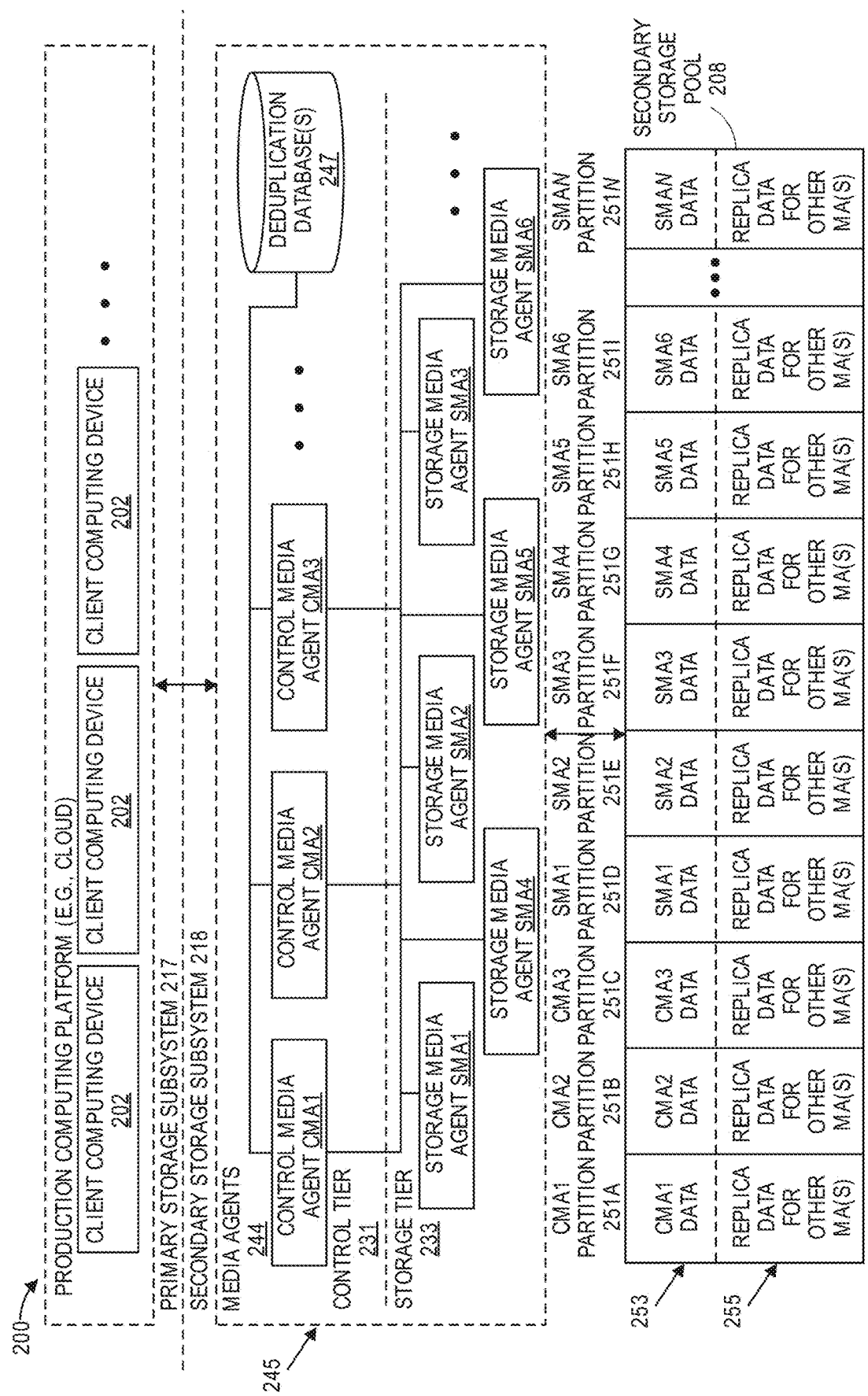
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Generation and Use of Recovery Points

As previously described, there are a number of reasons why it may be desirable to modify a state of a virtual machine to a prior state, or in some cases, a state generated more recently. Modifying the state of the virtual machine may include loading a backed up version of the virtual machine disk of the virtual machine. However, in many cases, the differences between one version of the virtual machine disk and another version of the virtual machine disk may be relatively few compared to the size of the virtual machine disk. Thus, it can be beneficial to replace modified data blocks of the virtual machine disk with data blocks from a secondary storage that correspond to a desired version of the virtual machine while not replacing the unmodified data blocks of the virtual machine disk. Determining which blocks to replace in which blocks to not replace can be determined based at least in part on a data structure, such as a bitmap, that tracks data blocks that are modified during use of the virtual machine. Certain non-limiting example embodiments of tracking modify data blocks, generating the bitmap, and modifying the state of the virtual machine based on a backup of the virtual machine are disclosed herein described in more detail below.

Recovery Point Generation System

Figure 3:
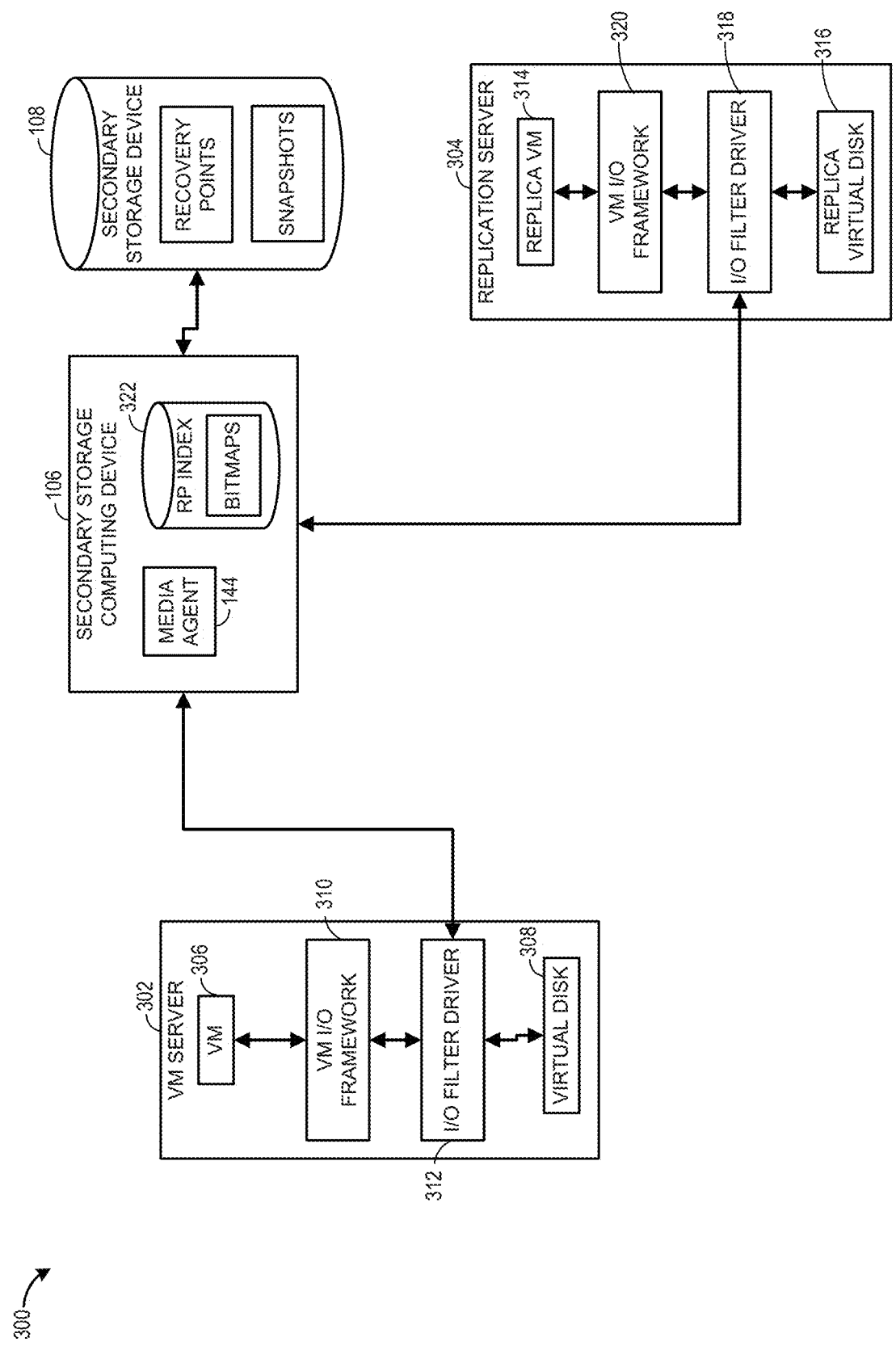
FIG. 3 is a block diagram illustrating some salient portions of a system 300 for creating recovery points of a virtual machine and replicating the virtual machine, according to an illustrative embodiment of the present invention.

FIG. 3 is a block diagram illustrating some salient portions of a system 300 for creating recovery points of a virtual machine and replicating the virtual machine, according to an illustrative embodiment of the present invention. In some embodiments, the system 300 can be part of an information management system 100 and may include one or more of the systems and one or more of the embodiments previously described with respect to the information management system 100. Further, elements of the system 300 may be part of a distributed throughout the information management system 100. For example, the virtual machine (VM) server 302 may be included as part of the primary storage subsystem 117 and the replication server 304 may be part of the primary storage subsystem 117 or the secondary storage subsystem 118.

The VM server 302 may include a computer system configured to create, maintain, or host one or more virtual machines, such as the virtual machine (VM) 306. For example, the VM server 302 may be an ESX server that hosts an ESXi hypervisor from VMware® for managing one or more virtual machines. However, the VM server 302 is not limited to VMware® and may implement other hypervisors or VM management software or systems. Although termed a VM server, in some embodiments, the server 302 may execute or host additional applications or systems independent of one or more virtual machines.

The VM 306 may have a virtual disk 308 (e.g., a VMDK or VHD) for storing one or more data blocks associated with the VM 306. A user may interact with the VM 306 to access data on the virtual disk 308 or to write data to the virtual disk 308. Input/output (I/O) commands received at the VM 306 may be provided to the virtual disk 308 for processing. Alternatively, the VM 306 may process one or more I/O commands to determine a data block at the virtual disk 308 to which to write data or from which to read data. In some embodiments, processing the I/O commands may include providing the I/O commands to a VM I/O framework 310. The VM I/O framework 310 can pass the I/O commands to the virtual disk 308, or may process the I/O commands to determine data blocks to which to write or access at the virtual disk 308.

The VM server 302 may include an I/O filter driver 312. The I/O filter driver 312 may be positioned between the VM I/O framework 310 and the virtual disk 308 in the I/O processing path, which may lead from the VM 306 to the virtual disk 308, or vice versa as illustrated in FIG. 3. The I/O filter driver 312 may intercept or capture I/O commands between the VM I/O framework 310 in the virtual disk 308. The I/O filter driver 312 can determine whether an I/O command is a read or write command. If the I/O command is a write command, the I/O filter driver 312 may provide a copy of the write command to a media agent 144. Alternatively, or in addition, the I/O filter driver 312 may provide to the media agent 144 a copy of one or more data blocks from the virtual disk 308 that are modified by the write command after execution of the write command. In some embodiments, after processing, the I/O filter driver 312 may provide the I/O command to the virtual disk 308 or may permit execution of the I/O command at the virtual disk 308. Alternatively, or in addition, the VM I/O framework 310 may provide a copy of the I/O command to the I/O filter driver 312 and a copy of the write command to the virtual disk 308. In some cases, the VM I/O framework 310 may execute the I/O command at the virtual disk 308. Further, in some embodiments, the VM I/O framework 310 may include the I/O filter driver 312, or its capabilities.

The media agent 144 of the secondary storage computing device 106 may generate a recovery point based at least in part on the one or more I/O commands or data blocks received from the I/O filter driver 312. The recovery points may include a differential backup of the VM 306 or it's corresponding virtual disk 308. In other words, each recovery point may include a backup of data blocks that have been modified since a previous backup of the virtual disk 308. However, unmodified data blocks may not be included in the recovery point. In some cases, the media agent 144 may also obtain a snapshot of the VM 306 or it's corresponding virtual disk 308. The snapshot may include a copy of both modified and unmodified data blocks of the virtual disk 308. In some cases, the snapshot may include a complete copy of the VM 306 or virtual disk 308.

The recovery points created by the media agent 144 may be associated with a particular time point or time period. In some cases, recovery points may be generated on a regular automated basis. For example, a recovery point may be created every five minutes. The frequency with which the recovery points are generated may be user administrator selected or may be based at least in part on the frequency with which data blocks are modified at the virtual disk 308, the frequency of access of the VM 306, the type of data stored at the virtual disk 308, or any other criterion for determining a frequency of recovery point generation.

Creating the recovery points may include generating a data structure, such as a bitmap, that tracks the modified data blocks associated with each recovery point. In some cases, the data structure may include location information, such as a pointer, for locating the modified data block at the secondary storage device 108. The secondary storage device 108 may store backups of the VM 306 or corresponding virtual disk 308. Further, the secondary storage device 108 may store one or more recovery points of the VM 306 or virtual disk 308. In addition, the secondary storage device 108 may store snapshots of the VM 306 or virtual disk 308. The bitmaps, or data structures, associate with each of the recovery points may be stored at the secondary storage device 108. Alternatively, or in addition, the bitmaps may be stored at a recovery point index 322 at the secondary storage computing device 106.

In some embodiments, the I/O filter driver 312 or the media agent 144 may provide a copy of I/O commands to the replication server 304. The replication server 304 may include a replica VM 314 that is a replica or copy of the VM 306. Further, the replication server 304 may include a replica virtual disk 316 that is a replica or copy of the virtual disk 308. The replication server 304 may be configured similarly to the VM server 302. Alternatively, the replication server 304 may be a different type of computing system, but may be capable of hosting or managing a VM.

The I/O filter driver 318 of the replication server 304 can receive the I/O commands from the I/O filter driver 312 or the media agent 144 and can execute the I/O commands on the replica virtual disk 316 or provide the I/O commands to the VM I/O framework 320 to perform the I/O commands on the replica virtual disk 316. Advantageously, in certain embodiments, by providing copies of the I/O commands of the VM 306 to the replica VM 314, a copy of the VM 306 can be maintained at the replication server 304. In some embodiments, the replica VM 314 may be hosted by the VM server 302. In other words, in some cases, the VM 306 can be replicated at the same computing system that is hosting the VM 306. In other cases, as illustrated in FIG. 3, the VM 306, or corresponding virtual disk 308, can be replicated at a destination server, such as the replication server 304, the differs from the VM server 302.

As previously described the media agent 144 may be part of a secondary storage system 118 and may be implemented by a secondary storage computing device 106. Alternatively, the media agent 144 may be implemented by a VM server 302. In some embodiments, the media agent 144 could itself by a VM on the VM server 302.

Example I/O Command Capture Process

Figure 4:
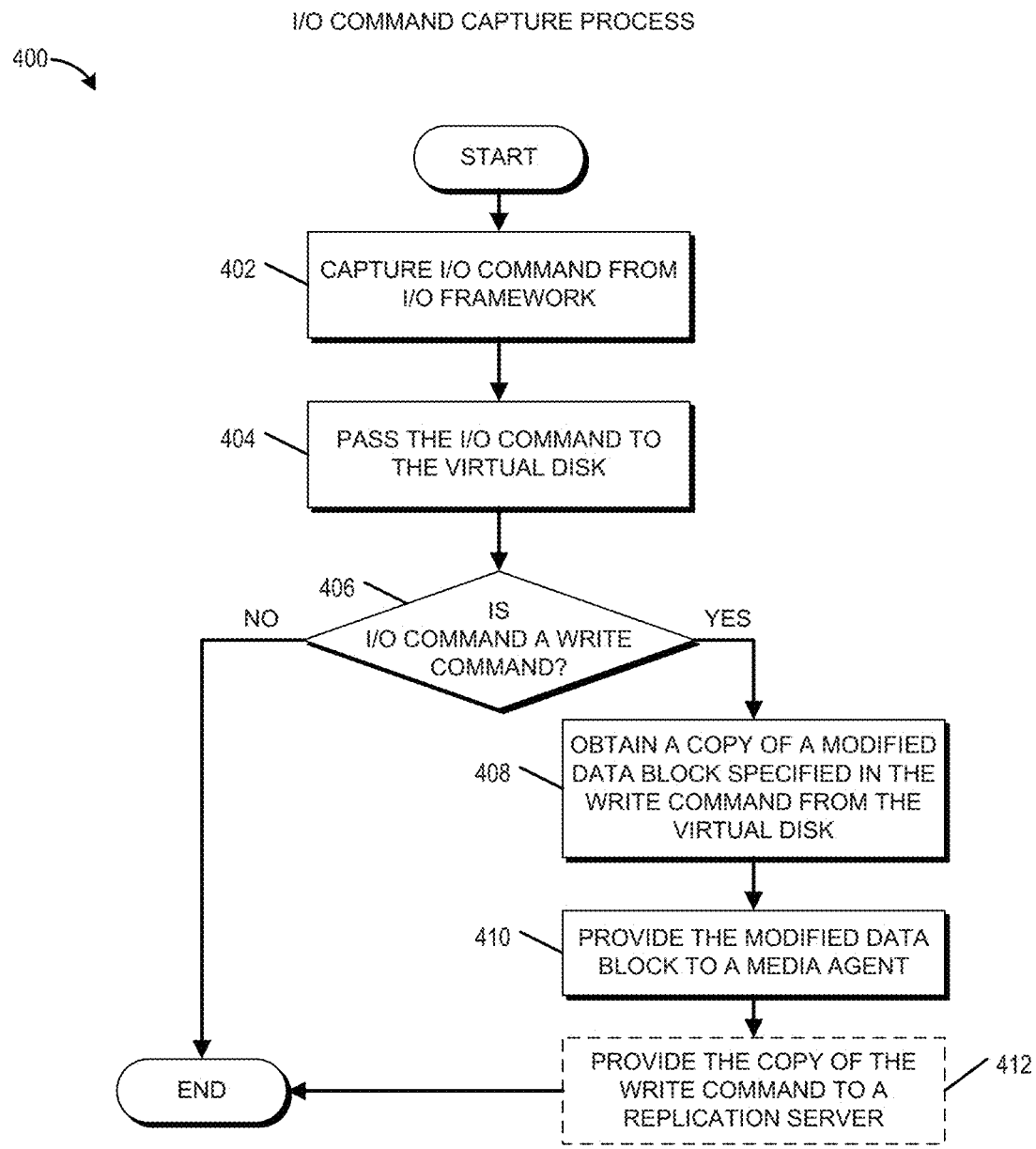
FIG. 4 depicts some salient operations of a I/O command capture process 400 according to an illustrative embodiment of the present invention.

FIG. 4 depicts some salient operations of an I/O command capture process 400 according to an illustrative embodiment of the present invention. The process 400 can be implemented by any system that can intercept or capture an I/O command being provided by a VM or being performed on a virtual disk. The process 400, in whole or in part, can be implemented by, for example, a VM server 302, a VM I/O framework 310, an I/O filter driver 312, a media agent 144, or a secondary storage computing device 106, among others. Although any number of systems, in whole or in part, can implement the process 400, to simplify discussion, the process 400 will be described with respect to particular systems.

The process 400 is primarily described with respect to a virtual machine 306. However, in certain embodiments, the process 400 can be performed independently of a virtual machine. For example, the process 400 may be performed with respect to primary store of a client, and a native file system or a native operating system running on a computing device. As another example, the process 400 may be performed with respect to a container.

The process 400 begins at block 402 where, for example, the I/O filter driver 312 captures an I/O command from the VM I/O framework 310. The I/O filter driver 312 may capture the I/O command by monitoring communications between the VM I/O framework 310 and the virtual disk 308. Alternatively, or in addition, the I/O filter driver 312 may capture the I/O command by monitoring communications between the VM I/O framework 310 and an underlying operating system for the VM server 302. In some embodiments, the I/O filter driver 312 may use an application programmer interface (API) of the VM I/O framework 310 to facilitate monitoring I/O commands at the VM I/O framework 310.

At block 404, the I/O filter driver 312 passes the I/O command to the virtual disk 308. In some embodiments, in addition to or alternatively to providing the I/O command to the virtual disk 308, the I/O filter driver 312 may perform or execute the I/O command at the virtual disk 308. For example, if the I/O command is a read command, the I/O filter driver 312 may read a data block from the virtual disk 308 that is referenced in the I/O command or that includes an address at the virtual disk 308 that is referenced in the I/O command. Alternatively, or in addition, the block 404 may include permitting or allowing the VM I/O framework 310 or the VM 306 to provide the I/O command to the virtual disk 308 or to perform the I/O command at the virtual disk 308.

At decision block 406, I/O filter driver 312 determines whether the I/O command is a write command. In some embodiments, the decision block 406 may include determining whether the I/O command is a command that may result in modification of an address or a data block at the virtual disk 308. For example, if the I/O command is a delete command, the command may be treated similarly or the same as if it were a write command. If it is determined at the decision block 406 that the command is not a write command, the process 400 may complete.

If it is determined at the decision block 406 that the command is a write command, the I/O filter driver 312 obtains a copy of a modified data block specified in the write command from the virtual disk 308 at block 408. Obtaining the copy of the modified data block may include obtaining a copy of a data block that includes one or more addresses referenced in the I/O command. In some cases, the block 408 may include obtaining a copy of multiple modified data blocks. For example, if the I/O command references multiple addresses or data blocks, multiple data blocks may be modified in the block 408 may include obtaining copies of the multiple modify data blocks. In certain embodiments, the block 408 may be omitted. For example, if the I/O command is a request to delete data, obtaining a copy of the modified data block may be optional or omitted. As an alternative example where the I/O command is a delete command, a copy of the I/O command or an indication that the reference data block is deleted may be obtained at the block 408.

At block 410, I/O filter driver 312 provides the modified data block to a media agent 144. Providing the modified data block to the media agent 144 may include providing an identity of the VM 306 the media agent 144. Alternatively, or in addition, to providing the modified data block to a media agent 144, the block 410 may include providing a copy of the I/O command to the media agent 144. The media agent 144 may then execute or perform the I/O command with respect to a copy of a backup of the VM 306 or the virtual disk 308.

At block 412, the I/O filter driver 312 provides a copy of the write command, or other I/O command, to a replication server 304. Providing a copy of the I/O command to the replication server 304 may include providing a copy of the I/O command to the I/O filter driver 318 on the replication server 304. Advantageously, in certain embodiments, by providing a copy of the I/O command to the replication server 304, or other destination server, a replicated version (e.g., the replica VM 314) of the VM 306 may be generated. This replicated version of the VM 306 may be in addition to or as an alternative to a backup of the VM 306 at a secondary storage system 118.

Further, by providing a copy of the I/O command to the replication server 304, the replica VM 314 may remain substantially in sync with the VM 306. In some use cases, the replica VM 314 may serve as a fallback instance of the VM 306. Thus, if access to the VM server 302 is lost, the user may maintain access to the VM 306 with little or no interruption of service by accessing the replica VM 314. As with the block 410, the block 412 may provide a copy of the modified data block to the replication server 304 instead of or in addition to providing the I/O command. In certain embodiments, as indicated by the dashed lines around the block 412, the block 412 may be optional or omitted.

Example Recovery Point Generation Process

Figure 5:
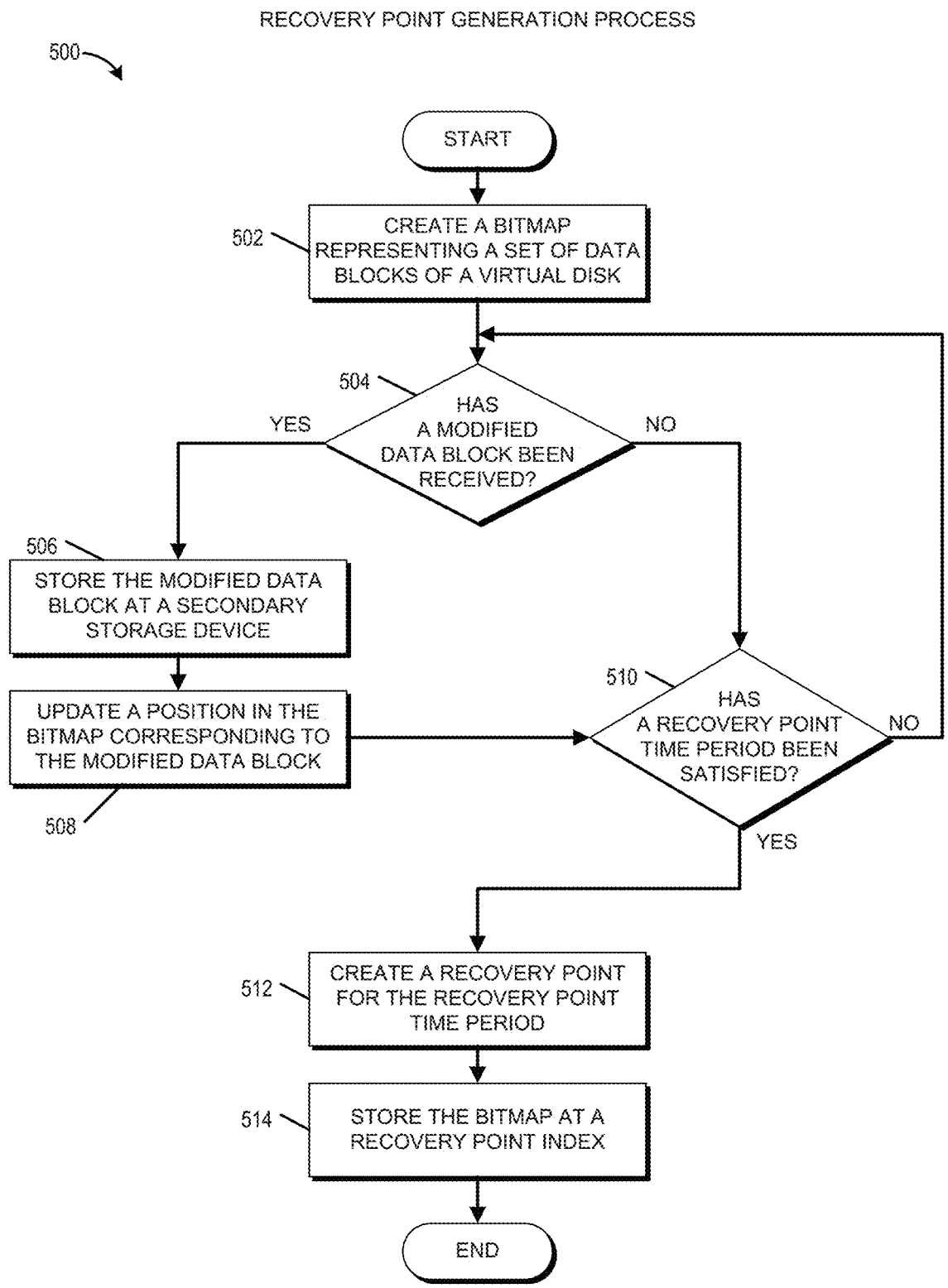
FIG. 5 depicts some salient operations of a recovery point generation process 500 according to an illustrative embodiment of the present invention.

FIG. 5 depicts some salient operations of a recovery point generation process 500 according to an illustrative embodiment of the present invention. The process 500 can be implemented by any system that can generate a recovery point for a virtual machine. The process 500, in whole or in part, can be implemented by, for example, a VM server 302, a VM I/O framework 310, an I/O filter driver 312, a media agent 144, or a secondary storage computing device 106, among others. Although any number of systems, in whole or in part, can implement the process 500, to simplify discussion, the process 500 will be described with respect to particular systems.

The process 500 is primarily described with respect to a virtual machine 306. However, in certain embodiments, the process 500 can be performed independently of a virtual machine. For example, the process 500 may be performed with respect to a primary store of a client, and a native file system or a native operating system running on a computing device. As another example, the process 500 may be performed with respect to a container.

The process 500 begins at block 502 where, for example, the media agent 144 creates a bitmap representing a set of data blocks of a virtual disk 308. The bitmap may include an entry for each data block of the set of data blocks of the virtual disk 308. In some cases, the bitmap may be generated to include an entry for every data block in the virtual disk 308 while in other cases the bitmap may be generated to include an entry for a subset of the data blocks of the virtual disk 308. Although this disclosure primarily describes the use of the bitmap, this disclosure is not limited as such and other types of data structures may be used to track the status of your provide information about data blocks of the virtual disk 308. Further, although this disclosure describes each entry of the bitmap as representative of a single data block of the virtual disk 308, this disclosure is not limited as such. Entries within the bitmap may be representative of multiple data blocks more of the addresses at the virtual disk 308 that constitute less than a single data block.

At decision block 504, the media agent 144 determines whether a modified data block has been received from the I/O filter driver 312. Alternatively, or in addition, the decision block 504 may include determining whether an I/O command to modify or delete a data block has been received.

If it is determined at the decision block 504 is that a modified data block is not been received, the process 500 proceeds to decision block 510, which is described in more detail below.

If it is determined at the decision block 504 that a modified block has been received, the media agent 144 stores the modified data block at a secondary storage device 108. The media agent 144 may select the secondary storage device 108 from a plurality of secondary storage devices to store the modified data block based on available storage space at the plurality of secondary storage devices or based on any other selection algorithm for selecting a secondary storage device. Alternatively, or in addition, the media agent 144 may store the modified data block at the secondary storage device designated as a recovery point storage device for the VM 306 where that includes a backup copy of the VM 306 or the virtual disk 308. In some cases, the information manager 140 may identify or designate the secondary storage device 108 for storing the modified data block.

At block 508, the media agent 144 updates a position corresponding to the modified data block in the bitmap created at the block 502. Updating a position correspond to the modified data block in the bitmap may include marking the corresponding bitmap entry to indicate that the data block has been modified. Alternatively, or in addition, updating the position correspond to the modified data blocks may include adding a link to a copy of the modified data block in the secondary storage device 108 to the corresponding position in the bitmap. In some embodiments, the bitmap may include an indication of a type of modification to the data block. For example, a deletion of data at the data block may be marked differently in the bitmap than a modification or in addition of data stored at the data block.

At decision block 510, the media agent 144 determines whether a recovery point time period has been satisfied. The recovery point time period may be of any designated length. In some cases, the recovery point time period is designated by a user. In other cases, the recovery point time period is determined based at least in part on characteristics of the VM 306 or the virtual disk 308. In some cases, a virtual disk of one size may be associated with a recovery point time period of a different length than a virtual disk of another size. Further, in some cases, a VM associated with particular users or providing access to particular applications or computing resources may be associated with a recovery point time period of a different length than a VM associated with different users or that provides access to different applications or computing resources. Although not limited as such, the recovery point time periods may be a few minutes (e.g., 5 minutes, 10 minutes, etc.), one or more hours, daily, or any other time period.

Generally, recovery point time periods are equal in length. For example, if the recovery point time period is designated as 10 minutes, each subsequent recovery point time period may also be 10 minutes long. However, in other cases, recovery point time periods for a particular VM may vary. For example, one recovery point time period may be five minutes while another recovery point time period may be one hour. In some cases, the variance in the length of the recovery point time periods may be based at least in part on the frequency of modification of data blocks at the virtual disk 308. For example, the recovery point time period may be based at least in part on a number of modified data blocks. In some cases, the recovery point time period may expire based on a length of time or a number of modified data blocks.

If it is determined that the recovery point time period has not been satisfied, the process 500 returns to the decision block 504. The process 500 may then involve repeating one or more of the decision blocks 504 and 510 on a continual or cyclical basis until the modified data block is received or recovery point time period has been satisfied.

If it is determined that the recovery point time period has been satisfied, the media agent 144 creates a recovery point for the recovery point time period at block 512. Creating the recovery point for the recovery point time period may include designating the bitmap as complete. In some embodiments, the recovery point is created via the operations associated with the blocks 502, 506, and 508. In such embodiments, the block 512 may be optional or omitted.

At block 514, the media agent 144 stores the bitmap at a recovery point index 322. Alternatively, or in addition, the bitmap may be stored at the secondary storage device 108 that includes the recovery point associated with the bitmap. In some embodiments different recovery points or bitmaps associated with different recovery points for a particular VM may be stored at different secondary storage devices.

The process 500 may complete after the performance of the block 514. Alternatively, or in addition, the process 500 may repeat for each recovery point time period.

Although the recovery point time periods have primarily been described as associated with a fixed time period, the present disclosure is not limited as such. For example, as previously described, the length of the recovery point time period may vary based at least in part on the number of modified data blocks for the VM 306 or the virtual disk 308. In certain embodiments, the recovery point time period may vary or change during operation. For example, suppose that a modified data block is received during a recovery point time period that corresponds to a previously received modified data block during the same recovery point time period. In some such cases, the previously received modified data block may be lost or overwritten by the newly received modified data block. Thus, when reverting to the recovery point may be possible to revert to the newly received modified data block, but not necessarily to the previously received modified data block. However, in some alternative cases, the process 500 may include finalizing or completing creation of the recovery point that includes the previously received modified data block and generating or initializing creation of a new recovery point to include the newly receive modified data block. Advantageously, in certain embodiments, by finalizing the recovery point in advance of the recovery point time period expiring and generating a new recovery point when multiple modify data blocks are received for the same data block of the virtual disk 308, it is possible to revert to any version of a VM 306 or virtual disk 308 without loss of data.

In certain embodiments, some of the recovery point time periods may be designated for generating a snapshot of the virtual disk 308. In some cases, recovery points may generate differential copies of the virtual disk 308 that include only modified data blocks from a prior recovery point. However, the snapshots may include a complete image of the virtual disk 308 that includes both modified and unmodified data blocks. Advantageously, in certain embodiments, as will be described in more detail below, intermittently generating snapshots instead of recovery points, the amount of time and processing required to revert or load a VM 306 or virtual disk 308 at a particular state is reduced compared to embodiments that do not generate snapshots. However, snapshots typically require more storage space than a recovery point. Thus, it may not be possible to frequently create snapshots due to the storage requirements.

Advantageously, in certain embodiments, recovery points can be created more frequently than snapshots without requiring as much storage space as the snapshots. Thus, more fine-grain backups can be created using recovery points than snapshots. Further, in certain embodiments, by intermixing the use of snapshots with recovery points, more frequent backups of virtual machines can be performed while reducing the amount of time required to revert to an earlier version of a virtual machine compared to the use of only recovery points. In one example use case, a snapshot can be created once a day that includes a complete copy of the virtual disk 308, while recovery points can be created on an hourly basis, every half hour, or every five minutes. As these recovery points may include just modified data blocks, the recovery points can, in some cases, be generated faster and use less storage space than a snapshot. Further, by using the recovery point loading process described herein, the recovery points can be loaded relatively quickly, such as in minutes or seconds, or less. The speed of loading the recovery points can be further increased with the use of snapshots. For example, by loading a snapshot that was obtained closer in time to the recovery point than a current state of a virtual machine, the virtual machine can be reverted more quickly to a desired backup than may occur when reverting from a current state of a virtual machine to a state corresponding to a particular recovery point.

Example Recovery Point Loading Process

Figure 6:
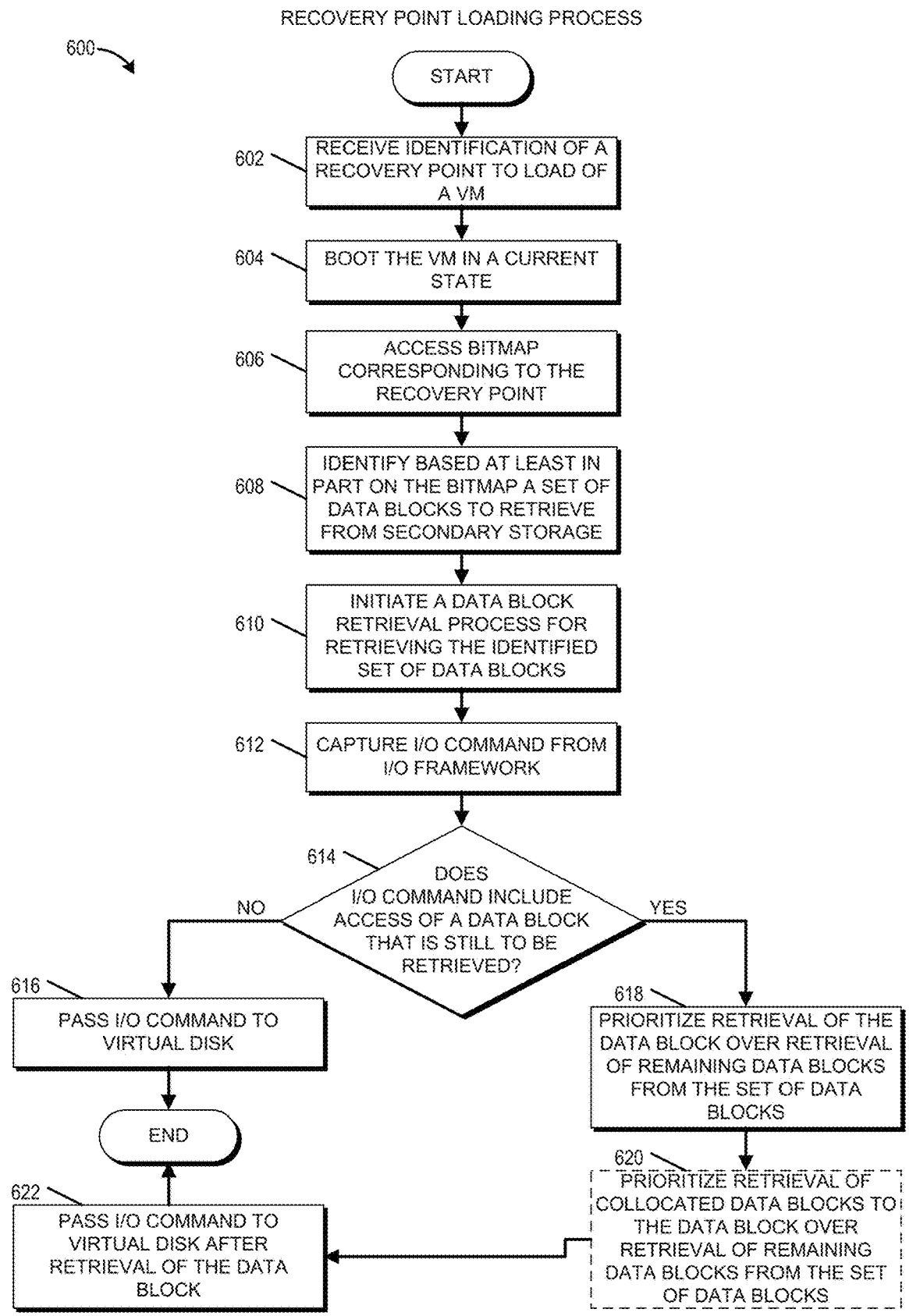
FIG. 6 depicts some salient operations of a recovery point loading process 600 according to an illustrative embodiment of the present invention.

FIG. 6 depicts some salient operations of a recovery point loading process 600 according to an illustrative embodiment of the present invention. The process 600 can be implemented by any system that can load a recovery point of a virtual machine or modify a state of a virtual machine based at least in part on the recovery point. The process 600, in whole or in part, can be implemented by, for example, a VM server 302, a VM I/O framework 310, an I/O filter driver 312, a media agent 144, or a secondary storage computing device 106, among others. Although any number of systems, in whole or in part, can implement the process 600, to simplify discussion, the process 600 will be described with respect to particular systems.

The process 600 is primarily described with respect to a virtual machine 306. However, in certain embodiments, the process 600 can be performed independently of a virtual machine. For example, the process 600 may be performed with respect to primary store of a client, and a native file system or a native operating system running on a computing device. As another example, the process 600 may be performed with respect to a container.

The process 600 begins at block 602 where, for example, the VM server 302 receives an identification of a recovery point to load of a VM 306. The identification of the recovery point to load may be received in response to an interaction by a user with a user interface.

At block 604, the VM server 302 boots the VM 306 in a current state. The current state of the VM 306 may refer to the most recent version of the VM 306 or the virtual disk 308. Alternatively, or in addition, the block 604 may include booting the VM 306 using a snapshot of the VM 306 or the virtual disk 308 that is closest in time to the desired or selected recovery point identified at the block 602. In some embodiments, the block 604 may be optional or omitted because, for example, the VM 306 is already booted or executed.

At block 606, the I/O filter driver 312 accesses a bitmap corresponding to the recovery point. Accessing a bitmap corresponding to the recovery point may include accessing the secondary storage computing device 106 or the media agent 144 to request retrieval of the corresponding bitmap from the recovery point index 322. In some embodiments, a copy of the bitmap may be stored at the VM server 302. In such embodiments, accessing the copy of the bitmap may include accessing the copy of the bitmap stored at the VM server 302.

At block 608, the I/O filter driver 312 identifies, based at least in part on the bitmap, a set of data blocks to retrieve from a secondary storage system 118. The set of data blocks to retrieve may be determined directly from the bitmap because, for example, the bitmap may identify data blocks that differ from the virtual machine booted at the block 604. In other embodiments, determining the data blocks to retrieve may include determining a difference between the bitmap accessed at the block 606 and a current state of the VM 306 or the virtual disk 308. In some cases the current state of the VM 306 or the virtual disk 308 may be determined from another bitmap that corresponds to the current state of the VM 306 or the virtual disk 308. In some cases, determining the data blocks to retrieve may include determining a difference between the bitmap accessed at the block 606 and the bitmap associated with the current state of the VM 306 or the virtual disk 308. In some cases, both bitmaps may indicate that a particular data block has been modified. In some such cases, the modified data block may not be designated for retrieval because it is determined that although the data block is modified, is not modified with respect to the current state of the VM 306 or the virtual disk 308 as indicated by both bitmaps indicating that the data block is modified. In other cases, despite both bitmaps indicating that the data block is modified, the data block is designated for retrieval because the bitmaps indicate that the data block was further modified between the recovery point identified at the block 602 and the state of the VM 306 booted at the block 604. In some embodiments, a data block designated is modified is designated for retrieval at the block 608 without performing any further analysis as to whether the data block was modified before after the recovery point selected at the block 602.

At block 610, the I/O filter driver 312 initiates a data block retrieval process for retrieving the set of data blocks identified at the block 608. Initiating the data block retrieval process may include initiating or instantiating one or more threads to retrieve the set of data blocks from one or more secondary storage devices identified in the bitmap or by the media agent 144. In some cases, the one or more threads may operate when the VM 306 is idle and may pause when the VM 306 is not idle or being interacted with by a user or other system. Further, the retrieval process may include querying the media agent 144 for the data blocks or requesting that the media agent 144 retrieve the data blocks from the secondary storage device 108 and provide the data blocks to the I/O filter driver 312. Alternatively, the media agent 144 may provide the I/O filter driver 312 with a location of the data blocks, and the I/O filter driver 312 may access the data blocks from the identified secondary storage device 108.

At block 612, the I/O filter driver 312 captures an I/O command from the VM I/O framework 310. In certain embodiments, the block 612 may include one or more of the embodiments previously described with respect to the block 402.

At decision block 614, the I/O filter driver 312 determines whether the I/O command includes the access of a data block that was identified at the block 608, but has not yet been retrieved from the secondary storage system 118. If it is determined at the decision block 614 that the I/O command does not include access of a data block that is still to be retrieved from the secondary storage system 118, the I/O filter driver 312 passes the I/O command to the virtual disk 308 at block 616. Passing the I/O command to the virtual disk 308 may include performing the I/O command on the virtual disk 308 to retrieve a data block or data stored at an address in the data block. In certain embodiments, the block 616 may include one or more of the embodiments previously described with respect to the block 404.

If it is determined at the decision block 614 that the I/O command does include access of a data block that has not yet been retrieved from the secondary storage system 118, the I/O filter driver 312 prioritizes retrieval of the data block over retrieval of remaining data blocks from the set of data blocks at block 618. Prioritizing retrieval of the data block identified by the I/O command over retrieval of the remaining data blocks may include moving the data block to the top of a queue for retrieval by the I/O filter driver 312 or the media agent 144 from the secondary storage device 108. Alternatively, or in addition, prioritizing retrieval of the data block identified by the I/O command over retrieval of the remaining data blocks may include instantiating a new thread or designating a thread to retrieve the data block that is higher priority than threads used to retrieve the rest of the set of data blocks identified at the block 608. In some cases, a new thread is created to retrieve the data block identified by the I/O command while the remaining data blocks are left to be retrieved by the existing threads without any change to the operation of the existing threads or the retrieval of the remaining data blocks. In some such cases the data block reference by the I/O command may be retrieved substantially or at least partially in parallel with other data blocks identified at the block 608. In yet other cases, retrieval of the remaining data blocks may be paused until the data block identified by the I/O command is retrieved.

The block 618 may include querying the media agent 144 for the data block identified by the I/O command. Further, the block 618 may include requesting that the media agent 144 retrieve the data block. In some cases, prioritizing the data block identified by the I/O command may include requesting that the media agent prioritize the data block over the remaining data blocks from the set of data blocks.

At block 620, the I/O filter driver 312 prioritizes retrieval of collocated data blocks that are collocated to the data block prioritized at the block 618. These co-located data blocks may be prioritized over remaining data blocks from the set of data blocks. In some embodiments, the block 620 may include one or more of the embodiments described with respect to the block 618. In certain embodiments, as indicated by the dashed lines around the block 620, the block 620 may be optional or omitted.

At block 622, and I/O filter driver 312 passes the I/O command to the virtual disk 308 after retrieval of the data block. In some embodiments, depending on the I/O command, the data block associated with the I/O command retrieved from the secondary storage system 118 may be provided to the VM 306 for presentation to a user or for output to another system and/or may be written to the virtual disk 308 enabling the I/O command to be executed or performed on the virtual disk 308. In some embodiments, the block 622 may include one or more embodiments described with respect to the block 404 or the block 616.

In some embodiments, the process 600 may be used to restore a VM 306 from a null state or from a new instantiation of a VM. Thus, to restore the VM, it may be necessary to retrieve all of the data blocks from the secondary storage system 118. Using the process 600, the VM server 302 can begin retrieving or requesting data blocks from the media agent 144. As I/O commands are received, the prioritization or order of retrieval of the data blocks can be altered as previously described with respect to blocks 614-622.

Example Recovery Point Selection Process

Figure 7:
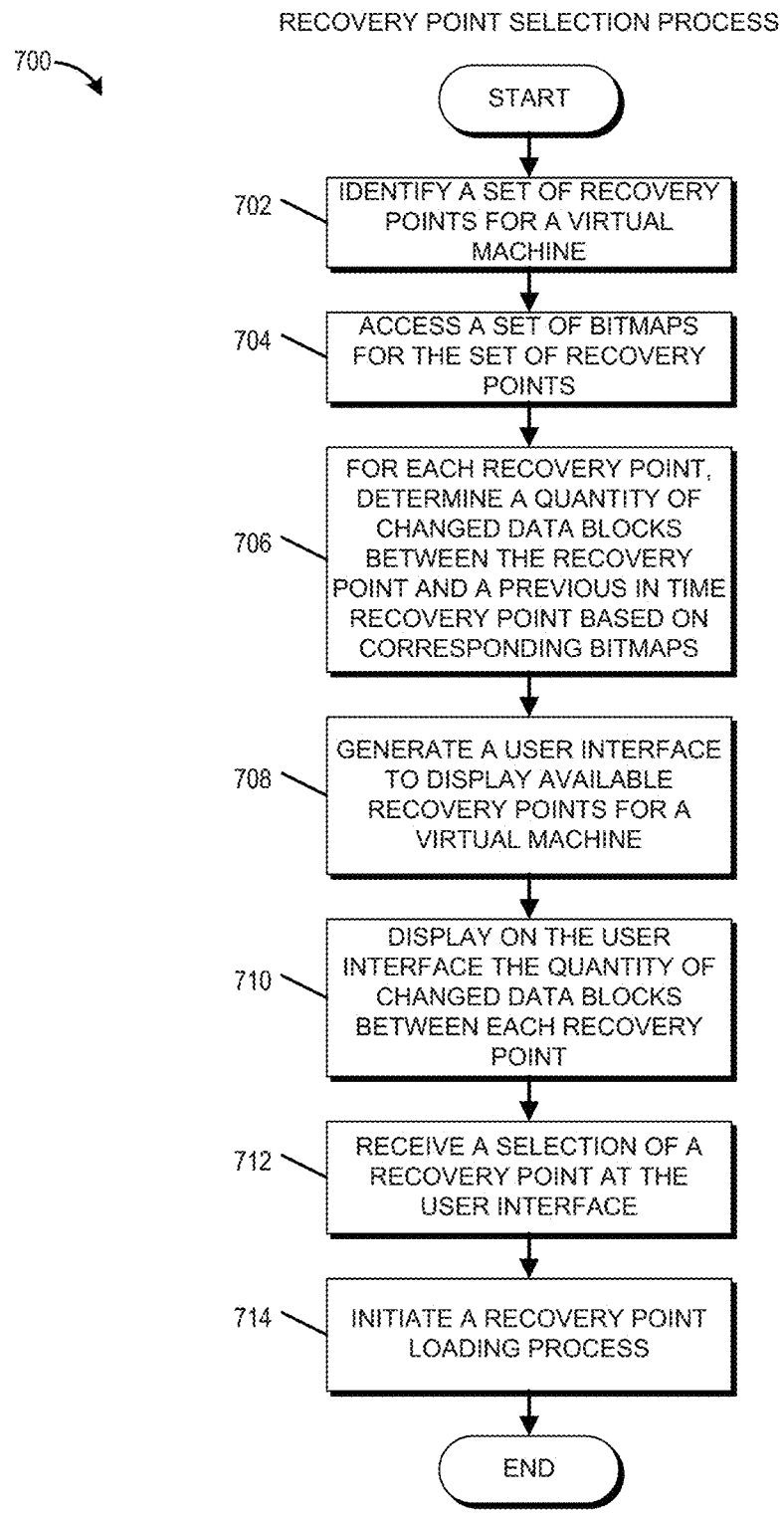
FIG. 7 depicts some salient operations of a recovery point selection process 700 according to an illustrative embodiment of the present invention.

FIG. 7 depicts some salient operations of a recovery point selection process 700 according to an illustrative embodiment of the present invention. The process 700 can be implemented by any system that can facilitate selection of a recovery point of a virtual machine. The process 700, in whole or in part, can be implemented by, for example, a VM server 302, a VM I/O framework 310, an I/O filter driver 312, a media agent 144, or a secondary storage computing device 106, among others. Although any number of systems, in whole or in part, can implement the process 700, to simplify discussion, the process 700 will be described with respect to particular systems.

The process 700 is primarily described with respect to a virtual machine 306. However, in certain embodiments, the process 700 can be performed independently of a virtual machine. For example, the process 700 may be performed with respect to primary store of a client, and a native file system or a native operating system running on a computing device. As another example, the process 700 may be performed with respect to a container.

The process 700 begins at block 702 where, for example, the VM server 302 identifies a set of recovery points for a virtual machine 306. In some embodiments, the block 702 may include receiving an identity of the virtual machine 306 and determining the set of recovery points associated with the VM 306 based at least in part on receiving the identity of the VM 306. In some cases, the identity of the VM 306 may be received in response to interaction by a user with a user interface that displays one or more available VMs 306 at the VM server 302, or the replication server 304.

At block 704, the VM server 302 accesses a set of bitmaps for the set of recovery points identified at the block 702. Accessing the set of bitmaps may include retrieving or accessing the set of bitmaps from the recovery point index 322. In some embodiments, the block 704 may include one or more of the embodiments associated with the block 606.

For each recovery point of the set of recovery points, the VM server 302 determines a quantity of changed or modified data blocks that are changed between the recovery point and a previous in time recovery point based at least in part on bitmaps corresponding to the recovery points at block 706. In some cases, the block 706 may determine a quantity of change or modify data blocks compared to a later in time recovery point or a later in time version of the VM 306 or virtual disk 308. The quantity of change data blocks may be determined based on recovery points that are consecutive in time. In some embodiments, the quantity of change data blocks may be determined based on nonconsecutive in time recovery points. The quantity of change data blocks may be determined as an absolute value or as a percentage. In some embodiments, determining the quantity of changed or modified data blocks may include performing one or more of the embodiments described with respect to the block 608.

Figure 9:
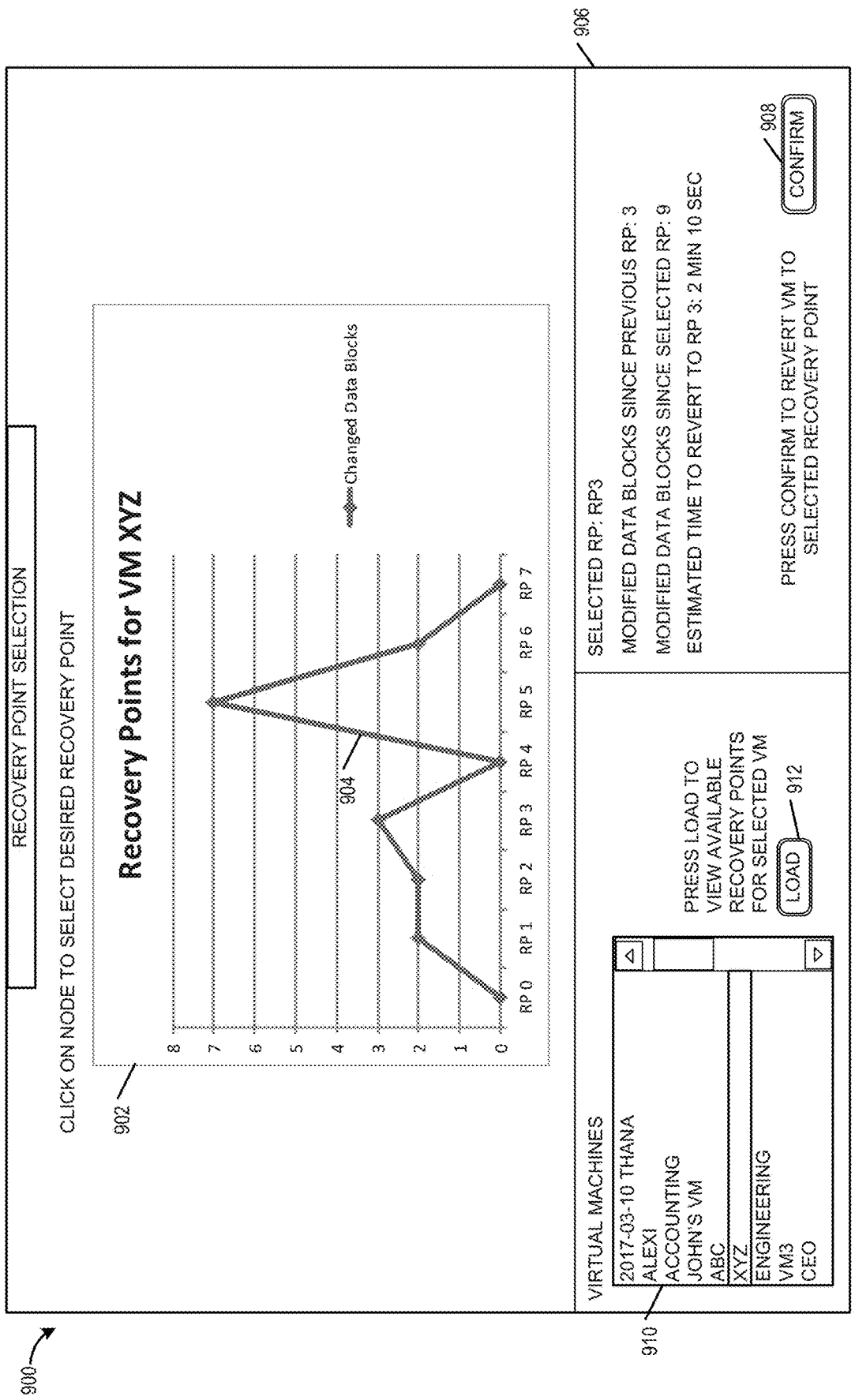
FIG. 9 depicts an illustrative graphical user interface showing an example of the recovery point selection feature in the illustrative system.

At block 708, the VM server 302 generates a user interface to display available recovery points for a virtual machine 306. One example of the user for interface and may be generated is illustrated in FIG. 9 and is described in more detail below.

At block 710, the VM server 302 displays on the user interface the quantity of changed data blocks between each recovery point. Display of the quantity of change data blocks may be in absolute terms or percentage terms. One example of displaying the quantity of change data blocks from the user interface is illustrated in FIG. 9 and is described in more detail below.

At block 712, the VM server 302 receives a selection of a recovery point at the user interface. The recovery point may be selected by a user interacting with a user interface element of the user interface. For example, the user may select the recovery point from an interactive graph of recovery points, from a drop-down list, or from a dialog box, and the like.

At block 714, the VM server 302 initiates a recovery point loading process for the selected recovery point. The recovery point loading process may be, for example, the process 600. However, the block 714 is not limited as such, and in certain embodiments the recovery point loading process may include an alternative process to the process 600.

Example Recovery Point Bitmaps

FIGS. 8A and 8B illustrate examples of recovery point bitmaps according to an illustrative embodiment of the present invention. In some embodiments, the recovery point bitmaps of FIG. 8B may correspond to the recovery point bitmaps of FIG. 8A. Thus, the bitmap 852 may correspond to the bitmap 802. The bitmaps 802 and 852 may both represent an initial state of a VM 306 or a virtual disk 308. In the particular non-limiting example illustrated in FIGS. 8A and 8B, the virtual disk 308 consists of 25 data blocks that can be mapped in a 5×5 matrix as illustrated by the bitmap 802. As illustrated, the value in each entry of the matrix for the bitmaps 802 and 852 are set to zero to indicate that the data blocks have not been modified since a previous recovery point, which may not exist in the case of an initial bitmap.

The bitmaps 802-808 and 852-858 may represent block maps with an entry corresponding to one or more bits, bytes, or data blocks. Other data structures are possible in the context of the present disclosure. For example, the bitmaps may be trees, linked lists, tables, and the like.

During a first recovery point time period two data blocks may be modified. The modification of the data blocks may be tracked by the bitmap 804. The bitmap 804 may indicate that the data blocks corresponding to the locations (zero, one) and (zero, three) are modified by changing the value those locations within the bitmap 804. In some embodiments, at only may the bitmap 804 indicate that the data blocks are modified, but the bitmap may identify a storage location at the secondary storage device 108 of a copy of the modified data blocks as illustrated by the bitmap 854. In the illustrated example, the locations (zero, one) and (zero, three) of the bitmap 854 not only indicate that the data blocks corresponding to these bitmap locations have been modified, but they identify the secondary storage device that stores a copy of the modified data blocks and the data block at the secondary storage device that includes the copy of the modified data block. In other words, in the illustrated example, the bitmap 854 indicates that a copy of a modified data block of the virtual disk 308 corresponding to the bitmap 854 location (zero, one) is stored at block B12 of secondary storage device D1.

The bitmap 806 indicates that additional data blocks have been modified in a subsequent recovery point corresponding to the virtual disk 308. The bitmap 856 may be a corresponding bitmap to the bitmap 806 that identifies the device and block location of a copy of the modified data blocks. As previously discussed, data blocks of a recovery point for a virtual disk 308 may be distributed among multiple secondary storage devices 108. The distribution of the modified data blocks is illustrated by the entry (two, four) of the bitmap 856 which indicates that the modified data block is stored at block 12 of a secondary storage device D2. In the illustrated embodiment, the modified data block corresponding to location (zero, one) is also stored at block 12, but of secondary storage device D1.

The bitmaps 808 and 858 are associated with yet another subsequent recovery point. In this particular example, the data blocks corresponding to the entry (two, four) of the bitmaps has been modified a second time. This subsequent modification of the data block may be viewed by the change in block location of the modified data block listed in the entry (two, four) of the bitmap 858.

Although the bitmaps 802, 804, 806, 808 in the corresponding bitmaps 852, 854, 856, 858 are titled sequentially from time 0 to time 3, the corresponding recovery points may be nonconsecutive. Further, the corresponding recovery points may be in reverse time order. For example, the bitmap 802 may correspond to the most recent version of the virtual disk 308 and the bitmap 808 may correspond to the oldest recovery point of the virtual disk 308.

Example Graphical User Interface

FIG. 9 depicts an illustrative graphical user interface (GUI) 900 showing an example of the recovery point selection feature in the illustrative system. It should be understood that the GUI 900 is one non-limiting illustrative example of a user interface that may be used for selecting a recovery point or viewing data about the recovery point. Other embodiments of a user interface for recovery point selection are possible.

The GUI 900 may include a graph 902 that illustrates at least some of an available set of recovery points for a particular virtual machine 306 or corresponding virtual disk 308. The graph 902 may include a line 904 and indicates the number of modified blocks since the previous recovery point. Thus, referring to the line 904, they can be determined that two data blocks were modified between the recovery point RP 0 and the recovery point RP 1. Similarly, it can be determined that two data blocks were modified between the recovery point RP 1 in the recovery point RP 2. However, between the recovery points RP 3 and RP 4, there were no modified data blocks as indicated by the line 904 sending to zero. In some embodiments, the area or region under the line 904 at particular points representative of the recovery points may indicate the quantity of modified data blocks since a prior recovery point or since the VM was created. Moreover, in the illustrated example, RP 7 may refer to a current state of the virtual disk 308. Alternatively, RP 7 may refer to the most recent recovery point but may be less recent than the current state of the virtual disk 308.

A user may select a particular recovery point by, for example, clicking on a node of the line 904 corresponding to a particular desired recovery point. Alternatively, or in addition, the user may select the particular recovery point using a drop-down list box, the set of radio buttons, a dialog box, or any other user interface element may be used to select an element from a group of elements.

The panel 906 may display information about a selected recovery point. In the illustrated example, the recovery point RP 3 has been selected. The panel 906 may display the identity of the selected recovery point, a number of modified data blocks since a previous recovery point, a number of modified data blocks subsequent to the selected recovery point, a number of modified data blocks since an initial bitmap was generated for the VM 306 or the virtual disk 308, an estimated amount of time to revert the current state of the virtual machine to a state corresponding to the selected recovery point, and any other type of information that may be determined about a selected recovery point. In some cases, the panel 906 may also display a location of the recovery point at a secondary storage system 118. Displaying the location of the recovery point may, in some cases, include displaying and entity of multiple secondary storage devices 108.

In the particular example illustrated in FIG. 9 of the recovery point RP 3 being selected, it is determined that three data blocks have been modified since a previous recovery point, RP 2. Further, the panel 906 indicates that nine data blocks have been modified subsequent to the selected recovery point RP 3. In addition, the panel 906 indicates that the estimated length of time to revert the VM 306 to the selected recovery point is two minutes and ten seconds. Advantageously, in certain embodiments, by displaying the estimated amount of time required to revert to a particular recovery point, a user can determine whether to revert to the selected recovery point now, at a later time, or at all. In some embodiments, a user can schedule a reversion to a recovery point at a particular time. For example, the user can schedule that reversion to a particular recovery point occurred during the night. If the user desires to revert to the selected recovery point, the user can interact with the button 908 to confirm the desired reversion to the selected recovery point.

The user can select a virtual machine for which to display the available recovery points via a scrollable list box 910 or any other user interface element that may be used to display available virtual machines. In the illustrated example, the user may confirm the desired virtual machine for which to load the recovery points by interacting with the load button 912.

Although not illustrated, in certain embodiments, the GUI 900 may present a user interface element for selecting a virtual machine destination. This virtual machine destination may identify a location for which to load a recovery point of the VM 306. For example, a user may select the replication server 304 instead of or in addition to the VM server 302 to load the recovery point. Advantageously, in certain embodiments, by selecting different destination locations, a user can run multiple instances of the VM 306 with each instance of the VM 306 potentially having a state corresponding to a different recovery point.

In some embodiments, at least some of the recovery points displayed on the graph 902 are snapshots. Further, in some embodiments, the GUI 900 may be used to load a snapshot for a VM 306 or virtual disk 308.

Recovery Point Generation Management

As previously described, for example, with respect to FIG. 3, the recovery point or a replica of a virtual machine may be generated based on data provided by a VM server 302 to secondary storage computing device 106, which may function as a recovery point management system, such as the recovery point management system 1022 of FIG. 10, which is described in more detail below. However, in certain embodiments, it may be desirable to have an intermediary system between the VM server 302 and the secondary storage computing device 106. For example, it may be desirable to have an intermediary system managed a plurality of VM servers 302. Further, in some embodiments, the VM server 302 may be at a different network location or within a different environment and the secondary storage computing device 106. Thus, it may be desirable to track the consistency of a virtual disk 308 and a recovery point or replica virtual disk generated by the secondary storage computing device 106. In some cases, inconsistencies may occur because of delays within a network between the VM server 302 and secondary storage community device 106, or because of a fault with the network.

Embodiments disclosed herein and described in more detail below and include a virtual machine replicator that can track the consistency or otherwise improve the probability that a recovery point or replica virtual disk is consistent with a virtual disk 308 by inserting consistency markers within a stream of data communicated between the VM server 302 and a recovery point management system. In certain embodiments, upon receiving a consistency marker, the recovery point management system can determine that the recovery point for a replica virtual disk created from data received up until the point the consistency markers received will be consistent with a version of the virtual disk 308 a particular point in time associated with receiving the consistency marker.

Certain embodiments disclosed herein may use two different kinds of consistency markers. One consistency marker may be a crash consistency marker that is inserted as data is transferred between the VM server 302 and the recovery point management system. This crash consistency marker may indicate that a recovered virtual disk matches the virtual disk 308 at a point in time when the virtual disk 308 may have crashed. That is, in certain embodiments, because data that is written to the virtual disk 308 may also be transferred to a recovery point management system, a recovery point or replica virtual disk may be created of the virtual disk 308. The use of the crash consistent marker may inform the recovery point management system that has received all of the data that has been written to the virtual disk 308 and thus, is consistent with the virtual disk 308 at the point in time when the crash consistent marker is received.

The second kind consistency marker that may be used as an application consistent marker. In certain embodiments, applications executing on the virtual machine 306 may modify or generate data to be written to the virtual disk 308. Once an application has modified or generated the data, the application may be in a state that expects a modified or generated data to exist at the virtual disk 308. However, in certain embodiments, an operating system of the virtual machine 306 may manage writes to the disk. Managing the rights to the disk may include storing the data in a buffer, cache, or other structure waiting to be written to the virtual disk 308. If the VM 306 crashes prior to the data being flushed, or written from the buffer brother structure, to the virtual disk 308, there may be an inconsistency between the data that the application believes is written to the virtual disk 308 and the data that is actually written to the virtual disk 308. Accordingly, upon restoring the virtual disk 308, there may be an inconsistency between the data at the virtual disk 308 and the data that the application executing on the VM 306 believes or otherwise expects to be stored at the virtual disk 308 based on the state of the application at the time that the VM 306 crashed and/or was restored. In certain embodiments, the virtual machine replicator may cause data waiting to be written to the virtual disk 308 to be flushed or written to the virtual disk 308. Once the data is written to the virtual disk 308, the virtual machine replicator can insert an application consistent marker into a stream of data provided to the recovery point management system. Based on the application consistent marker, the recovery point management system can determine that the recovery point, snapshot, replica virtual disk 316 is application consistent with the VM 306. A recovery point, snapshot, or replica virtual disk is application consistent may include all modifications to data of the virtual disk 308 performance by one or more applications executing on the virtual machine 306.

Further, in certain embodiments, the virtual machine replicator can include a buffer that can store data to be transferred to the recovery point management system. By storing the data in a buffer, the virtual machine replicator can continue to process data received from the VM server when a network between the VM server in the recovery point management system is insufficient bandwidth or when a connection is lost between the VM server and the recovery point management system. Further, the virtual machine replicator, in certain embodiments, can increase the capacity of the buffer by using a dehydration process that discards data stored in the buffer while maintaining metadata enables the virtual machine replicator to retrieve the discarded data at a later point in time. Thus, in certain embodiments, the amount of data blocks supported by the buffer 1006 may be increased by creating a small or data footprint for each of the data blocks.

Second Recovery Point Generation System

Figure 10:
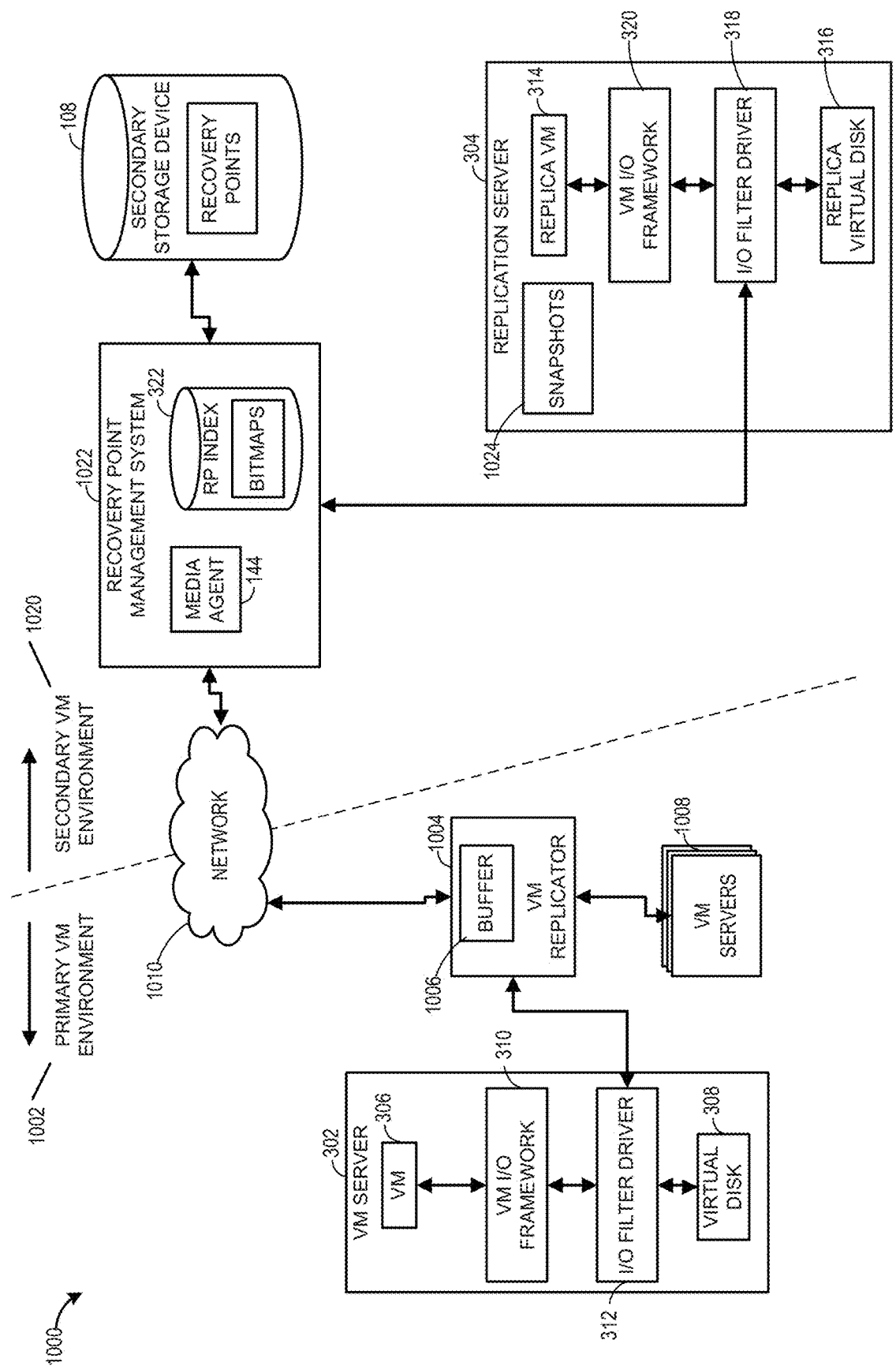
FIG. 10 is a block diagram illustrating some salient portions of a system 1000 for creating recovery points of a virtual machine and replicating the virtual machine, according to further illustrative embodiments of the present invention.

FIG. 10 is a block diagram illustrating some salient portions of a system 1000 for creating recovery points of a virtual machine and replicating the virtual machine, according to further illustrative embodiments of the present invention. In certain embodiments, the system 1000 may include some or all of the features described with respect to the system 300. Further, the system 1000 may perform one or more of the processes previously described above. For example, the system 1000 may perform embodiments of the process 400, 500, 600, or 700. Further, as with the system 300, in some embodiments the system 1000 can be part of an information management system 100 and may include one or more of the systems and one or more of the embodiments previously described with respect to the information management system 100.

In certain embodiments, the system 1000 may be divided into a primary virtual machine (VM) environment 1002 and a secondary virtual machine environment 1020. The primary VM environment 1002, in some embodiments, may correspond to or may be part of a primary storage subsystem 117. Similarly, in some embodiments, the secondary VM environment 1020 may correspond to or may be part of a secondary storage subsystem 118. At least some systems of the primary VM environment 1002 can communicate with at least some system of the secondary VM environment 1020 via a network 1010.

The virtual machine replicator 1004 may include any system that can facilitate providing data from a VM server 302 to the secondary VM environment 1020 and/or a recovery point management system 1022. The VM replicator 1004 may manage the communication of data blocks from one or more virtual machines 306 of a VM server 302 to the recovery point management system 1022. In some embodiments, the VM replicator 1004 may manage the communication of data blocks from virtual machines of multiple VM servers 1008. Each of the VM servers 1008 may be configured similarly to the VM server 302 and may include one or more of the embodiments previously described with respect to the VM server 302. Further, in some cases, the primary VM environment 1002 may include multiple VM replicators 1004.

In certain embodiments, the virtual machine replicator 1004 may include a number of threads that facility performing the processes described herein. For example, the virtual machine replicator 1004 may have an I/O thread that receives data from the I/O filter driver 312 and stores it in the buffer 1006. Further, the I/O thread may tag or assign a sequence number to each data block or portion of data that is received from the I/O filter driver 312 and stored in the buffer 1006 enabling the VM replicator 1004 to maintain or track an order in which the data is received from the VM server 302. Moreover, the virtual machine replicator 1004 may have network thread that pulls data from the buffer 1006 and transmits it to the recovery point management system 1022. In some cases, the virtual machine replicator 1004 may have another thread that retrieves data from the I/O filter driver 312 based on metadata that is stored within the buffer 1006. For example, if it is determined that the data is not stored in the buffer 1006, the thread may access corresponding metadata that is stored in the buffer 1006 to determine storage location of the data within the virtual disk 308. Thread may then request that the I/O filter driver 312 retrieve data from the identified location of the virtual disk 308 and provided to the VM replicator 1004.

The VM replicator 1004 includes a buffer 1006. The buffer 1006 may include memory allocated for storing data blocks received from the I/O filter driver 312. Further, the buffer 1006 may store metadata associated with each of the stored data blocks that identifies an address or other location information that indicates where the data blocks are stored at the virtual disk 308. In some cases, buffer 1006 may store additional metadata or information associated with each of the stored data blocks. For example, the buffer 1006 may include a sequence number with each of the data blocks indicating an ordering of the data blocks. For example, a first received data block may be associated with a sequence number one, a second received data block may be associated with the sequence number two, and so on and so forth. In some embodiments, the sequence number may be or may include a timestamp indicating the time of receipt of the data block from the I/O filter driver 312.

The buffer 1006 may also include information to identify the virtual machine 306 from which the data blocks were obtained. Alternatively, or in addition, the VM replicator 1004 may include a separate buffer 1006 for each VM server 302, for each virtual machine 306, and/or for each virtual disk 308. As will be described in more detail below, in some cases, the buffer 1006 may include or store metadata associated with one or more receive data blocks, but may not store the data blocks themselves. In some embodiments, the VM replicator 1004 may receive copies of write commands that are issued by the VM 306 and provided to the VM replicator 1004 by the I/O filter driver 312. Storing the data blocks and/or metadata include storing copies of the write commands at the buffer 1006.

The buffer 1006 may include or be allocated from volatile memory of the VM replicator 1004. Alternatively, or in addition, the buffer 1006 may be allocated from non-volatile memory of the VM replicator 1004. In some cases, the buffer 1006 may be allocated from both volatile and nonvolatile memory. For example, a portion of the buffer 1006 that stores more recently received data blocks may be located in a non-volatile memory while a portion of the buffer 1006 the stores less recently received data blocks may be located in a volatile memory. This distribution of data blocks between volatile and nonvolatile memory may occur because older data is more likely to be transmitted to a recovery point management system 1022 sooner than newer data, and in some cases, volatile memory may provide faster access the nonvolatile memory. Further, the inclusion of the buffer 1006 enables the VM replicator 1006 in combination with the recovery point management system 1022 to perform a buffered virtual machine replication process. Further, the VM replicator 1004 can perform a consistent virtual machine replication process that enables the VM replicator 1004 in conjunction with the recovery point management system 1022 to create a recovery point for the VM 306 and/or a replica of the VM 306 that is consistent with the VM 306 at the VM server 302.

In some embodiments, the buffer 1006 may not be used by the VM replicator 1004 when receiving data from the I/O filter driver 312. For example, if the data is received from the I/O filter driver 312 at a rate that is low enough for the VM replicator 1004 to communicate the data to the recovery point management system 1022 via the network 1010, then storing data within the buffer 1006 may be optional or omitted. However, if data is received at a faster rate than the VM replicator 1004 is able to communicate the data using the network 1010 to the recovery point management system 1022, then data may first be stored in a buffer 1006 before it is transferred to the recovery point management system 1022 via the network 1010. In some embodiments, the network 1010 may support different communication speeds or may have different than with a different times. Thus, at some times the VM replicator 1004 may use the buffer 1006 to store data before it is communicated to the recovery point management system 1022 while at other times the buffer 1006 may remain unused.

The secondary VM environment 1020 may include a recovery point management system 1022. The recovery point management system 1022 may be or may include one or more embodiments of the secondary storage computing device 106. Further, the recovery point management system 1022 may communicate with the VM replicator 1004 via the network 1010. Communicating with the VM replicator 1004 may include receiving data blocks from the VM replicator 1004. Further, the recovery point management system 1022 may create a recovery point using the received data blocks as described, for example, as part of the process 500. Alternatively, or in addition, the data blocks may be provided to the replication server 304, which may create a replica of the VM 314 is a replica or copy of the VM 306. In some embodiments, the replication server 304 may generate one or more snapshots 1024 of the replica VM 314.

In certain embodiments, the recovery point management system 1022 may be configured to operate in one or more different modes. In a first mode, the recovery point management system 1022 may receive data blocks from the VM replicator 1004 and may provide the data blocks to the replication server 304 to create a replica virtual disk 316 is a replica of the virtual disk 308. In some embodiments the first mode may include receiving a location of the data blocks at the virtual disk 308 in providing this location to the replication server 304 such that the data can be stored at a corresponding location within the replica virtual disk 316. In some embodiments, this first mode may be referred to as a life mode because as data is received from the VM replicator 1004 it is provided to the replication server 304 to create the replica virtual disk 316.

In a second mode, the data blocks received by the recovery point management system 1022 are used to generate a snapshot of the virtual disk 308. In some embodiments, the second mode may include also performing the first mode. In other words, in some embodiments, the second mode may include generating a replica virtual disk 316 of the virtual disk 308 and also creating a snapshot of the virtual disk 308. In some such embodiments, the snapshot may be created by using snapshot functionality of the replica VM 314 to generate a snapshot 1024 of the replica virtual disk 316.

In a third mode, the recovery point management system 1022 may create a recovery point using, for example, the process 500. In some embodiments, the third mode may include performing the first mode and/or the second mode as part of the third mode. In some embodiments, the snapshot 1024 may be a full or complete replica of the virtual disk at a particular point in time. The recovery point may be a type of differential copy of the virtual disk that stores changes between a previous recovery point where previous snapshot and the recovery point being generated at a particular point in time.

Each of the VM server 302 (and VM servers 1008), the VM replicator 1004, the recovery point management system 1022, and the replication server 304 may be implemented as separate computing systems comprising one or more hardware processors. In some embodiments, the VM replicator 1004 may be implemented by one of the VM servers 302 or 1008. Similarly, in certain embodiments, the recovery point management system 1022 may be implemented by a replication server 304. The network 1010 may include any type of communications network that enables computing systems of the primary VM environment 1002 to communicate with computing systems of the secondary VM environment 1020. For example, the network 1010 may be or may include one or more of the networks described with respect to the communication pathway 114. Further, in certain embodiments, the network 1010 may include the Internet.

Example Consistent Virtual Machine Replication Process

Figure 11:
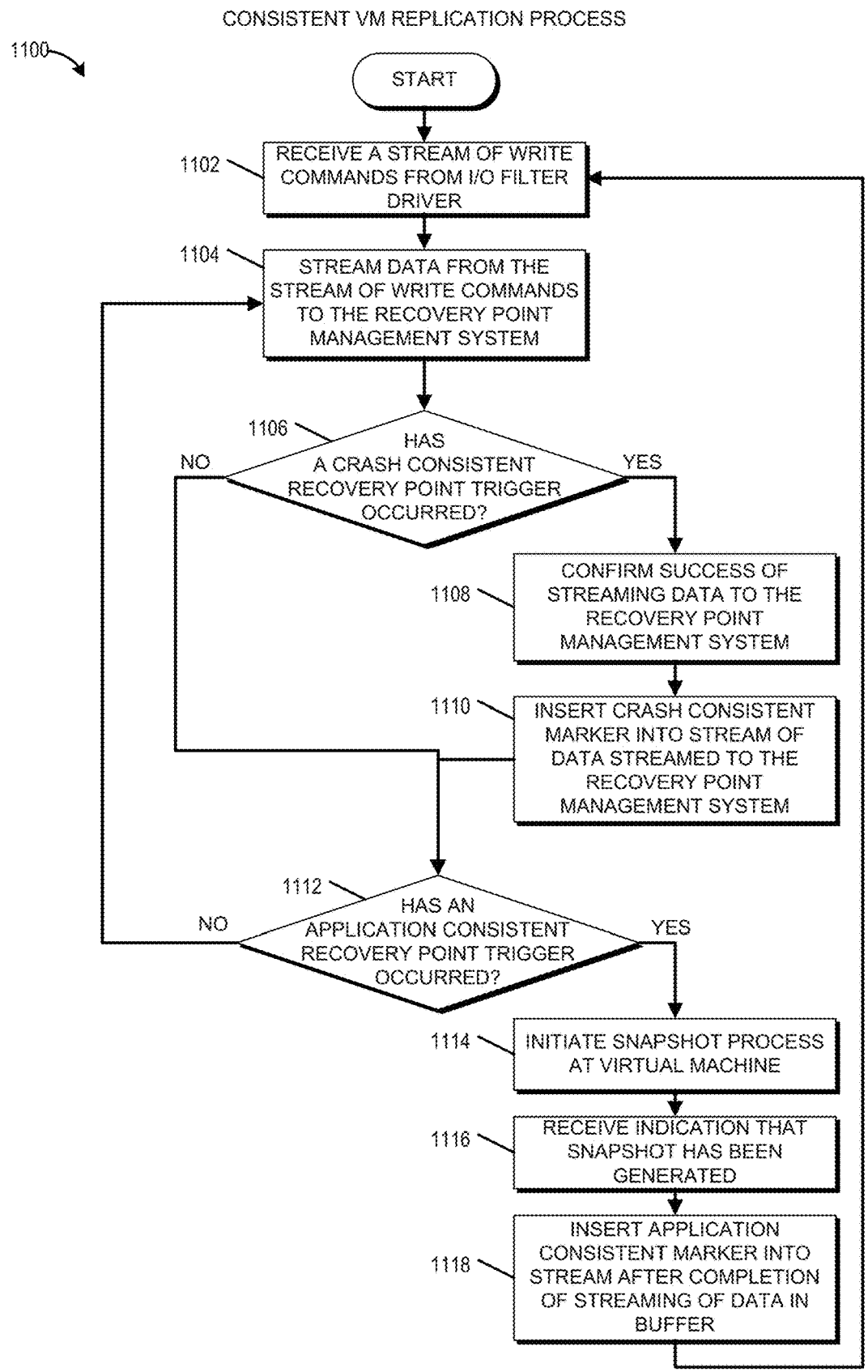
FIG. 11 depicts some salient operations of a consistent virtual machine replication process 1100 according to an illustrative embodiment of the present invention.

FIG. 11 depicts some salient operations of a consistent virtual machine replication process 1100 according to an illustrative embodiment of the present invention. The process 1100 can be implemented by any system that can generate a recovery point for a virtual machine and/or a replica or copy of the virtual machine in a secondary environment that is consistent with the virtual machine in a primary environment. The process 1100, in whole or in part, can be implemented by, for example, a VM server 302, a VM I/O framework 310, an I/O filter driver 312, a VM replicator 1004, a media agent 144, a secondary storage computing device 106, or a recovery point management system 1022, among others. Although any number of systems, in whole or in part, can implement the process 1100, to simplify discussion, the process 1100 will be described with respect to particular systems.

The process 1100 begins at block 1102 where, for example, the VM replicator 1004 receives a stream of write commands from an I/O filter driver 312. The stream of write commands received from the I/O filter driver 312 may be for a particular virtual machine 306. The process 1100 may be repeated separately for each virtual machine hosted by the virtual machine server 302 or hosted by other VM servers 1008. The write commands received from the I/O filter driver 312 may be copies of write commands issued by the VM 306 for writing data to the virtual disk 308. In some embodiments, instead of receiving the write commands at the block 1102, the VM replicator 1004 may receive a copy of the data included in a write command processed at the VM server 302 and metadata for the data. This metadata may include address information or location information of where the data is written at the virtual disk 308.

At block 1104, the VM replicator 1004 streams data from the stream of write commands to the recovery point management system 1022. In some embodiments, the data from the write commands is stored in a buffer 1006 stop in some such embodiments, the data stream from the buffer 1006 to the recovery point management system 1022. The data may be streamed via the network 1010. Streaming the data may include generating one or more data packets including portions of the data from the write command. In addition, streaming the data may include providing the metadata, or the location information for the data is stored at the virtual disk 308, to the recovery point management system 1022. In certain embodiments, performing operations associated with the block 1104 may include performing the process 1200 described in more detail below with respect to FIG. 12.

At decision block 1106, the VM replicator 1004 determines whether a crash consistent recovery point trigger has occurred. The crash consistent recovery point trigger may include a time-based trigger or may be based on an amount of write commands, or data blocks, received at the VM replicator 1004 or transferred from the VM replicator 1004 to the recovery point management system 1022. For example, the crash consistent recovery point trigger may occur every 30 minutes, every hour, twice per day, or once each business day, or any range of time between the foregoing examples. As another example, the crash consistent recovery point trigger may occur every 50, 100, 250, or 1,000 write commands received, or any range of write commands between the foregoing examples. As yet another example, the crash consistent recovery point trigger may occur every 10, 25, 50, or 100 MB of data received, or after one, five, 10, or 50 GB of data are received, or any range of amounts of data between the foregoing examples. In some embodiments, the crash consistent recovery point triggers may be determined by a user, such as administrator. Further, in some embodiments, the crash consistent recovery point trigger may be a command received from a user, such as administrator. Moreover, in some embodiments, the crash consistent recovery point trigger may vary based on the day, the time of day, the particular VM, or the particular VM server. Him If a crash consistent recovery point trigger has not occurred, the process 1100 proceeds to the decision block 1112, which is described in more detail below. If a crash consistent recovery point trigger has occurred, the VM replicator 1004 confirms the success of streaming data to the recovery point management system at the block 1108. Confirming the success of streaming data to the recovery point management system may include receiving an acknowledgment packet from the recovery point management system 1022. In some embodiments, the block 1108 is optional or omitted.

At block 1110, the VM replicator 1004 inserts a crash consistent marker into the stream of data that is streamed to the recovery point management system 1022. The crash consistent marker may indicate to the recovery point management system 1022 that all of the data written to the virtual disk 308 up to a particular point in time has been provided to the recovery point management system 1022. Thus, the recovery point management system 1022 can create a recovery point to be stored at the secondary storage device 108 and/or a replica virtual disk 316 that is consistent with the virtual disk 308. In some embodiments, the recovery point management system 1022 may mark the created recovery point as being crash consistent based on the received crash consistent marker. In certain embodiments, when the recovery point management system 1022 receives the crash consistent marker, it can determine that the recovery point or snapshot that is generated will be consistent with the virtual disk 308. Accordingly, in certain embodiments, when or if access is lost to the virtual disk 308, a copy of the virtual disk 308 that is consistent with the virtual disk 308 before it crashed can be restored using the generated recovery point or a snapshot.

At decision block 1112, the VM replicator 1004 determines whether an application consistent recovery point trigger has occurred. The application consistent recovery point trigger can include one or more of the embodiments described with respect to the crash consistent recovery point trigger. Generally, the application consistent recovery point trigger may occur less frequently than the crash consistent recovery point trigger. However, in certain embodiments, the application consistent recovery point trigger may occur as frequently as the crash consistent recovery point trigger or more frequently. In some embodiments, the performance of a snapshot process at the VM 306 may be an application consistent recovery point trigger. In some such cases, the block 1114 described below may be optional or omitted.

If an application consistent recovery point trigger has not occurred, the process returns to the block 1104 where the VM replicator 1004 continues to stream data from the stream of write commands to the recovery point management system 1022. It should be understood that the operations associated with the blocks 1102 and 1104 may proceed as long as write commands continue to be received from the I/O filter driver 312. If write commands cease to be received, either temporarily or permanently, the operations associated with the blocks 1102 and 1104 may cease until additional write commands are received.

If it is determined at the decision block 1112 that an application consistent recovery point trigger has occurred, the VM replicator 1004 initiates a snapshot process at the virtual machine 306 at block 1114. Initiating a snapshot process at the virtual machine 306 may include sending a command to the I/O filter driver 312 to initiate an internal snapshot process manage by the VM 306. In some embodiments, the VM replicator 1004 may request that the VM 306 perform the snapshot process or that the VM server 302 trigger the snapshot process at the VM 306. A snapshot process may cause data to be flushed from a data cache managed by the VM 306 to the virtual disk 308. In other words, the snapshot process may cause data that is scheduled to be written to the virtual disk 308, but which may not have yet been written, to be written to the virtual disk 308. Further, by causing the snapshot process to be performed, the VM replicator 1004 may cause the VM 306 to be placed into a quiescent state ensuring that a copy of the virtual disk 308 are recovery point is consistent with the state of the virtual disk 308 and/or the VM 306.

In certain embodiments, data that has been generated or written by an application executing on the VM 306 may not yet have been written to a virtual disk 308 because, for example, the data may not yet have been flushed from a cache to the virtual disk 308. Accordingly, an application may believe that data has been written to a virtual disk 308 that has not been written to a virtual disk 308. Thus, if access to the virtual disk 308 is lost and a copy the virtual disk 308 is restored from a recovery point, there may be a discrepancy between the data stored on the virtual disk 308 and what an application running on the VM 306 believes is stored at the virtual disk 308. Advantageously, by triggering the snapshot process, the VM replicator 1004 may cause data that is scheduled to be written, but which may not yet have been written, to be written to the virtual disk 308.

At block 1116, the VM replicator 1004 receives an indication that a snapshot has been generated. In some embodiments, the triggering of the snapshot process is used to ensure that all data that may have been scheduled to be written to the virtual disk 308 in response to execution of an application on the VM 306 is written to the virtual disk 308. Thus, in certain embodiments, once the snapshot has been generated it may be discarded.

At block 1118, the VM replicator 1004 inserts an application consistent marker into the stream of data that is streamed to the recovery point management system 1022 after completion of streaming of the data in the buffer 1006, if any. In other words, in certain embodiments, the application consistent marker is inserted into the stream after the buffer 1006 is emptied of data received prior to the application consistent recovery point trigger event. The block 1118 may include one or more of the embodiments described with respect to the block 1110. By providing the application consistent marker to the recovery point management system 1022, the recovery point management system 1022 can determine that it has received all data written to the virtual disk 308 or scheduled to be written to the virtual disk 308 in response to execution of an application. Accordingly, the recovery print management system 1022 can create a recovery point or a replica virtual disk 316 that is application consistent with a virtual disk 308. In other words, recovery point where the replica virtual disk 316 may be consistent with both the data that was written to the virtual disk 308 at a point in time when the application consistent recovery point trigger occurred and consistent with data that was scheduled to be written to the virtual disk at the point in time when the application consistent recovery point trigger occurred.

After completing the processes associated with the block 1118, the process 1100 may end if, for example, no further write commands are received from the I/O filter driver 312. Alternatively, if additional write commands are being received or streamed from the I/O filter driver 312, the process 1100 may return to the block 1102.

It should be understood that operations included in the process 1100 may be performed in a different order or in parallel. For example, the decision blocks 1106 and 1112 may be performed in a different order or in parallel.

Example Buffered Virtual Machine Replication Process

Figure 12:
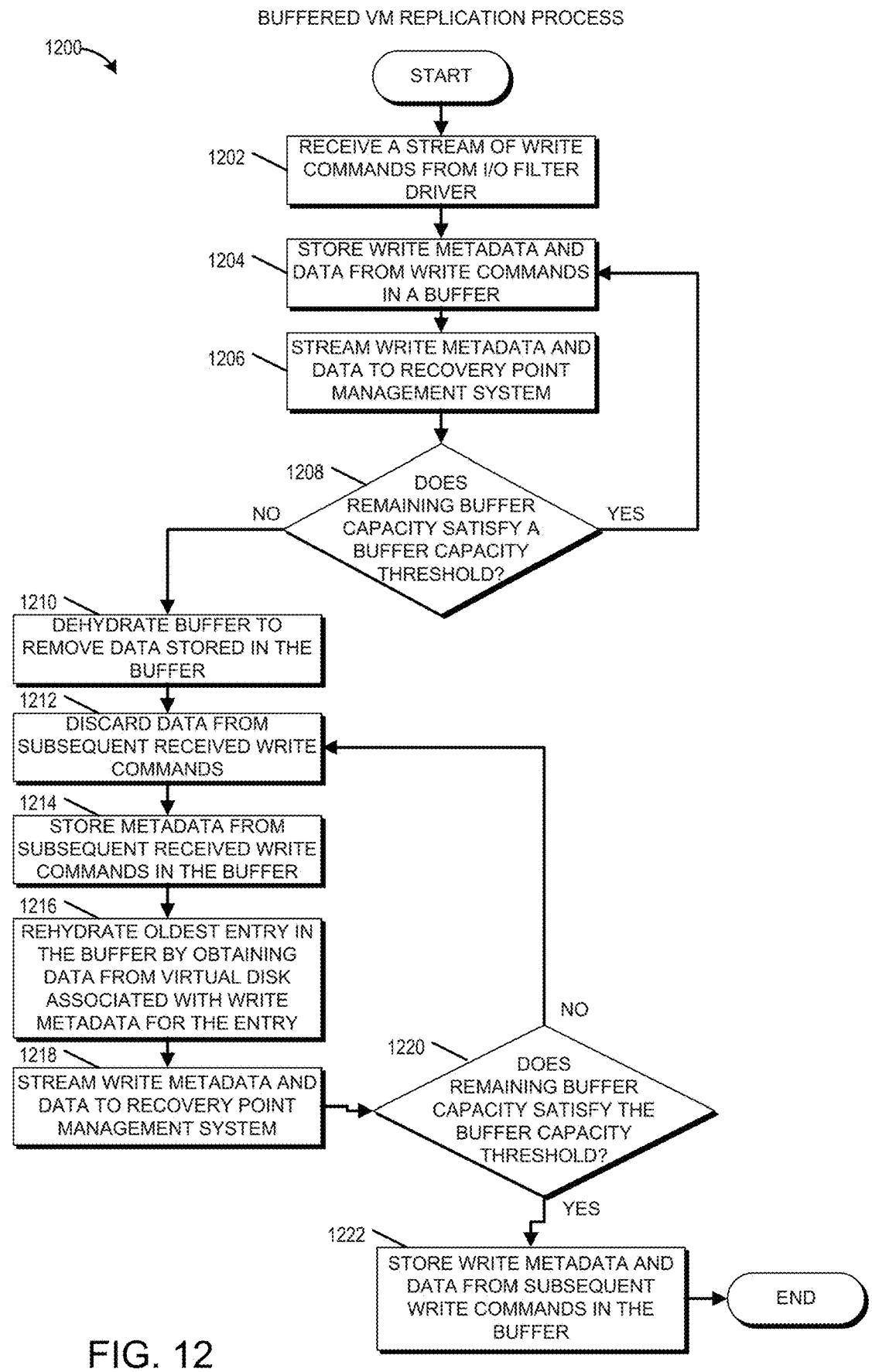
FIG. 12 depicts some salient operations of a buffered virtual machine replication process 1200 according to an illustrative embodiment of the present invention.

FIG. 12 depicts some salient operations of a buffered virtual machine replication process 1200 according to an illustrative embodiment of the present invention. The process 1200 can be implemented by any system that can generate a recovery point for a virtual machine and/or a replica or copy of the virtual machine in a secondary environment using a communication buffer in a primary environment. The process 1200, in whole or in part, can be implemented by, for example, a VM server 302, a VM I/O framework 310, an I/O filter driver 312, a VM replicator 1004, a media agent 144, a secondary storage computing device 106, or a recovery point management system 1022, among others. Although any number of systems, in whole or in part, can implement the process 1200, to simplify discussion, the process 1200 will be described with respect to particular systems.

The process 1200 begins at block 1202 where, for example, the VM replicator 1004 receives a stream of write commands from an I/O filter driver 312. In certain embodiments, the block 1202 may include one or more of the embodiments previously described with respect to the block 1102. Moreover, as previously described with respect to the block 1102, the block 1202 may include receiving data that was included in a write command and metadata that indicates where the data is stored or is to be stored at a virtual disk 308.

At block 1204, the VM replicator 1004 stores metadata and data from the write commands in a buffer 1006. The metadata and the data may be stored together in the buffer 1006. Alternatively, the metadata and the data may be stored in different portions of the buffer 1006. Advantageously, in certain embodiments, by separating the storage of the data and the metadata, it is easier to discard the data as part of a dehydration process described in more detail below. In some embodiments, the VM replicator 1004 streams data and metadata received from the I/O filter driver 312 directly to the recovery point management system 1022 without storing the data or the metadata in the buffer 1006. Streaming the data and metadata without storing it in the buffer 1006 may occur when a speed of the network 1010 or an amount of bandwidth available to communicate via the network 1010 is enough that it is unnecessary to store the data or metadata within the buffer 1006. However, in cases where data and may be received from the I/O filter driver 312 at a faster rate than it can be communicated to the replication management system 1022, the data and the right metadata may be stored at the buffer 1006. In some embodiments, the buffer 1006 is configured as a queue in the data is stored within the buffer 1006 in the order in which it is received from the I/O filter driver 312. In some embodiments, a separate buffer or portion of the buffer is allocated for each VM 306 or each VM server. In such embodiments, the data is stored within the buffer or portion of the buffer allocated to the VM or VM server the generated or provided the data to the VM replicator 1004. In some embodiments, storing the data within the buffer 1006 may include assigning a sequence number to the data. The sequence number may be included as part of the metadata associated with the data in the buffer 1006. The sequence number assigned to the data may indicate the order in which the data was received by the VM replicator 1004. For example, a first packet or portion of data may be assigned the number one, the next packet or portion of data received may be assigned a number two, and so on and so forth. In some embodiments, the sequence number may be associated with a location where the data is stored at the virtual disk 308 as well as the order in which the data was received by the VM replicator 1004.

At block 1206, the VM replicator 1004 streams the metadata and the data to a recovery point management system 1022. Streaming the data and metadata to the recovery point management system 1022 may include retrieving the data and metadata from the buffer 1006 in a particular order, such as the order was received or in order determined by a sequence number assigned to the data. The data may be streamed from the buffer 1006 to the recovery point management system 1022 in order that preserves the order that the data was received from the I/O filter driver 312 and/or stored into the buffer 1006. In certain embodiments, the block 1206 may include one or more of the embodiments previously described with respect to the block 1104.

At decision block 1208, the VM replicator 1004 determines whether a remaining buffer capacity within the buffer 1006 satisfies a buffer capacity threshold. The buffer capacity threshold may be an amount of space allocated for the buffer 1006 or equal to the total capacity of the buffer 1006. Alternatively, the buffer capacity threshold may be some amount or percentage of space allocated for the buffer 1006. For example, the buffer capacity threshold may be set at 85%, 90%, or 95% of the total capacity of the buffer 1006. Further, in certain embodiments, the buffer capacity threshold may be specified by a user, such as an administrator. In other embodiments, the buffer capacity threshold may be specified are configured by a manufacturer of the VM replicator 1004.

If the remaining buffer capacity does satisfy a buffer capacity threshold process 1200 returns to the block 1204 where the VM replicator 1004 continues to store write metadata and data from write commands received at the block 1202 in the buffer 1006. In some embodiments, the process 1200 returns to the block 1202 where the VM replicator 1004 continues to receive a stream of write commands.

If it is determined at the decision block 1208 that the remaining buffer capacity does not satisfy a buffer capacity threshold, the VM replicator 1004 dehydrates the buffer 1006 to remove data stored in the buffer at the block 1210. Dehydrating the buffer may include discarding data stored within the buffer 1006 while continuing to maintain storage of write metadata associated with the discarded data. Thus, the amount of space available in the buffer 1006 is increased by the size of the data that is discarded. In some embodiments, dehydrating the buffer may include reducing the size of the data stored at the buffer. Reducing the size of the data may include discarding the data while maintaining the metadata for the data. Alternatively, or in addition, reducing the size of the data may include compressing the data using a data compression algorithm.

At block 1212, the VM replicator 1004 discards data for any subsequent write commands that are received by the VM replicator 1004. Alternatively, the VM replicator 1004 compresses data for the subsequent write commands.

At block 1214, the VM replicator 1004 stores metadata from the subsequent received write commands in the buffer 1006. Thus, the combination of the blocks 1212 and 1214 includes discarding data received after the determination that the buffer Capacity does not satisfy a buffer capacity threshold while storing metadata associated with the discarded data within the buffer 1006. By storing the metadata within the buffer 1006 the discarded data, the VM replicator 1004 is able, in some cases, to request a copy of the discarded data from the I/O filter driver 312 at a later time. In certain cases, it may not be possible to request a copy of the discarded data because, for example, the location where the discarded data was stored at the virtual disk 308 has been overwritten by subsequent commands. However, in some such cases, it may still be possible to obtain the most recent version of the data that is stored within the virtual disk 308 at the address identified by the metadata for the discarded data.

At block 1216, the VM replicator 1004 rehydrates the oldest entry in the buffer 1006 by obtaining data from the virtual disk 308 associated with the write metadata for the entry. Rehydrating the oldest entry in the buffer 1006 may include determining a location where the data is stored at the virtual disk 308 based on the information included in the metadata stored in the buffer 1006 corresponding to the data. In some embodiments, the metadata includes one or more pointers. This pointer(s) may point to the storage location of the data at the virtual disk 308. Rehydrating the oldest entry in the buffer may include retrieving the data from the virtual disk 308. Alternatively, or in addition, rehydrating the data may include decompressing a compressed version of the data stored at the buffer or at the virtual disk 308. The VM replicator 1004 can request that the I/O filter driver 312 obtain the data from the virtual disk 308 at the location identified in the metadata. The I/O filter driver 312 can then provide the requested data from the virtual disk 308 to the VM replicator 1004. In certain embodiments, the block 1216 may be repeated until a sequence number associated with metadata within the buffer 1006 matches a maximum or highest assigned sequence number, thereby indicating that all data have previously been stored in the buffer 1006 has been retrieved and provided to the recovery point management system 1022.

In certain embodiments, as described above, the data is stored at the location identified by the metadata may have been modified at some period in time after the original data was provided to the VM replicator 1004. Thus, the data obtained as part of the block 1216 may differ from the original data received with the metadata that the discarded as part of the block 1210. Accordingly, in certain embodiments, it may not be possible for the VM replicator 1004 to insert a crash consistent marker into a stream of data provided to the recovery point management system 1022 until at least such point in time where the buffer 1006 has been emptied of any data and/or metadata previously stored in the buffer 1006. Rehydrating the oldest entry in the buffer may include rehydrating an entry in the buffer associated with the oldest timestamp or the earliest sequence number still remaining within the buffer 1006. In some embodiments, the block 1218 may involve rehydrating an entry that is not the oldest or is not associated with the earliest sequence number. For example, in some cases, the VM replicator 1004 may process entries that share an address or that are contiguous regardless of whether the entry is the oldest pending entry within the buffer 1006.

It should be understood that in some embodiments a period of time may occur between operations associated with the process 1200. For example, operations associated with the block 1210 may occur at a first period of time and operations associated with the block 1216 may occur at a second period of time that is later than the first period of time. As a more concrete example, operations associated with the block 1210 may occur in the morning (e.g., at 10 AM) and operations associated with the block 1216 may occur in the afternoon (e.g., at 1 PM). In some embodiments, operations associated with the block 1216 may not occur until after a determination is made that a network 1010 is operational and/or that the VM replicator 1004 is capable of communicating with the recovery point management system 1022 via the network 1010.

For instance, in some example use cases, a problem with the network 1010 or an inability of the VM replicator 1004 to communicate with other recovery point management system 1022 during a first period of time may prevent data blocks from being streamed to the recovery point management system 1022 causing the buffer 1006 to fill up. Once the remaining buffer capacity reaches a buffer capacity threshold, the VM replicator 1004 may dehydrate the buffer by discarding data while maintaining the storage of metadata used to identify where the data was stored at the virtual disk 308 enabling the VM replicator 1004 to retrieve the data at a later period of time. Once the VM replicator 1004 is again able to communicate to the recovery point management system 1022 via the network 1010, the process may proceed with the block 1216 to obtain the previously discarded data, which may then be provided to the recovery point management system 1022 by the VM replicator 1004.

At block 1218, the VM replicator 1004 streams the write metadata and the data obtained at the block 1216 to the recovery point management system 1022. In certain embodiments, when all of the data associated with metadata stored at the buffer 1006 has been streamed to the recovery point management system 1022, the VM replicator 1004 may insert a crash consistent marker into the stream of data that is streamed to the recovery point management system 1022. In some embodiments, inserting the crash consistent marker may include performing one or more of the embodiments described with respect to the block 1110. Further, in certain embodiments, when all of the data associated with metadata stored the buffer 1006 has been streamed to the recovery point management system 1022, the VM replicator 1004 may perform operations associated with the blocks 1114, 1116, and 1118 to cause an application consistent marker to be inserted into the stream of data.

At decision block 1220, the VM replicator 1004 determines whether the remaining buffer capacity of the buffer 1006 satisfies the buffer capacity threshold. The decision block 1220 may include one or more of the embodiments previously described with respect to the decision block 1208. In some embodiments, the buffer capacity threshold used at the decision block 1208 and the buffer capacity threshold used at the decision block 1220 may differ. The buffer capacity thresholds may, in some cases, differ because, for example, a different threshold may be used at different times of day or because the threshold may vary based on whether the amount of data being stored in the buffer is increasing or decreasing.

If it is determined at the decision block 1220 that the remaining buffer capacity does not satisfy the buffer capacity threshold, the process 1200 returns to the block 1212 where the VM replicator 1004 continues to discard data from subsequent received write commands. If it is determined at the decision block 1220 that the remaining buffer capacity does satisfy the buffer capacity threshold, a VM replicator 1004 stores write metadata and data from subsequent received write commands in the buffer 1006 at the block 1222. The subsequent received write commands may include write commands that are received after a determination that the remaining buffer capacity satisfies the buffer capacity threshold. The process 1200 may end after performing the block 1222. Alternatively, the process 1200 may return to the block 1202 to process additional received write commands.

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation. For example, in some embodiments, the I/O filter driver 312 may load or revert a VM to a recovery point where the media agent 144 may load or revert the VM to the recovery point.

Example Embodiments

Some example enumerated embodiments of the present invention are recited in this section in the form of methods, systems, and non-transitory computer-readable media, without limitation.

One aspect of the disclosure provides a computer-implemented method of generating a recovery point of a virtual machine. The computer-implemented method comprises: as implemented by a media agent within a computing system comprising one or more hardware processors and configured with specific computer-executable instructions, comprising generating a first bitmap representing a set of data blocks of a virtual machine disk of a virtual machine; receiving a first modified data block within a first recovery point time period, the first modified data block modified relative to a first data block of a backed up copy of the virtual machine disk stored at a secondary storage device; storing the first modified data block at the secondary storage device; updating a first portion of the first bitmap corresponding to the first data block to indicate that the first modified data block exists at the secondary storage device; and responsive to the first recovery point time period elapsing, completing creation of a first recovery point, the first recovery point corresponding to the first bitmap.

The method of the preceding paragraph can include any sub-combination of the following features: where the method further comprises receiving a second modified data block within the first recovery point time period, the second modified data block modified relative to a second data block of the backed up copy of the virtual machine disk; storing the second modified data block; and updating a second portion of the first bitmap corresponding to the second data block; where the second modified data block is stored at a different secondary storage device than the first modified data block; where the method further comprises receiving a second modified data block within a second recovery point time period; generating a second bitmap representing the set of data blocks of the virtual machine disk; storing the second modified data block; and updating a portion of the second bitmap corresponding to the second modified data block; where the second recovery point time period is subsequent to the first recovery point time period, and wherein the second bitmap includes an indication that the first modified data block exists at the secondary storage device and that the second modified data block exists at one of the secondary storage device or a different secondary storage device; where completing creation of the first recovery point comprises storing the first bitmap at a recovery point index repository on a secondary storage computing system; where the updating the first portion of the first bitmap comprises storing at the first portion of the first bitmap a storage location within the secondary storage device of the first modified data block; where the first modified data block is received from a filter driver that captures input/output commands communicated between the virtual machine and the virtual machine disk; where the method further comprises receiving a second modified data block within the first recovery point time period, the second modified data block corresponding to the first data block of the backed up copy of the virtual machine disk; storing the second modified data block at one of the secondary storage device or different secondary storage device; and updating the first portion of the first bitmap corresponding to the first data block to indicate that the second modified data block exists at the one of the secondary storage device or the different secondary storage device; and where the method further comprises providing the first modified data block to a replication server hosting a replica virtual machine corresponding to the virtual machine.

Another aspect of the disclosure provides a system for generating a recovery point of a virtual machine. The system comprises a media agent implemented in computer hardware, the media agent configured to: generate a first bitmap representing a set of data blocks of a virtual machine disk of a virtual machine; receive a first modified data block within a first recovery point time period, the first modified data block modified relative to a first data block of a backed up copy of the virtual machine disk stored at a secondary storage device; store the first modified data block at the secondary storage device; update a first portion of the first bitmap corresponding to the first data block to indicate that the first modified data block exists at the secondary storage device; and responsive to the first recovery point time period elapsing, complete creation of a first recovery point, the first recovery point corresponding to the first bitmap.

The system of the preceding paragraph can include any sub-combination of the following features: where the media agent is further configured to: receive a second modified data block within the first recovery point time period, the second modified data block modified relative to a second data block of the backed up copy of the virtual machine disk; store the second modified data block; and update a second portion of the first bitmap corresponding to the second data block; where the second modified data block is stored at a different secondary storage device than the first modified data block; where the media agent is further configured to: receive a second modified data block within a second recovery point time period; generate a second bitmap representing the set of data blocks of the virtual machine disk; store the second modified data block; and update a portion of the second bitmap corresponding to the second modified data block; where the second recovery point time period is subsequent to the first recovery point time period, and wherein the second bitmap includes an indication that the first modified data block exists at the secondary storage device and that the second modified data block exists at one of the secondary storage device or a different secondary storage device; where the media agent is further configured to complete creation of the first recovery point by storing the first bitmap at a recovery point index repository on a secondary storage computing system; where the media agent is further configured to update the first portion of the first bitmap by storing at the first portion of the first bitmap a storage location within the secondary storage device of the first modified data block; where the first modified data block is received from a filter driver that captures input/output commands communicated between the virtual machine and the virtual machine disk; where the media agent is further configured to: receive a second modified data block within the first recovery point time period, the second modified data block corresponding to the first data block of the backed up copy of the virtual machine disk; store the second modified data block at one of the secondary storage device or different secondary storage device; and update the first portion of the first bitmap corresponding to the first data block to indicate that the second modified data block exists at the one of the secondary storage device or the different secondary storage device; and where the media agent is further configured to provide the first modified data block to a replication server hosting a replica virtual machine corresponding to the virtual machine.

Another aspect of the disclosure provides a computer-implemented method of reverting to an earlier version of a virtual machine. The computer implemented method comprises: as implemented by a filter driver within a computing system comprising one or more hardware processors and configured with specific computer-executable instructions, receiving an identification of a recovery point of a virtual machine; initiating the virtual machine in a first state, the first state more recent than a state corresponding to the recovery point; accessing a bitmap corresponding to the recovery point; identifying a set of data blocks to retrieve from a secondary storage system based at least in part on the bitmap, wherein the set of data blocks correspond to data blocks that differ in content compared to corresponding data blocks of a virtual machine disk of the virtual machine; initiating a data block retrieval process to retrieve the set of data blocks from the secondary storage system; receiving an input/output command that references a data block from the set of data blocks that has yet to be retrieved; and prioritizing the data block for retrieval over remaining data blocks from the set of data blocks.

The method of the preceding paragraph can include any sub-combination of the following features: where the method further comprises executing the input/output command subsequent to retrieval of the data block; where the method further comprises providing the virtual machine with a copy of the data block subsequent to retrieval of the data block; where the method further comprises prioritizing for retrieval a collocated data block of the data block from the set of data blocks over the remaining data blocks from the set of data blocks; where prioritizing the data block for retrieval comprises: pausing retrieval of the remaining data blocks from the set of data blocks; retrieving the data block; and resuming retrieval of the remaining data blocks subsequent to retrieving the data block, where prioritizing the data block for retrieval comprises initiating a new retrieval thread to retrieve the data block; where initiating the virtual machine in the first state comprises initiating the virtual machine to a current state; where initiating the virtual machine in the first state comprises: identifying a snapshot of the virtual machine that is closest in time to the recovery point; and loading the snapshot of the virtual machine; where identifying the set of data blocks to retrieve comprises determining differences between the bitmap and a second bitmap corresponding to the first state of the virtual machine; and where identifying the set of data blocks to retrieve comprises determining a storage location at the secondary storage system of one or more data blocks from the set of data blocks.

Another aspect of the disclosure provides a system for reverting to an earlier version of a virtual machine. The system comprises: a filter driver implemented in computer hardware, the filter driver configured to: receive an identification of a recovery point of a virtual machine; initiate the virtual machine in a first state, the first state more recent than a state corresponding to the recovery point; access a bitmap corresponding to the recovery point; identify a set of data blocks to retrieve from a secondary storage system based at least in part on the bitmap, wherein the set of data blocks correspond to data blocks that differ in content compared to corresponding data blocks of a virtual machine disk of the virtual machine; initiate a data block retrieval process to retrieve the set of data blocks from the secondary storage system; receive an input/output command that references a data block from the set of data blocks that has yet to be retrieved; and prioritize the data block for retrieval over remaining data blocks from the set of data blocks.

The system of the preceding paragraph can include any sub-combination of the following features: where the filter driver is further configured to permit execution of the input/output command subsequent to retrieval of the data block; where the filter driver is further configured to provide the virtual machine with a copy of the data block subsequent to retrieval of the data block; where the filter driver is further configured to prioritize for retrieval a collocated data block of the data block from the set of data blocks over the remaining data blocks from the set of data blocks; where the filter driver is further configured to prioritize the data block for retrieval by: pausing retrieval of the remaining data blocks from the set of data blocks; retrieving the data block; and resuming retrieval of the remaining data blocks subsequent to retrieving the data block; where the filter driver is further configured to prioritize the data block for retrieval by initiating a new retrieval thread to retrieve the data block; where initiating the virtual machine in the first state comprises initiating the virtual machine to a current state; where initiating the virtual machine in the first state comprises: identifying a snapshot of the virtual machine that is closest in time to the recovery point; and loading the snapshot of the virtual machine; where the filter driver is further configured to identify the set of data blocks to retrieve by determining differences between the bitmap and a second bitmap corresponding to the first state of the virtual machine; and where identifying the set of data blocks to retrieve comprises determining a storage location at the secondary storage system of one or more data blocks from the set of data blocks.

Another aspect of the disclosure provides a computer-implemented method of selecting a recovery point of a virtual machine. The computer-implemented method comprising: as implemented by a media agent within a computing system comprising one or more hardware processors and configured with specific computer-executable instructions, identifying a plurality of recovery points for a virtual machine; accessing a plurality of bitmaps corresponding to the plurality of recovery points; for at least some of the plurality of recovery points, determining a quantity of changed data blocks between a first recovery point and a second recovery point based at least in part on corresponding bitmaps from the plurality of bitmaps, wherein the second recovery point comprises an earlier recovery point than the first recovery point; generating a user interface to display metadata associated with the plurality of recovery points; displaying on the user interface the quantity of changed data blocks for the at least some of the plurality of recovery points; receiving a selection of a recovery point at the user interface; and initiating a recovery point loading process based at least in part on the selection of the recovery point.

The method of the preceding paragraph can include any sub-combination of the following features: where the first recovery point and the second recovery point comprise consecutive in time recovery points; where the user interface displays a graph illustrating the quantity of changed data blocks for the at least some of the plurality of recovery points; where receiving the selection of the recovery point comprises detecting interaction with a data point on the graph corresponding to the recovery point; where the graph further illustrates a quantity of changed data blocks between the first recovery point and a snapshot of the virtual machine; where determining the quantity of changed data blocks comprises determining a percentage of changed data blocks between the first recovery point and the second recovery point; where the method further comprises determining a set of virtual machines that include backups at a secondary storage system; causing display of identifiers for the set of virtual machines at the user interface; and receiving an indication of a selection of the virtual machine from the set of virtual machines; where the method further comprises receiving a selection of a target computing system, wherein initiating the recovery point loading process comprises initiating the recovery point loading process at the target computing system; where the method further comprises calculating, for at least some of the plurality of recovery points, an estimated recovery time for loading the recovery point based at least in part on a corresponding bitmap from the plurality of bitmaps; and where the estimated recovery time is further based at least in part on a number of changed data blocks between a current state of the virtual machine and the recovery point.

Another aspect of the disclosure provides a system for selecting a recovery point of a virtual machine. The system comprises a media agent implemented in computer hardware, the media agent configured to: identify a plurality of recovery points for a virtual machine; access a plurality of bitmaps corresponding to the plurality of recovery points; for at least some of the plurality of recovery points, determine a quantity of changed data blocks between a first recovery point and a second recovery point based at least in part on corresponding bitmaps from the plurality of bitmaps, wherein the second recovery point comprises an earlier recovery point than the first recovery point; generate a user interface to display metadata associated with the plurality of recovery points; display on the user interface the quantity of changed data blocks for the at least some of the plurality of recovery points; receive a selection of a recovery point at the user interface; and initiate a recovery point loading process based at least in part on the selection of the recovery point.

The system of the preceding paragraph can include any sub-combination of the following features: where the first recovery point and the second recovery point comprise consecutive in time recovery points; where the user interface displays a graph illustrating the quantity of changed data blocks for the at least some of the plurality of recovery points; where receiving the selection of the recovery point comprises detecting interaction with a data point on the graph corresponding to the recovery point; where the graph further illustrates a quantity of changed data blocks between the first recovery point and a snapshot of the virtual machine; where determining the quantity of changed data blocks comprises determining a percentage of changed data blocks between the first recovery point and the second recovery point; where the media agent is further configured to: determine a set of virtual machines that include backups at a secondary storage system; cause display of identifiers for the set of virtual machines at the user interface; and receive an indication of a selection of the virtual machine from the set of virtual machines; where the media agent is further configured to receive a selection of a target computing system, wherein initiating the recovery point loading process comprises initiating the recovery point loading process at the target computing system; where the media agent is further configured to calculate, for at least some of the plurality of recovery points, an estimated recovery time for loading the recovery point based at least in part on a corresponding bitmap from the plurality of bitmaps; and where the estimated recovery time is further based at least in part on a number of changed data blocks between a current state of the virtual machine and the recovery point.

Another aspect of the disclosure provides a computer-implemented method of consistent virtual machine replication. The computer-implemented method comprising: as implemented by a virtual machine replicator within a computing system comprising one or more hardware processors and configured with specific computer-executable instructions, receiving a first set of data blocks from a virtual machine server, the first set of data blocks corresponding to write commands performed at the virtual machine server to write the first set of data blocks to a virtual disk of a virtual machine hosted by the virtual machine server, wherein receiving the first set of data blocks further comprises receiving metadata for each data block indicating an address where the data block is to be written at the virtual disk; providing the first set of data blocks and the metadata for each data block to a recovery point management system capable of generating a recovery point for the virtual machine; detecting an application consistent recovery point trigger event; initiating a snapshot generation process at the virtual machine server; receiving an indication that a snapshot has been generated for the virtual machine at the virtual machine server; and providing an application consistent marker to the recovery point management system enabling the recovery point management system to determine that generate an application consistent recovery point.

The method of the preceding paragraph can include any sub-combination of the following features: where providing the first set of data blocks and the metadata for each data block to the recovery point management system comprises streaming the first set of data blocks and the metadata for each data block to the recovery point management system, and wherein providing the application consistent marker to the recovery point management system comprises inserting the application consistent marker into the stream of data blocks and metadata; the application consistent marker is provided to the recovery point management system after the virtual machine replicator confirms that the first set of data blocks and the metadata has been transmitted to the recovery point management system; where the virtual machine replicator is within a primary virtual machine environment that includes the virtual machine server, and wherein the recovery point management system is within a secondary virtual machine environment that is separate from the primary virtual machine environment and communicates with the primary virtual machine environment over a network; where the application consistent recovery point trigger event comprises a passage of time, a number of data blocks received, a command from a user, or a command from the recovery point management system; where the method further comprises receiving a second set of data blocks from the virtual machine server; detecting a crash consistent recovery point trigger event; inserting a crash consistent recovery point marker into a stream of the second set of data blocks provided to the recovery point management system; where the method further comprises confirming that a first portion of the second set of data blocks was successfully streamed to the recovery point management system before inserting the crash consistent recovery point marker into the stream; where the crash consistent recovery point trigger event occurs with a different frequency than the application consistent recovery point trigger event; where the method further comprises receiving the first set of data blocks comprises receiving a copy of a set of write commands corresponding to the first set of data blocks; where the virtual machine replicator is further configured to receive data blocks from a plurality of virtual machine servers; and where the providing the application consistent marker to the recovery point management system occurs after the first set of data blocks have finished being provided to the recovery point management system.

Another aspect of the disclosure provides a system that performs consistent virtual machine replication. The system comprising: a virtual machine replicator implemented in computer hardware, the virtual machine replicator configured to: receive a first set of data blocks from a virtual machine server; receive metadata for each data block of the first set of data blocks indicating a location on a virtual disk of a virtual machine where the data block is to be written; stream the first set of data blocks and the metadata for each data block to a recovery point management system; detect an application consistent recovery point trigger event; initiate a snapshot generation process at the virtual machine server; receive an indication that a snapshot has been generated for the virtual machine at the virtual machine server; and insert an application consistent marker into the stream of the first set of data blocks to the recovery point management system.

The system of the preceding paragraph can include any sub-combination of the following features: where the first set of data blocks are streamed to the recovery point management system as data blocks from the first set of data blocks are received by the virtual machine replicator; where the application consistent marker is inserted at the end of the stream of the first set of data blocks; where the virtual machine replicator communicates with the recovery point management system over a network; where the virtual machine replicator is further configured to: receive a second set of data blocks from the virtual machine server; detect a crash consistent recovery point trigger event; insert a crash consistent recovery point marker into a stream of the second set of data blocks provided to the recovery point management system; where the second set of data blocks is received prior to the first set of data blocks; where the virtual machine replicator comprises a buffer configured to store the first set of data blocks; where the virtual machine replicator inserts the application consistent marker into the stream subsequent to confirming that the buffer is empty; and where the virtual machine replicator is configured to receive data blocks from a plurality of virtual machine servers, wherein the plurality of virtual machine servers includes the virtual machine server, and wherein each virtual machine server is configured to host one or more virtual machines.

Another aspect of the disclosure provides a computer-implemented method of buffered virtual machine replication. The computer-implemented method comprising: as implemented by a virtual machine replicator within a computing system comprising one or more hardware processors and configured with specific computer-executable instructions, receiving a stream of data blocks from a virtual machine server, the stream of data blocks corresponding to write commands performed at the virtual machine server to write data blocks from the stream of data blocks to a virtual disk of a virtual machine hosted by the virtual machine server, wherein receiving the stream of data blocks further comprises receiving metadata indicating, at least, an address where each data block of the stream of data blocks is to be written at the virtual disk; storing data blocks from the stream of data blocks and corresponding metadata in a buffer of the virtual machine replicator, the buffer comprising memory allocated to store at least data blocks to be streamed to a recovery point management system; streaming data blocks from the buffer to the recovery point management system, wherein the data blocks streamed to the recovery point management system are removed from the buffer; determining that an amount of space remaining in the buffer does not satisfy a buffer capacity threshold at a first time period; reducing a size of a remaining set of data blocks from the data blocks stored at the buffer after the first time period; and restoring the size of each data block from the remaining set of data blocks prior to streaming the data block to the recovery point management system after the first time period.

The method of the preceding paragraph can include any sub-combination of the following features: where reducing the size of the remaining set of data blocks comprises discarding the remaining set of data blocks while maintaining corresponding metadata in the buffer; where restoring the size of each data block comprises: determining, using metadata associated with the data block stored at the buffer, the address of the data block at the virtual disk; and requesting the data block from the virtual machine server using the address of the data block; where the method further comprises discarding data blocks received from the virtual machine server subsequent to the first time period, but prior to a second time period when the amount of space remaining in the buffer satisfies the buffer capacity threshold, the second time period later than the first time period; and storing metadata corresponding to the data blocks received subsequent to the first time period, but prior to the second time period, in the buffer; where the method further comprises determining that the amount of space remaining in the buffer satisfies the buffer capacity threshold at a second time period, the second time period later than the first time period; and storing, at the buffer, data blocks received from the virtual machine server subsequent to the second time period; where each data block stored at the buffer is associated with a sequence number that is higher than each previously assigned sequence number, and wherein, at least one time when the sequence number of a data block streamed to the recovery point management system matches a highest assigned sequence number, the method further comprises inserting a crash consistent marker into the stream of data blocks from the buffer to the recovery point management system; where the method further comprises determining that a functioning network connection between the virtual machine replicator and the recovery point management system exists, wherein the restoring the size of each data block from the remaining set of data blocks as the data block is streamed to the recovery point management system occurs after determining that the functioning network connection exists, and wherein the functioning network connection comprises a network connection capable of being used to provide the data block from the virtual machine replicator to the recovery point management system; where the virtual machine replicator is further configured to receive data blocks from a plurality of virtual machine servers; where the virtual machine replicator is further configured to maintain a separate buffer for each virtual machine server of the plurality of virtual machine servers; where the virtual machine server hosts a plurality of virtual machines, and wherein the virtual machine replicator is further configured to maintain a separate buffer for each virtual machine of the virtual machine server; and where the buffer capacity threshold is less than a total capacity of the buffer.

Another aspect of the disclosure provides a system that performs buffered virtual machine replication. The system comprising: a virtual machine replicator implemented in computer hardware, the virtual machine replicator configured to: receive a stream of data blocks and corresponding metadata from a virtual machine server, wherein the metadata comprises an address where each data block of the stream of data blocks is to be written at a virtual disk; store data blocks and corresponding metadata from the stream of data blocks in a buffer of the virtual machine replicator, the buffer comprising memory allocated to store at least data blocks to be streamed to a recovery point management system; stream data blocks from the buffer to the recovery point management system, wherein the data blocks streamed to the recovery point management system are removed from the buffer; determine that an amount of space remaining in the buffer does not satisfy a buffer capacity threshold at a first time period; reduce a size of a remaining set of data blocks from the data blocks stored at the buffer after the first time period; and restore the size of each data block from the remaining set of data blocks prior to streaming the data block to the recovery point management system after the first time period.

The system of the preceding paragraph can include any sub-combination of the following features: where the virtual machine replicator is configured to reduce the size of the remaining set of data blocks by at least discarding the remaining set of data blocks from the buffer while continuing to store corresponding metadata in the buffer; where the virtual machine replicator is configured to restore the size of the data block by at least: determining, using metadata associated with the data block stored at the buffer, the address of the data block at the virtual disk; and requesting the data block from the virtual machine server using the address of the data block; where the virtual machine replicator is further configured to: discard data blocks received from the virtual machine server subsequent to the first time period, but prior to a second time period that occurs when the amount of space remaining in the buffer satisfies the buffer capacity threshold, the second time period later than the first time period; and store metadata corresponding to the data blocks received subsequent to the first time period, but prior to the second time period, in the buffer; where the virtual machine replicator is further configured to: determine that the amount of space remaining in the buffer satisfies the buffer capacity threshold at a second time period, the second time period later than the first time period; and store, at the buffer, data blocks received from the virtual machine server subsequent to the second time period; where each data block stored at the buffer is associated with a sequence number, and wherein the virtual machine replicator is further configured to: determine that the sequence number of a data block currently being streamed to the recovery point management system is a highest sequence number that has been assigned; and provide a crash consistent marker to the recovery point management system subsequent to the data block currently being streamed; where the virtual machine replicator is further configured to determine, prior to restoring the size of a data block from the remaining set of data blocks, that a network connection exists between the virtual machine replicator and the recovery point management system that is capable of transferring a data block from the virtual machine replicator to the recovery point management system; where the virtual machine replicator is further configured to receive data blocks from a plurality of virtual machine servers, and wherein the virtual machine replicator is further configured to maintain a separate buffer for each virtual machine server of the plurality of virtual machine servers; and where the virtual machine server hosts a plurality of virtual machines, and wherein the virtual machine replicator is further configured to maintain a separate buffer for each virtual machine of the virtual machine server.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method of reverting a virtual machine to a different version, the computer-implemented method comprising:
   by a first computing system comprising one or more hardware processors and computer memory, executing a filter driver that operates between a virtual machine hosted by the first computing system and a virtual disk that stores data associated with the virtual machine, wherein the filter driver captures input/output commands between the virtual machine and the virtual disk;
   by the first computing system, receiving an identification of a recovery point of the virtual machine;
   by the first computing system, initiating the virtual machine in a first state that differs from a second state corresponding to the recovery point;
   by the filter driver, using the identification of the recovery point to access a bitmap corresponding to the recovery point,
      wherein the bitmap is stored at a second computing system comprising one or more hardware processors and computer memory, and
      wherein the second computing system is communicatively coupled to the first computing system, and is also communicatively coupled to one or more storage devices storing the recovery point;
   by the filter driver, using the bitmap to identify a set of data blocks to retrieve from the one or more storage devices,
      wherein the bitmap indicates data blocks, stored in the one or more storage devices, that differ in content compared to corresponding data blocks in the virtual disk;
   by the filter driver, causing the virtual machine to revert to the second state corresponding to the recovery point by initiating a retrieval process to retrieve the set of data blocks from the one or more storage devices and to store the set of data blocks to the virtual disk;
   by the filter driver, receiving a command from the virtual machine that references a data block among the set of data blocks, wherein the data block has yet to be retrieved from the one or more storage devices; and
   by the filter driver, prioritizing retrieval of the data block over remaining data blocks from the set of data blocks.

2. The computer-implemented method of claim 1, further comprising executing the command subsequent to the retrieval of the data block.

3. The computer-implemented method of claim 1, further comprising providing the virtual machine with a copy of the data block subsequent to the retrieval of the data block.

4. The computer-implemented method of claim 1, further comprising prioritizing for retrieval a co located data block of the data block from the set of data blocks over the remaining data blocks from the set of data blocks.

5. The computer-implemented method of claim 1, wherein prioritizing the retrieval of the data block comprises:
pausing retrieval of the remaining data blocks from the set of data blocks;
retrieving the data block; and
resuming retrieval of the remaining data blocks subsequent to retrieving the data block.

6. The computer-implemented method of claim 1, wherein prioritizing the retrieval of the data block comprises initiating a new retrieval thread to retrieve the data block.

7. The computer-implemented method of claim 1, wherein initiating the virtual machine in the first state comprises initiating the virtual machine to a current state.

8. The computer-implemented method of claim 1, wherein initiating the virtual machine in the first state comprises:
identifying a snapshot of the virtual machine that is closest in time to the recovery point; and
loading the snapshot of the virtual machine.

9. The computer-implemented method of claim 1, wherein identifying the set of data blocks to retrieve comprises determining differences between the bitmap and a second bitmap corresponding to the first state of the virtual machine.

10. The computer-implemented method of claim 1, wherein the virtual machine is reverted to the second state without replacing the entire virtual disk.

11. A non-transitory computer-readable medium comprising instructions that, when executed by a first computing system comprising one or more processors and computer memory, cause the first computing system to perform operations comprising:
executing a filter driver that operates between a virtual machine hosted by the first computing system and a virtual disk that stores data associated with the virtual machine, wherein the filter driver captures input/output commands between the virtual machine and the virtual disk;
activating the virtual machine in a first state;
receiving an identification of a recovery point of the virtual machine, wherein the recovery point corresponds to a second state of the virtual machine that is different from the first state;
by the filter driver, using the identification of the recovery point to access a bitmap corresponding to the recovery point, wherein the bitmap indicates data blocks that differ in content compared to corresponding data blocks in the virtual disk,
wherein the bitmap is stored at one or more of: the first computing system, and a second computing system comprising one or more hardware processors and computer memory, and
wherein the second computing system is communicatively coupled to the first computing system, and to one or more storage devices storing the recovery point;
by the filter driver, using the bitmap to identify a set of data blocks in the recovery point to be retrieved from the one or more storage devices;
by the filter driver, causing the virtual machine to revert to the second state by initiating a process to retrieve the set of data blocks from the one or more storage devices and to store the set of data blocks to the virtual disk;
by the filter driver, receiving a command from the virtual machine that references a data block among the set of data blocks, wherein the data block has yet to be retrieved from the one or more storage devices; and
by the filter driver, prioritizing retrieval of the data block over remaining data blocks from the set of data blocks.

12. The non-transitory computer-readable medium of claim 11, wherein the filter driver permits execution of the command subsequent to the retrieval of the data block.

13. The non-transitory computer-readable medium of claim 11, wherein the filter driver provides the virtual machine with a copy of the data block subsequent to the retrieval of the data block.

14. The non-transitory computer-readable medium of claim 11, wherein the filter driver prioritizes retrieval of a second data block co-located with the data block over the remaining data blocks from the set of data blocks.

15. The non-transitory computer-readable medium of claim 11, wherein the filter driver prioritizes retrieval of the data block by:
pausing retrieval of the remaining data blocks from the set of data blocks;
retrieving the data block; and
resuming retrieval of the remaining data blocks subsequent to retrieving the data block.

16. The non-transitory computer-readable medium of claim 11, wherein the virtual machine is reverted to the second state without replacing the entire virtual disk.

17. The non-transitory computer-readable medium of claim 11, wherein initiating the virtual machine in the first state comprises initiating the virtual machine to a current state.

18. The non-transitory computer-readable medium of claim 11, wherein initiating the virtual machine in the first state comprises:
identifying a snapshot of the virtual machine that is closest in time to the recovery point; and
loading the snapshot of the virtual machine.

19. The non-transitory computer-readable medium of claim 11, wherein the filter driver identifies the set of data blocks to retrieve by determining differences between the bitmap and a second bitmap corresponding to the first state of the virtual machine.

20. The non-transitory computer-readable medium of claim 11, wherein the filter driver identifies the set of data blocks to retrieve by determining differences between the bitmap and a second bitmap corresponding to the first state of the virtual machine, and wherein the second bitmap is stored at the first computing system.

* * * * *